United States Patent
Kakemizu et al.

(10) Patent No.: US 6,917,605 B2
(45) Date of Patent: Jul. 12, 2005

(54) MOBILE NETWORK SYSTEM AND SERVICE CONTROL INFORMATION CHANGING METHOD

(75) Inventors: Mitsuaki Kakemizu, Kawasaki (JP); Kazunori Murata, Fukuoka (JP); Yoichiro Igarashi, Kawasaki (JP); Shinya Yamamura, Fukuoka (JP); Masaaki Wakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 791 days.

(21) Appl. No.: 09/770,019

(22) Filed: Jan. 25, 2001

(65) Prior Publication Data

US 2001/0036164 A1 Nov. 1, 2001

(30) Foreign Application Priority Data

Apr. 26, 2000 (JP) ........................... 2000-125968

(51) Int. Cl.[7] ............................................... H04Q 7/24
(52) U.S. Cl. .................... 370/338; 370/392; 370/401; 709/228
(58) Field of Search ................ 370/351–356, 370/400–405, 389, 392, 467, 326, 338, 329, 331; 709/217, 218, 223–229, 238, 245, 249

(56) References Cited

U.S. PATENT DOCUMENTS

| 6,304,566 | B1 | * | 10/2001 | Schessel ..................... 370/354 |
| 6,377,955 | B1 | * | 4/2002 | Hartmann et al. ........ 707/104.1 |
| 6,496,505 | B2 | * | 12/2002 | La Porta et al. ............ 370/392 |
| 6,501,746 | B1 | * | 12/2002 | Leung ......................... 370/338 |
| 6,535,493 | B1 | * | 3/2003 | Lee et al. .................... 370/329 |
| 6,571,289 | B1 | * | 5/2003 | Montenegro ................ 709/227 |
| 6,578,085 | B1 | * | 6/2003 | Khalil et al. ................ 709/241 |
| 6,684,256 | B1 | * | 1/2004 | Warrier et al. .............. 709/238 |
| 6,693,886 | B1 | * | 2/2004 | Haikonen et al. ........... 370/338 |
| 6,714,987 | B1 | * | 3/2004 | Amin et al. ................. 709/249 |
| 6,728,536 | B1 | * | 4/2004 | Basilier et al. ............. 370/328 |

FOREIGN PATENT DOCUMENTS

JP    11288402    10/1999

OTHER PUBLICATIONS

Mahon, et al. "Requirements for a Policy Management System" Oct. 22, 1999; XP002220745; Internet p. 6, Paragraph 2. A Simple Policy Management System, p. 7, p. 17 Paragraph 4. General Policy Management Issues, p. 42, p. 64 Paragraph 5,6,4 . Signaled QOS Usage Case 1, p 67.
ETSI GSM GPRS: "GPRS Service Description Stage 2 GSM 03.60 V 6.6.0 Release 1997" ETSI EN 301.344 V 6.6.0 GSM 03.60 V 6.6.0 Dec. 1999; XP002220746, p. 58 Paragraph 9. Packet Routeing and Transfer Functionality, p. 70, p. 77 Paragraph 13. Information Storage, p. 83, p. 87 Paragraph 15.2 Quality of Service Profile, p. 89.
Calhoun, Perkins: "Diameter Mobile IP Extensions Draft Calhoun Diameter MobileIP 03. TXT" IETF Draft Oct. 1999, XP002220747 Internet.

* cited by examiner

*Primary Examiner*—Chau Nguyen
*Assistant Examiner*—Van Nguyen
(74) *Attorney, Agent, or Firm*—Katten Muchin Zavis Rosenman

(57) ABSTRACT

The mobile network system and the service control information changing method are disclosed in which by transmitting a registration request message containing change information of service content from the mobile terminal equipment to a foreign agent apparatus, the service control information concerning the mobile terminal equipment that is possessed by each of the foreign agent apparatus, a foreign server apparatus, a home server apparatus, a home agent apparatus, and a correspondent node is updated.

16 Claims, 67 Drawing Sheets

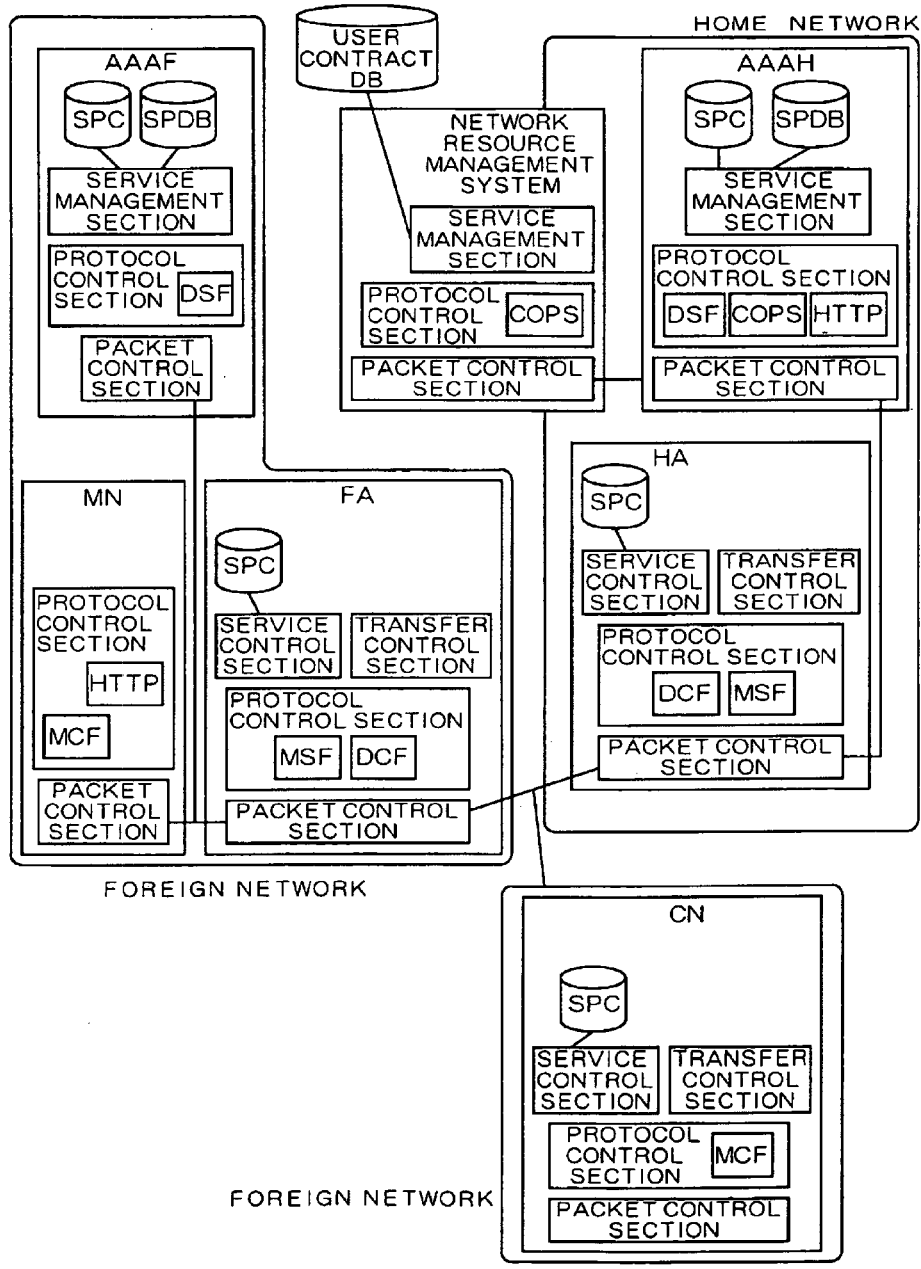

F/G. 3

| MESSAGE TYPE | MESSAGE TRANS-FERING NODE | NODE WHICH RECEIVES MESSAGE AND MESSAGE TO BE TRANSFERED AFTER RECEIVING MESSAGE (MESSAGE TO BE TRANSFERED AFTER RECEIVING MESSAGE /DESTINATION NODE) | | | | | |
|---|---|---|---|---|---|---|---|
| | | MN | CN | HA | FA | AAAF | AAAH |
| MIP REGISTRATION REQUEST | MN | — | — | | MIP REGISTRATION REQUEST/HA | — | — |
| | MN | — | — | | AMR/ AAAF | — | — |
| | FA | — | — | MIP REGISTRATION REPLY/FA | | — | — |
| MIP REGISTRATION REPLY | FA | TERMINAL | — | — | | — | — |
| | HA | — | MIP BINDING ACKNOWLEDGE /HA | — | — | — | — |
| MIP BINDING UPDATE | HA | — | — | — | — | — | — |
| MIP BINDING ACKNOWLEDGE | CN | — | — | MIP BINDING UPDATE/CN | — | — | — |
| | CN | — | — | HAA/ AAAH | — | — | — |
| AMR | FA | — | — | — | — | AMR/ AAAH | — |
| | AAAF | — | — | — | — | — | HAR/ HA |

FIG. 4

| MESSAGE TYPE | MESSAGE TRANS-FERING NODE | NODE WHICH RECEIVES MESSAGE AND MESSAGE TO BE TRANSFERED AFTER RECEIVING MESSAGE (MESSAGE TO BE TRANSFERED AFTER RECEIVING MESSAGE /DESTINATION NODE) | | | | | |
|---|---|---|---|---|---|---|---|
| | | MN | CN | HA | FA | AAAF | AAAH |
| AMA | FA | — | — | — | MIP REGISTRATION REPLY/MN | — | — |
| | AAAF | — | — | — | — | AMA/FA | — |
| HAR | AAAH | — | — | MIP BINDING UPDATE/CN | — | — | — |
| HAA | AAAH | — | — | HAA/AAAH | — | — | — |
| | HA | — | — | — | — | — | AMR/AAAF |
| SCR | AAAH | — | — | SCA/AAAH | — | — | — |
| | AAAF | — | — | — | SCA/AAAF | — | — |
| SCA | FA | — | — | — | — | SCR/FA | — |
| | FA | — | — | — | — | SCR/FA | — |
| | AAAF | — | — | — | — | SCA/AAAH | — |
| | HA | — | — | — | — | TERMINAL | SCR/AAAF |
| ROUTER ADVERTISE-MENT | FA | MIP REGISTRATION REQUEST/FA | — | — | — | — | — |

| TYPE=1 | S | B | D | M | G | V | P | r | LIFE TIME |
|---|---|---|---|---|---|---|---|---|---|
| HOME ADDRESS ||||||||||
| HA ADDRESS ||||||||||
| CARE-OF-ADDRESS ||||||||||
| MESSAGE IDENTIFIER ||||||||||
| MN-HA AUTHENTICATION EXTENSION ||||||||||
| MN-AAA AUTHENTICATION EXTENSION ||||||||||
| MN-NAI EXTENSION ||||||||||
| MN-SPC EXTENSION ||||||||||

| EXTENSION TYPE=140 | LENGTH |
|---|---|
| Vendor/Org. ID=211 ||
| SEQUENCE NUMBER | C |
| DATA FIELD ||

| TYPE=3 | CODE | LIFE TIME |
|---|---|---|
| HOME ADDRESS | | |
| HA ADDRESS | | |
| MESSAGE IDENTIFIER | | |
| MN SERVICE PROFILE EXTENSION | | |

| TYPE=18 | A | I | M | G | RESERV-ATION | LIFE TIME |
|---|---|---|---|---|---|---|
| HOME ADDRESS | | | | | | |
| CARE-OF-ADDRESS | | | | | | |
| MESSAGE IDENTIFIER | | | | | | |
| PROFILE CACHE EXTENSION | | | | | | |

| EXTENSION TYPE=133 | LENGTH |   |
|---|---|---|
| Vendor/Org.ID=211 | | |
| SEQUENCE NUMBER | | C |
| DATA FIELD | | |

| TYPE=19 | RESERVATION | STATUS |
|---|---|---|
| HOME ADDRESS | | |
| MESSAGE IDENTIFIER | | |

FIG. 14

| IP HEADER |
|---|
| UDP HEADER |
| DIAMETER HEADER |
| DIAMETER PAYLOAD |

| Source Port = RADIUS | Destination Port = RADIUS |
|---|---|
| Length | checksum |

| RADIUS PCC | Flags | A | W | Ver | Packet Length | | |
|---|---|---|---|---|---|---|---|
| Identifier ||||||||
| Next Send (Ns) |||| Next Received (Nr) ||||
| AVPs ||||||||

FIG. 17

| |
|---|
| <DIAMETER Header> |
| <AA-Mobile-Node-Request Command AVP> |
| <Session ID AVP > |
| <User-Name AVP> |
| <MIP-Registration-Request AVP> |
| <MN-FA-Challenge AVP> |
| <MN-FA-Response AVP> |
| <Mobile-Node-Address AVP> |
| <Home-Agent-Address AVP> |
| [<Previous-FA-NAI AVP>] |
| [<MN-FA-SPI AVP>] |
| [<MN-SPC AVP>] |
| <Timestamp AVP> |
| <Initialization-Vector AVP> |
| {<Integrity-Check-Vector AVP> OR <Digital-Signature AVP>} |

FIG. 18

| <DIAMETER Header> |
| --- |
| <Home-Agent-MIP-Request Command AVP> |
| <Session ID AVP> |
| <User-Name AVP> |
| <MIP-Registration-Request AVP> |
| <MN-HA-SPI AVP> |
| <HA-to-MN-Key AVP> |
| <MN-to-HA-Key AVP> |
| <FA-HA-SPI AVP> |
| <HA-to-FA-Key AVP> |
| <MN-FA-SPI AVP> |
| <MN-to-FA-Key AVP> |
| <Home-Agent-Address AVP> |
| <Mobile-Node-Address AVP> |
| [<Service-Profile-Cache AVP>] |
| <Session-Timeout AVP> |
| <Timestamp AVP> |
| <Initialization-Vector AVP> |
| {<Integrity-Check-Vector AVP> OR <Digital-Signature AVP>} |

*FIG. 19*

| |
|---|
| ⟨DIAMETER Header⟩ |
| ⟨AA-Mobile-Node-Answer Command AVP⟩ |
| ⟨Session ID AVP⟩ |
| ⟨Result-Code AVP⟩ |
| [⟨Error-Code AVP⟩] |
| ⟨MIP-Registration-Reply AVP⟩ |
| ⟨MN-FA-SPI AVP⟩ |
| ⟨FA-to-MN-Key AVP⟩ |
| ⟨FA-HA-SPI AVP⟩ |
| ⟨FA-to-HA-Key AVP⟩ |
| ⟨Home-Agent-Address AVP⟩ |
| ⟨Mobile-Node-Address AVP⟩ |
| [⟨Service-Profile-Cache AVP⟩] |
| ⟨Session-Timeout AVP⟩ |
| ⟨Timestamp AVP⟩ |
| ⟨Initialization-Vector AVP⟩ |
| {⟨Integrity-Check-Vector AVP⟩ OR ⟨Digital-Signature AVP⟩} |

FIG. 25

| | 0 1 2 3 4 5 6 7 | 8 9 0 1 2 3 4 5 | 6 7 8 9 0 1 2 3 | 4 5 6 7 8 9 0 1 |
|---|---|---|---|---|
| 0 | colspan=4: PROFILE NUMBER |||
| 1 | colspan=2: Profile Length || SVC Flags | P D F |
| 2 | colspan=4: OBJECT ENTITY FLAG ||||
| 3 | colspan=4: Source Address ||||
| 4 | colspan=4: Source Netmask ||||
| 5 | colspan=4: Destination Address ||||
| 6 | colspan=4: Destination Netmask ||||
| 7 | colspan=2: Source Port || colspan=2: Destination Port ||
| 8 | TOS | Protocol | colspan=2: RESERVATION FIELD ||

IPSVC-Resource Extention

| | | | |
|---|---|---|---|
| 0 | SVC TYPE=4 | Length | QOS CLASS |
| 1 | colspan=2: BAND UPPER LIMIT || BAND ASSURANCE |

IPSVC-DiffServe Extention

| | | | |
|---|---|---|---|
| 0 | SVC TYPE=1 | Length | TOS |

IPSVC-filter Extention

| | | | |
|---|---|---|---|
| 0 | SVC TYPE=2 | Length | RESERVATION FIELD |
| 1 | colspan=3: RESERVATION FIELD |||

IPSVC-security Extention

| | | | |
|---|---|---|---|
| 0 | SVC TYPE=3 | Length | RESERVATION FIELD |
| 1 | colspan=3: SPI |||

FIG. 27

| STRUCTURAL ELEMENT | EXPLANATION |
|---|---|
| SESSION ID | <NAI OF MN><32 BIT VALUE><OPTION> |
| SESSION TIMER | TERM OF VALIDITY FOR THIS TRANSACTION |

FIG. 28

| STRUCTURAL ELEMENT | VALUE | EXPLANATION |
|---|---|---|
| PROFILE NUMBER | 1 | |
| OBJECT ENTITY | 01000000 | FROM LEFT, FIRST BIT IS HA, SECOND BIT IS FA, THIRD BIT IS CN. ONLY FA IS OBJECT HERE. |
| SOURCE IP ADDRESS | 10.10.10.1 | SOURCE IP ADDRESS OF USER PACKET TO BE SERVICE OBJECT. ADDRESS OF CN IS INDICATED HERE. |
| SOURCE NET MASK | 255.255.255.0 | NET MASK FOR SOURCE IP ADDRESS |
| DESTINATION ADDRESS | 10.10.20.1 | DESTINATION IP ADDRESS OF USER PACKET TO BE SERVICE OBJECT. ADDRESS OF MN IS INDICATED HERE. |
| DESTINATION NET MASK | 255.255.255.0 | NET MASK FOR DESTINATION IP ADDRESS |
| SOURCE PORT NUMBER | 0 | SOURCE PORT NUMBER OF USER PACKET TO BE SERVICE OBJECT. NOTHING IS SPECIFIED HERE. |
| DESTINATION PORT NUMBER | 0 | DESTINATION PORT NUMBER OF USER PACKET TO BE SERVICE OBJECT. NOTHING IS SPECIFIED HERE. |
| BAND CONTROL EXTENSION INFORMATION | | |
| SERVICE TYPE | 4 | BAND CONTROL |
| QOS CLASS | 2 | QoS CLASS BEING USED |
| BAND UPPER LIMIT | 255 | UPPER LIMIT OF AVAILABLE BAND |
| BAND ASSURANCE | 0 | OFF |

FIG. 29

| STRUCTURAL ELEMENT | EXPLANATION |
|---|---|
| IP SOURCE ADDRESS | HOME ADDRESS OF MN THAT IS NOTIFIED WITH REGISTRATION REQUEST OR AMA |
| LINK LAYER SOURCE ADDRESS | ADDRESS OF MN LINK LAYER (MAC) |
| UDP SOURCE PORT | UDP SOURCE PORT NUMBER OF MN |
| HA ADDRESS | ADDRESS OF HA FOR FORWARDING REGISTRATION REQUEST. NOTIFIED WITH REGISTRATION REQUEST OR AMA |
| REGISTRATION REQUEST IDENTIFIER FIELD | IDENTIFIER FOR ASSOCIATING REQUEST WITH RESPONSE |
| LIFE TIME | TERM OF VALIDITY FOR REGISTRATION REQUEST |
| AUTHENTICATION INFORMATION | AUTHENTICATION INFORMATION FOR FA AUTHENTICATE MN |

FIG. 32

| STRUCTURAL ELEMENT | EXPLANATION |
|---|---|
| HOME ADDRESS | HOME ADDRESS ASSIGNED TO MN |
| CARE-OF-ADDRESS OF MOBILE TERMINAL EQUIPMENT | IP ADDRESS OF FA TO WHICH MN CURRENTLY CONNECTED |
| REGISTRATION REQUEST IDENTIFIER FIELD | IDENTIFIER FOR ASSOCIATING REQUEST WITH RESPONSE |
| LIFE TIME | TERM OF VALIDITY FOR REGISTRATION REQUEST |
| AUTHENTICATION INFORMATION | AUTHENTICATION INFORMATION FOR HA AUTHENTICATE MN |

FIG. 33

| STRUCTURAL ELEMENT | EXPLANATION |
|---|---|
| CN ADDRESS | CN ADDRESS TO WHICH MIP BINDING UPDATE MESSAGE HAS BEEN TRANSMITTED |
| LIFE TIME | TERM OF VALIDITY FOR AGING PROCESS |
| MESSAGE IDENTIFIER | MESSAGE IDENTIFIER WITH WHICH UPDATE BINDING HAS BEEN BROUGHT ABOUT |

FIG. 34

| STRUCTURAL ELEMENT | EXPLANATION |
|---|---|
| SESSION ID | \<NAI OF MN\> \<32 BIT VALUE\>\<OPTION\> |
| SESSION TIMER | TERM OF VALIDITY FOR THIS TRANSACTION |
| MOBILE CONNECTION | POINTER TO MOBILE CONNECTION |
| SCR REQUEST FLAG | FLAG INDICATING THAT SERVICE PROFILE OF CN IS BEING CHANGED |
| SCR REQUEST SOURCE ADDRESS | IP ADDRESS OF ENTITY THAT HAS REQUESTED SCR |

FIG. 39

| STRUCTURAL ELEMENT | EXPLANATION |
|---|---|
| HOME ADDRESS | HOME ADDRESS ASSIGNED TO MN |
| CARE-OF-ADDRESS | IP ADDRESS OF FA TO WHICH MN CURRENTLY CONNECTED |
| LIFE TIME | TERM OF VALIDITY FOR BINDING CACHE |
| ENCAPSULATION METHOD | ENCAPSULATION METHOD BETWEEN CN AND FA |

F/G. 41
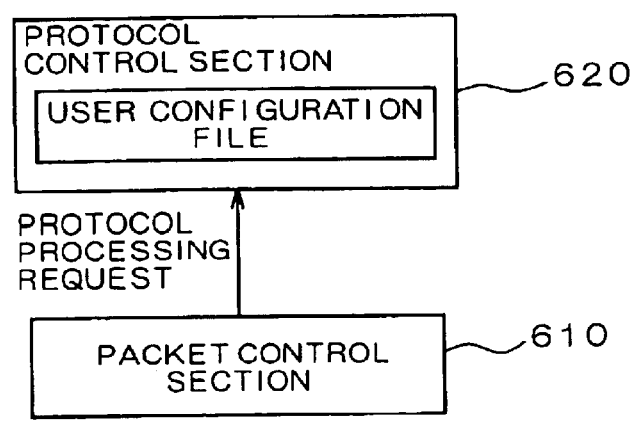
F/G. 42
| STRUCTURAL ELEMENT | EXPLANATION |
|---|---|
| CARE-OF-ADDRESS 1 | CARE-OF-ADDRESS IN ROUTER ADVERTISEMENT |
| CARE-OF-ADDRESS 2 | CARE-OF-ADDRESS IN ROUTER ADVERTISEMENT |

FIG. 44

```
TERMINAL WINDOW
  # SERVICE PROFILE DISPLAY
  # PROFILE NUMBER  1
  # OBJECT ENTITY  1010 0000
  # SOURCE IP ADDRESS  10.10.10.1
  # SOURCE NET MASK  255.255.255.0
  # DESTINATION ADDRESS  10.10.20.1
  # DESTINATION NET MASK  255.255.255.0
  # SOURCE PORT NUMBER  0
  # DESTINATION PORT NUMBER  0
  # SERVICE TYPE  4
  # QoS CLASS  2
  # BAND UPPER LIMIT  255
  # BAND ASSURANCE  0
  #
  #
```

FIG. 47

| STRUCTURAL ELEMENT | EXPLANATION |
|---|---|
| SESSION ID | <NAI OF MN><32 BIT VALUE><OPTION> |
| AAAH ADDRESS | IP ADDRESS OF AAAH SPECIFIED BY NAI OF MN |
| HA ADDRESS | IP ADDRESS OF HA ASSIGNED BY AAAF |
| OLD FA-NAI | NAI OF OLD FA WHERE MN MOVE TO NEW FA |
| PRESENT FA-NAI | NAI OF FA WHICH MN CONNECTED AT PRESENT |
| SCR REQUEST SOURCE ADDRESS | IP ADDRESS OF AAAH THAT HAS REQUESTED SCR |
| SPC | |
| SESSION TIMER | TERM OF VALIDITY FOR THIS TRANSACTION |
| STATUS | PROCESS WAITING, HA REQUESTING, AMA PROCESSING, HA CHANGE REQUESTING, FA CHANGE REQUESTING |

FIG. 50

| STRUCTURAL ELEMENT | EXPLANATION |
|---|---|
| SESSION ID | <NAI OF MN><32 BIT VALUE><OPTION> |
| HA ADDRESS | IP ADDRESS OF HA ASSIGNED BY AAAH |
| HA ASSIGNED AAAF ADDRESS | IP ADDRESS OF AAAF ASSIGNMENT REQUESTED BY AAAH |
| PRESENT AAAF ADDRESS | IP ADDRESS OF AAAF THAT HAS REQUESTED AMR |
| OLD AAAF ADDRESS | IP ADDRESS OF OLD AAAF WHEN AAAF IS CHANGED |
| SESSION TIMER | TERM OF VALIDITY FOR THIS TRANSACTION |
| SPC | |
| STATUS | PROCESS WAITING, HA REQUESTING, HA CHANGE REQUESTING, FA CHANGE REQUESTING, FA CHANGE REQUESTING 2 |

FIG. 51

| STRUCTURAL ELEMENT | EXPLANATION |
|---|---|
| USER NAI | NAI OF MOBILE TERMINAL EQUIPMENT |
| USER SPI | FOR USE WHEN AUTHENTICATING USER |
| USER CONTRACT SERVICE CLASS | INDICATING AVAILABLE SERVICE, QoS, MAXIMUM NUMBER OF PROFILES OF THIS CLASS |
| ACTUAL SERVICE CLASS USED BY USER | CONTRACT SERVICE CLASS OF USER BY DEFAULT, BUT MAY BE HIGHER LEVEL SERVICE CLASS IS APPLICABLE DEPENDING ON CONDITION OF NETWORK UTILIZATION UNDER SUPERVISION OF NETWORK RESOURCE MANAGEMENT SYSTEM |

FIG. 52

| STRUCTURAL ELEMENT | CLASS | | | EXPLANATION |
| --- | --- | --- | --- | --- |
| | 0 | 1 | 2 | 3 | |
| SERVICE CLASS IDENTIFIER | 0 | 1 | 2 | 3 | IDENTIFIER INDICATING CLASS |
| APPLICABLE SERVICE | ALL OFF | SEE FIG. 53 | SEE FIG. 53 | SEE FIG. 53 | INDICATING AVAILABLE SERVICE IN UNIT OF SERVICE CLASS (ON/OFF) |
| MAXIMUM NUMBER OF PROFILES | 0 | 1 | 1 | 1 | MAXIMUM NUMBER OF PROFILES THAT IS ALLOWABLE FOR THIS SERVICE CLASS |

FIG. 53

| SERVICE TYPE | DIFFERENTIATED SERVICE | PACKET FILTERING | SECURITY SERVICE | BAND CONTROL |
|---|---|---|---|---|
| CLASS 0 | OFF | OFF | OFF | OFF |
| CLASS 1 | OFF | OFF | OFF | ON |
| CLASS 2 | OFF | OFF | OFF | ON |
| CLASS 3 | OFF | OFF | OFF | ON |

FIG. 54

| NUMBER | STRUCTURAL ELEMENT | EXPLANATION |
|---|---|---|
| 0 | RESERVATION VALUE | RESERVATION VALUE OF FUTURE |
| 1 | DIFFERENTIATED SERVICE | SERVICE ON BASIS OF DIFFERENTIATED SERVICE (RFC2474, 2475) |
| 2 | PACKET FILTERING | SERVICE FOR FILTERING PACKET WITH IP ADDRESS OF PACKET OR PORT NUMBER |
| 3 | SECURITY SERVICE | SECURE SERVICE USING IPSEC |
| 4 | BAND CONTROL | SERVICE FOR CONTROLLING AVAILABLE BAND FOR MOBILE TERMINAL EQUIPMENT |

FIG. 55

| STRUCTURAL ELEMENT | CLASS | | | |
|---|---|---|---|---|
| CLASS IDENTIFIER | 0 | 1 | 2 | 3 |
| APPLICABLE QoS | 0 | 2 | 3 | 4 |

FIG. 56

| QoS | 0 | 1 | 2 | 3 | 4 |
|---|---|---|---|---|---|
| AVAILABLE BAND | NOT AVAILABLE | 0~100 (kbps) | 0~255 (kbps) | 0~512 (kbps) | 0~1500 (kbps) |
| BAND ASSURANCE | NO | YES | NO | NO | NO |

FIG. 59

| MANAGEMENT ID | MANAGEMENT ENTITY (IP ADDRESS) | MAXIMUM CIRCUIT USAGE EFFICIENCY (%) | THRESHOLD OF MAXIMUM CIRCUIT USAGE EFFICIENCY (%) |
|---|---|---|---|
| 5 | 10.10.10.1 | 45 | 70 |
| 12 | 10.10.20.1 | 42 | 70 |
| 3 | 10.10.30.1 | 35 | 70 |

FIG. 60

| NAI | CONTRACT SERVICE CLASS | SERVICE CLASS ACTUALLY USED | STATUS |
|---|---|---|---|
| Aaa@xxx | 1 | 2 | NORMAL |
| Bbb@yyy | 2 | 2 | NORMAL |
| Ccc@yyy | 1 | 1 | NORMAL |

FIG. 66

| ID | NAME OF WUI PROCESS | TITLE OF FILE | NOTE |
|---|---|---|---|
| a | MAIN SCREEN | Service.php3 | MAIN SCREEN FOR SERVICE CHANGE SYSTEM |
| b | SERVICE REFERENCE SCREEN | Service.php3 | SERVICE REGISTRATION INFORMATION AT PRESENT IS DISPLAYED. |
| c | SERVICE CHANGE SCREEN | Service.php3 | SERVICE REGISTRATION INFORMATION AT PRESENT AND RANGE OF SERVICE CHANGE AREA DISPLAYED. REQUEST FOR CHANGING SERVICE IS AVAILABLE IN RANGE OF SERVICE CHANGE. |
| d | REGISTRATION SUCCESS SCREEN | Success.php3 | REGISTRATION SUCCESS SCREEN IS DISPLAYED WHEN REQUEST FOR CHANGING SERVICE IS SUCCESSFUL. |
| e-1 | ERROR SCREEN | Err.php3 | SERVICE CHANGE ERROR |
| e-2 | ERROR SCREEN | Err.php3 | START UP SERVICE CHANGE SCREEN ERROR |
| e-3 | ERROR SCREEN | Err.php3 | SERVICE REFERENCE SCREEN START UP ERROR |
| f | ISP AUTHENTICATION SCREEN | Service.php3 | USER AUTHENTICATING SCREEN FOR ISP |
| g | INITIAL START SCREEN FOR USER | User.html | LOCAL PAGE FOR USER. INITIAL LOCATION REGISTRATION REQUEST PROCEDURE IS CALLED FROM THIS PAGE. |

FIG. 69

SERVICE CHANGE SYSTEM (SERVICE CHANGE SCREEN)

CONTRACT SERVICE CLASS : 2

| DESIRABLE SERVICE TYPE TO CHANGE | STATUS OF USAGE | SERVICE WITHIN CONTRACT | SERVICE BEYOND CONTRACT | DESIRABLE VALUE |
|---|---|---|---|---|
| ☐ SERVICE TYPE 1 | NOT AVAILABLE | | | |
| ☐ SERVICE TYPE 2 | NOT AVAILABLE | | | |
| ☐ SERVICE TYPE 3 | NOT AVAILABLE | | | |
| ☐ SERVICE TYPE 4 [SERVICE FOR BAND CONTROL] QOS CLASS BAND UPPER LIMIT (BAND ASSURANCE) | NOW APPLYING 2 255 (off) | 0~2 100 (on) / 255 (off) | 0~4 100 (on) /// 255 (off) 512 (off) 1500(off) | 3 1500 (off) |

[APPLICATION]  [TO MAIN SCREEN]  [TO SERVICE CHANGE SCREEN]  [CLEAR]

FIG. 70

| SUCCESS IN REGISTRATION |
|---|
| SERVICE CONTENTS IS CHANGED IN SUCCESSFULLY. |
| (INITIAL LOCATION REGISTERING PROCEDURE IS REQUIRED. PRESS SPECIFIC KEY BOARD.) |
| OK |

FIG. 72

| PASSWORD | |
|---|---|
| ENTER USER NAME AND PASSWORD. | |
| USER NAME : postgres | |
| PASSWORD : xxxxxx | |
| OK  CLEAR  CANCEL | |

MOBILE NETWORK SYSTEM AND SERVICE CONTROL INFORMATION CHANGING METHOD

BACKGROUND OF THE INVENTION

The present invention relates to a mobile network system having an IP service control mechanism enabling the administration and execution of a value added service in unit of a terminal (subscriber) in an IP network system including a mobile environment and a service control information changing method.

There are listed below some abbreviations for use in this specification, which are typically used in the communications field. These abbreviations are suitably utilized for explanation throughout this specification.

AAA . . . Authentication Authorization and Accounting
AAAF . . . Authentication Authorization and Accounting-Foreign
AAAH . . . Authentication Authorization and Accounting-Home
AVP . . . Attribute Value Pair
CLI . . . Command Line Interface
CN . . . Correspondent Node
COPS . . . Common Open Policy Service
FA . . . Foreign Agent
HA . . . Home Agent
HTTP . . . Hyper Text Transfer Protocol
IETF . . . Internet Engineering Task Force
IP . . . Internet Protocol
ISP . . . Internet Service Provider
MN . . . Mobile Node
NAI . . . Network Access Identifier
PBN . . . Policy-Based Networking
RADIUS . . . Remote Authentication Dial In User Service
RFC . . . Request For Comments
SLA . . . Service Level Agreement
SNMP . . . Simple Network Management Protocol
SPC . . . Service Profile Cache
SPDB . . . Service Profile Data Base
UDP . . . User Datagram Protocol
WUI . . . Web User Interface
WWW . . . World Wide Web In an IP network having the audio communication and the data communication integrated and to which a wide variety of terminals are connected, the implementation of a QoS assurance is requisite in order to protect a delay sensitive traffic or a high priority traffic on the business. As a method of realizing the QoS assurance, the methods Int-Serv and Diff-Serv have been proposed, but a Diff-Serv support with less overhead is most likely as the carrier network or back-bone network. However, the Diff-Serv needs a policy setting to the network equipment on the communication path, resulting in the problem that with the Diff-Serv singly the network administration becomes intricate. Therefore, a concept of the PBN (Policy-Based Networking) for collectively effecting the policy setting to the network equipment from the policy server has been proposed mainly by Venda in the United States.

FIG. 77 is a block diagram of the conventional network for explaining the concept of the PBN. In the PBN, the policy server sets an operation policy of network to a network equipment group, and the network equipment group refers to this set policy, thereby implementing the services with the QoS assurance.

As the conventional techniques associated with the mobile IP, a method of employing the Mobile-IP in cooperation with the DIAMETER that is the AAA protocol, and a mobile IP network as disclosed in U.S. Pat. No. 996830024A have been well known. FIG. 78 is a block diagram of the mobile IP network as disclosed in U.S. Pat. No. 996830024A.

For example, with the method (draft-calhoun-diameter-mobileip-03.txt) of employing the Mobile-IP in cooperation with the DIAMETER (draft-calhoun-diameter-10.txt) that is the AAA protocol, in an IP network where a plurality of local area networks are present, the Mobile-IP for supporting the location registration of the mobile terminal equipment and the transfer of IP packets destined to the mobile terminal equipment and the DIAMETER for supporting the AAA in the network where there are a plurality of ISPs are employed in cooperation, whereby the IP packet transfer to the Mobile-IP mounting terminal and the AAA were enabled in the environment where there are a plurality of ISPs.

In order to effect the service control to deal with the mobile terminal equipment in the IP network where there are a plurality of ISPs, a method was disclosed in U.S. Pat. No. 996830024A, in which the service control information is set to the HA or FA that is an edge apparatus within the network at the time of executing an initial location registration phase of the mobile terminal equipment in accordance with the mobile IP and the DIAMETER. In particular, in order to implement a service control method for individual subscribers on a plurality of ISP networks, the service control information is set to the node on the transfer path of IP packets for the mobile terminal equipment in making an initial location registering procedure which is performed when the mobile terminal equipment is moved.

By the way, considering the policy setting for each mobile terminal equipment in the PBN, it is required that the policy may be reset for all the network equipment groups that can possibly accommodate the mobile terminal equipment at the time of adding or altering the policy, resulting in a problem that the policy setting process amount is increased over the overall network. Further, in order to apply the information notified with the PBN to a fundamental service provided individually such as the mobile IP, the determination of the specifications for application to services and the review for the mounting method were required.

In particular, in a seamless global network comprising various providers or carriers for supporting the mobile terminal equipment, all the local area networks must be able to determine the policy for the user who has the possibility of connection and set the information to the network equipment. To effect this with the PBN, it is requisite that the policy information of all the users is carried locally, or the information is preset to all the network equipment having the possibility. It is very inefficient or unrealistic that the policy information is carried or set to about hundred million users. Also, if the policy information of all the users is carried in the network equipment at any time, the memory capacity of the network equipment is increased, resulting in reduced processing ability. On the contrary, in the case where a method of making an inquiry to the policy server at each time is adopted, the overhead due to the inquiry may occur, bringing about the risk that the SLA can not be followed.

Also, the method of employing the Mobile-IP in cooperation with the DIAMETER that is the AAA protocol supports a function of setting the information required for the transfer of packets to the mobile terminal equipment to the FA or HA which is the edge apparatus within the network, but not a function of setting the service control information to deal with the mobile terminal equipment.

In the method as disclosed in U.S. Pat. No. 996830024A, the service control information to deal with the mobile terminal equipment is set only when the initial location registration due to the movement of the mobile terminal equipment is effected, and the service control information to be set is the fixed information produced at the time when the mobile terminal equipment has made a contract with the ISP, which information can not be altered flexibly online upon a request from the mobile terminal equipment. The service control for the user is agreed by the user who has made a contract with the ISP, and fixed, and is not adaptive to a network service form for the user that occurs after the contract, resulting in a problem that any flexible measure such as utilizing an idle network resource upon a request from the user can not be taken.

SUMMARY OF THE INVENTION

The present invention has been achieved in the light of the above-mentioned problems, and it is an object of the invention to provide a mobile network system that allow the effective use of idle network resources, and a service control information changing method.

The mobile network system comprises a home network to which the mobile terminal equipment users subscribe, a foreign network other than the home network, and a network management system for making the resource management of the whole network and which is connected to the home network. The home network has a home agent apparatus having a home address to cope with the mobile terminal equipment and relaying a packet transmitted from a correspondent node to the mobile terminal equipment, and a home server apparatus for managing the authentication, authorization and accounting concerning the home network. The foreign network has a foreign agent apparatus for relaying the packet transferred from the home agent apparatus to the mobile terminal equipment, and a foreign server apparatus for managing the authentication, authorization and accounting concerning the foreign network. By transmitting a registration request message containing the service content changing information from the mobile terminal equipment to the foreign agent apparatus, the service control information concerning the mobile terminal equipment which is possessed by each of the foreign agent apparatus, the foreign server apparatus, the home server apparatus, the home agent apparatus and the correspondent node is updated. Since the service control information can be updated by transmitting the registration request message from the mobile terminal equipment, the network resource can be effectively used upon a request from the user (or the mobile terminal equipment) when there is an idle network resource. When the registration request message is transmitted from the mobile terminal equipment, the service control information of the apparatuses involving the communication between the mobile terminal equipment and the correspondent node is only updated. Therefore, the apparatuses to be updated can be suppressed to a minimum, the procedure required for the updating process of the service control information can be simplified, and the costs of this updating process can be reduced.

Also, a mobile network system of the present invention comprises a home network to which the mobile terminal equipment users subscribe, a foreign network other than the home network, and a network management system for making the resource management of the whole network and which is connected to the home network. The home network has a home agent apparatus having a home address to cope with the mobile terminal equipment and relaying a packet transmitted from a correspondent node to the mobile terminal equipment, and a home server apparatus for managing the authentication, authorization and accounting concerning the home network. The foreign network has a foreign agent apparatus for relaying the packet transferred from the home agent apparatus to the mobile terminal equipment, and a foreign server apparatus for managing the authentication, authorization and accounting concerning the foreign network. By making a request of changing the service content from the network management system to the home server apparatus, the service control information concerning the mobile terminal equipment which is possessed by each of the foreign agent apparatus, the foreign server apparatus, the home server apparatus, the home agent apparatus and the correspondent node is updated. Since the service control information can be updated upon a request from the network management system, the contents of the network resource available to the user can be set up in accordance with the service conditions of the network resource, making it possible to effectively use the network resource.

The home server apparatus has an access right to a service information database for storing the present service content information for every mobile terminal equipment, and when the registration request message is transmitted from the mobile terminal equipment, the service content information stored in the service information database is desirably changed within a range of the service content stipulated by contract for the mobile terminal equipment. Since the service information database is changed within the range of the service content stipulated by contract, the network resources can be effectively utilized by releasing the excess network resource in accordance with the practical amount of communication, in the case where a wide communication band is secured in contract but a small number of packets are actually transmitted or received.

It is desirable that the home server apparatus has an access right to the service information database that stores the present service content information for every mobile terminal equipment, and when the registration request message is transmitted from the mobile terminal equipment, make a negotiation with the network management system, if the service content information to be changed is outside a range of service contents stipulated by contract for the mobile terminal equipment. Since the negotiation is made between the home server apparatus and the network management system at the time of changing the service content, it is possible to make a change beyond the range of contract in accordance with the idle situation of network resources, and to effectively use the whole network resources.

The home server apparatus desirably enables the mobile terminal equipment to perform an initial location registration procedure with the aim at changing the service control information at a moment when the service content information stored in the service information database is changed. By enabling the mobile terminal equipment to perform the initial location registration procedure at a moment when the service content information for every mobile terminal equipment which the home server apparatus carries is changed, it is possible to set up the service content that has appropriated the initial location registration procedure performed by the mobile terminal equipment.

Upon receiving a predetermined message corresponding to the initial location registration procedure, the server apparatus desirably updates, on the basis of the service content information after change that is stored in the service information database, the service control information possessed by each of the foreign agent apparatus, the foreign server apparatus, the home server apparatus, the home agent apparatus, and the correspondent node which are present on a communication path between the mobile terminal equipment and the correspondent node. Since the service control information of each apparatus on the communication path between the mobile terminal equipment and the correspondent node is updated in accordance with the initial location registration procedure performed by the mobile terminal equipment, the service conditions of the network resources can be changed suitably.

It is desirable that the home agent apparatus has a list of addresses for the correspondent nodes that become a communication partner, and the home server apparatus updates the service control information for one or more correspondent nodes contained in this list. Since one or more correspondent nodes that become a communication partner of the mobile terminal equipment are known beforehand, and the service control information is updated for the one or more correspondent nodes, the service control of the network can be effected on the basis of the service contents after change when a packet is transmitted from each correspondent node to the mobile terminal equipment.

It is desirable that the home agent apparatus dynamically updated, and the service control information is set to the newly added correspondent node. Therefore, when a packet is transmitted from the newly added correspondent node to the mobile terminal equipment, the service control of the network can be made on the basis of the latest service contents at any time.

It is desirable that the home agent apparatus has a list of addresses for the correspondent nodes that become a communication partner, and that the home sever apparatus sets the binding cache information indicating a connecting state between the mobile terminal equipment and the home agent apparatus to the correspondent nodes contained in the list, in a process at the initial registration phase of the mobile terminal equipment. Since a binding cache indicating on which path the communication takes place is set to the correspondent nodes that become a communication partner of the mobile terminal equipment at the initial registration phase, the latest service contents can be reflected when a packet is transmitted from the correspondent node to the mobile terminal equipment.

The home agent apparatus desirably instructs all the correspondent nodes contained in the list to reset the binding cache information, when the foreign network to which the mobile terminal equipment is connected is changed. Since the contents of the binding cache information set in each correspondent node are updated every time when the mobile terminal equipment is moved and the foreign network connected thereto is changed, the packet can be transmitted from the correspondent node to the mobile terminal equipment after movement.

The home agent apparatus desirably deletes the unnecessary addresses of correspondent nodes from the list by performing an aging process. By deleting the unnecessary addresses of correspondent nodes from the list, the network resources can moved and the foreign network connected thereto is changed, the packet can be transmitted from the correspondent node to the mobile terminal equipment after movement.

The home agent apparatus desirably deletes the unnecessary addresses of correspondent nodes from the list by performing an aging process. By deleting the unnecessary addresses of correspondent nodes from the list, the network resources can be saved.

When the processing in the correspondent nodes contained in the list is ended, it is desirable to omit a predetermined response message to be transmitted to the home agent apparatus. In the case where there are a great number of correspondent nodes contained in the list, a transmission/reception procedure of the response message to be transmitted from each correspondent node at the time when the setting of the service control information or binding cache is ended is omitted, thereby making it possible to reduce the time required for the setting and relieve the processing load.

The mobile terminal equipment desirably allows the reference with indication to the content of the service control information set for each mobile terminal equipment on the basis of a registration response message transmitted from the foreign agent apparatus in correspondence to the registration request message. Since the user can know the content of the service control information using the mobile terminal equipment, the prevention of false setting or the reconfirmation of the service content can be made easily.

A service control information changing method in the mobile network of the invention comprises the steps of changing the service control information of the user that is managed in a home network to which the user of the mobile terminal equipment subscribes when the mobile terminal equipment is present in a foreign network other than the home network, transmitting a registration request message to the home network, after changing the service control information, transmitting the service control information after change from the home network having received the registration request message to the foreign network where the mobile terminal equipment is present, and receiving a service based on the service control information after change at the mobile terminal equipment in the foreign network. Since the service control information can be updated in accordance with a registration request message transmitted from the mobile terminal equipment, the mobile terminal equipment can receive the service based on the service control information after change in the foreign network.

BRIEF DESCRIPTION OF THE DRAWINGS

FIG. 2 is a functional block diagram of each apparatus contained in the mobile IP network shown in FIG. 1;

FIG. 3 is a table showing corresponding relations among a variety of kinds of messages input or output into or from functional entities contained in the mobile IP network of one embodiment;

FIG. 4 is a table showing corresponding relations among a variety of kinds of messages input or output into or from functional entities contained in the mobile IP network of one embodiment;

FIG. 8 is a table showing a format of an MIP registration request message;

FIG. 9 is a table showing a format of an MN-SPC extension contained in the MIP registration request message shown in FIG. 8;

FIG. 10 is a table showing a format of an MIP registration reply message;

FIG. 11 is a table showing a format of an MIP binding update message;

FIG. 12 is a table showing a format of a profile cache extension contained in the MIP binding update message shown in FIG. 11;

FIG. 13 is a table showing a format of an MIP binding acknowledge message;

FIG. 14 is a table showing a format of a DIAMETER protocol stack;

FIG. 15 is a table showing a format of a UDP header contained in the DIAMETER protocol stack shown in FIG. 14;

FIG. 16 is a table showing a format of a DIAMETER header;

FIG. 17 is a table showing a format of an AMR (AA-Mobile-Node-Request) message;

FIG. 18 is a table showing a format of an HMR (Authentication Request) message;

FIG. 19 is a table showing a format of an AMA (AA-Mobile-Node-Answer) message;

FIG. 23 is a table showing a format of a Service Profile Cache AVP included in the HMR message or the like;

FIG. 25 is a table showing a format of a service profile;

FIG. 27 is a table showing the contents of the FA session transaction provided in the protocol control section;

FIG. 28 is a table showing a specific example of the service profile cache which is set in the service control section;

FIG. 29 is a table showing a specific example of the visitor list which is set in the transfer control section;

FIG. 32 is a table showing a specific example of the mobile connection that is set in the transfer control section;

FIG. 33 is a table showing a specific example of the CN list that is set in the transfer control section;

FIG. 34 is a table showing the contents of an HA session transaction provided in the protocol control section;

FIG. 39 is a table showing a specific example of the binding cache to be set in the transfer control section;

FIG. 41 is a functional block diagram showing a detailed configuration of the MN;

FIG. 42 is a table showing the contents of an agent list carried by the MN;

FIG. 44 is a view showing a display example on the user console;

FIG. 47 is a table showing the contents of the AAAF session transaction provided in the protocol control section;

FIG. 50 is a table showing the contents of the AAAH session transaction provided in the protocol control section;

FIG. 51 is a table showing the contents of SPDB;

FIG. 52 is a table showing the contents of a service class table;

FIG. 53 is a table showing a specific example of applicable service contained in the service class table as shown in FIG. 53;

FIG. 54 is a table showing the contents of four kinds of services;

FIG. 55 is a table showing the contents of service proper information for the band control;

FIG. 56 is a table showing the contents of applicable QoS;

FIG. 59 is a table showing a specific example of a traffic management table;

FIG. 60 is a table showing a specific example of a user contract database;

FIG. 66 is a diagram showing a list of screen to be displayed in the WUI process;

FIG. 69 is a diagram showing a display example of the service change screen;

FIG. 70 is a diagram showing a display example of the registration success screen;

FIG. 72 is a diagram showing a display example of the ISP authentication screen;

DESCRIPTION OF THE PREFERRED EMBODIMENT

A mobile IP network of one embodiment to which a mobile network system of the present invention is applied will be described below with reference to the drawings. The invention is applicable to the mobile IP protocols as defined in the RFC2002 and all the extensions in the future.

Overall configuration and operation of network

Figure 1:
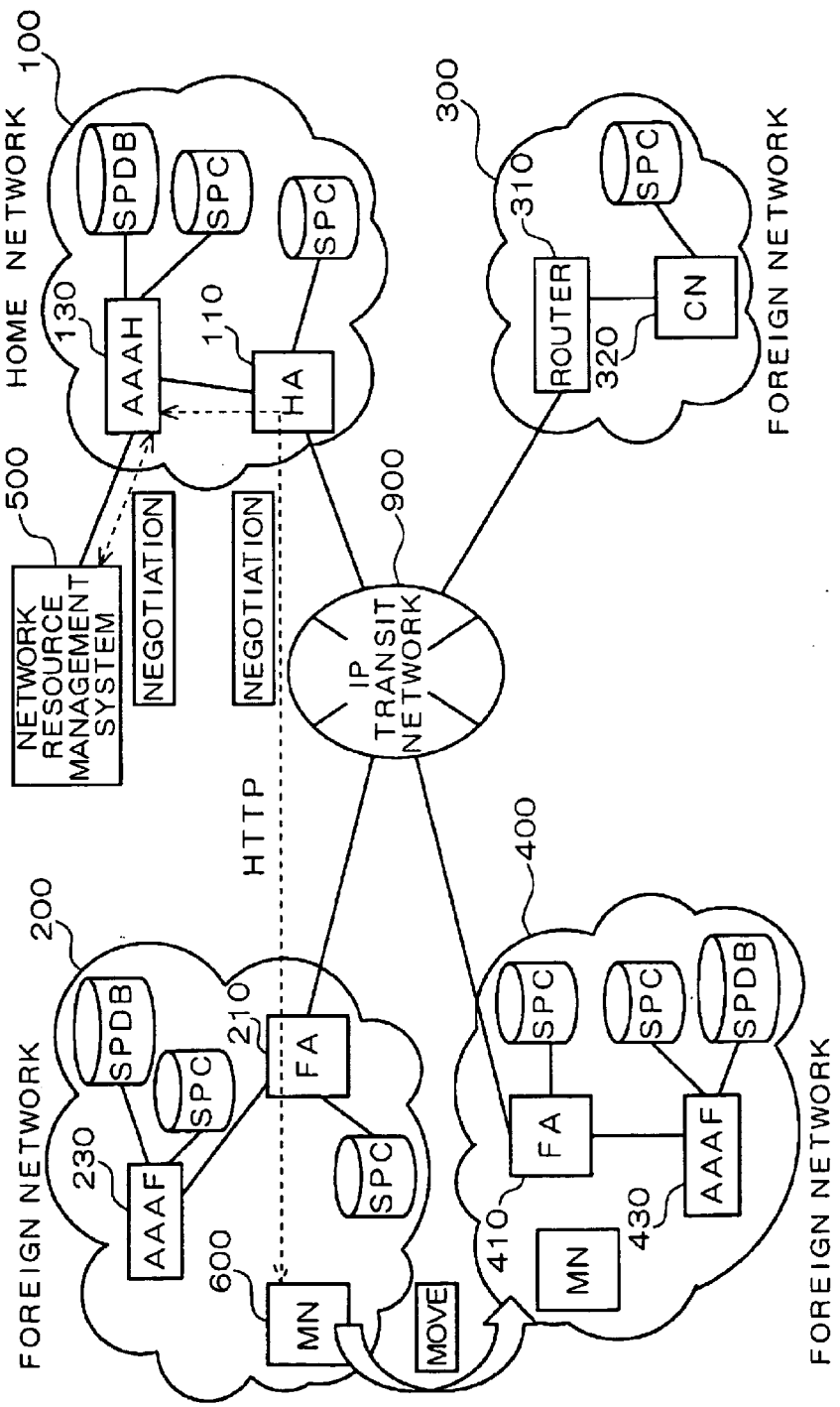
FIG. 1 is an overall block diagram of a mobile IP network of one embodiment to which the present invention is applied.

FIG. 1 is an overall block diagram of a mobile IP network of one embodiment to which the present invention is applied. FIG. 2 is a functional block diagram of each apparatus contained in the mobile IP network as shown in FIG. 1.

As shown in FIG. 1, the mobile IP network of this embodiment comprises a home network 100 connected via an IP transit network 900, three foreign networks 200, 300, 400, and a network resource management system 500 connected to the home network 100.

The home network 100 is one to which the user of an MN 600 (mobile terminal equipment, including the terminals movable from one place to another, for example, a notebook PC or portable terminal that supports the TCP/IP) subscribes, and includes an HA (home agent) 110 and an AAAH (authentication, authorization, accounting home server) 130. The HA 110 is a node for making the communication on behalf of the home network 100, and one of the functional entities as defined in an RFC 2002. The HA 110 has a home address assigned to the MN 600, and is provided with a function of the router. Also, the HA 110 has both a mobile IP server function (MSF) and a DIAMETER client function (DCF). The AAAH 130 is an AAA (authentication, authorization, accounting) server of the home network 100 having the subscriber data of the authentication requesting user. The AAA server as used herein means a group of servers for effecting the Authentication, Authorization and Accounting, and a name as employed in the IETF. The AAAH 130 has an interface for user service contract change negotiation with the network resource management system 500, and performs an operation of setting a service profile to each functional entity (e.g., HA 110) within the home network 100 or other foreign networks 200 to 400 in accordance with the result of negotiation. This AAAH 130 has a DIAMETER server function (DSF).

In the present invention, there is no need of specifying the protocol (i.e., AAA protocol) used by the AAA server, but in this embodiment, a case of using the DIAMETER protocol under review in the IETF will be described below. The AAA protocol is mountable on all the protocols which can transfer the information as to the authentication, authorization, accounting and policy. To convey the new information required in the invention, an extensible attribute parameter called AVP as defined in the DIAMETER protocol is used.

A foreign network 200 is one to which the MN 600 is moved, including an FA (foreign agent) 210 and an AAAF (authentication, authorization, accounting foreign server) 230. The FA 210 is a node for making the communication on behalf of the foreign network 200, and is one of the functional entities as defined in the RFC2002. This FA 210 has no home address assigned to the MN 600, but has a Care-of-Address that is an address of its own node, and is provided with a function of the router. Also, the FA 210 has both a mobile IP server function (MSF) and a DIAMETER client function (DCF), like the HA 110. The AAAF 230 is an AAA server of the network having no subscriber data of the authentication request user. The AAAF 230 specifies the AAAH 130 on the basis of an NAI (Network Access Identifier) of the user, and acts for the message exchange between the FA 210 and the AAAH 130. This AAAF 230 has a DIAMETER server function (DSF).

A foreign network 300 is one which contains a CN (Correspondent Node) 320, and is connected, for example via a router 310, to the IP transit network 900. The CN 320 is a node for making the communication with the MN 600, and has a mobile IP client function (MCF).

A foreign network 400 is one to which the MN 600 is moved, including an FA (foreign agent) 410 and an AAAF (authentication, authorization, accounting foreign server) 430. The FA 410 is a node for making the communication on behalf of the foreign network 400, and is one of the functional entities as defined in the RFC2002. The FA 410 and the AAAF 430 have the same configuration as the FA 210 and the AAAF 230 contained in the foreign network 200 as described above.

The network resource management system 500 is a functional entity for managing the traffic situation within the mobile IP network or the user service contract information in this embodiment. This network resource management system 500 complies with a level-up contract from the user in accordance with a remaining situation of the network resources. Also, the network resource management system 500 has an interface with the AAAH 130 within the home network 100, and performs an operation via the interface in accordance with a service change request from the user. The interfaces for use may include SNMP, COPS, CLI, and HTTP.

The mobile IP network of this embodiment has the above configuration, and its basic operation will be described below. For example, if an MN 600 belonging to the foreign network 200 is moved to the foreign network 400, the MN 600 makes a registration into the FA 410 contained in the foreign network 400 and notifies its own home address. This FA 410 registers the home address information of the MN 600 registered and its own care-of-address information into the HA 110 within the home network 100. Thereafter, a packet from the CN 320 belonging to the foreign network 300 to the MN 600 is transferred to the home network 100, using a home address of the MN 600, but the HA 110 captures, encapsulates and transfers this packet to the FA 410 (tunneling). The FA 410 that has received this encapsulated packet transfers the packet to the MN 600 by referring to the home address of the MN 600. The MN 600 that has received this packet can know an IP address of the CN 320 by referring to a transmission source IP address contained in a header section of the IP packet, and therefore can also transfer the packet directly to the CN 320, neither via the FA 410 nor the HA 110. In this way, the packet can be transmitted or received between the MN 600 and the CN 320, without changing the IP address of the MN 600.

The HA 110 corresponds to a home agent apparatus; the AAAH 130 corresponds to a home server apparatus; the FA210, 410 correspond to a foreign agent apparatus; the AAAF 230, 430 corresponds to a foreign server apparatus; and the network resource management system 500 corresponds to a network management system. Also, an SP (Service Profile) as will be described later corresponds to the service control information, and an SPDB (Service Profile Data Base) corresponds to a service information database.

FIGS. 3 and 4 are tables showing the corresponding relations among a variety of kinds of messages input or output into or from the functional entities (MN, CN, HA, FA, AAAH, AAAF) contained in the mobile IP network of this embodiment.

A variety of kinds of messages input or output into or from the functional entities are largely classified into a mobile IP message and a DIAMETER message. In FIGS. 3 and 4, an MIP (mobile IP) registration request, an MIP registration reply, an MIP binding update, and an MIP binding acknowledge are the mobile IP messages. Also, an HAR (HA registration request), an HAA (HA registration response), an AMR (AA-Mobile-Node-Request), an AMA (AA-Mobile-Node-Answer), an SCR (service change request), and an SCA (service change answer) are the DIAMETER messages.

Figure 5:
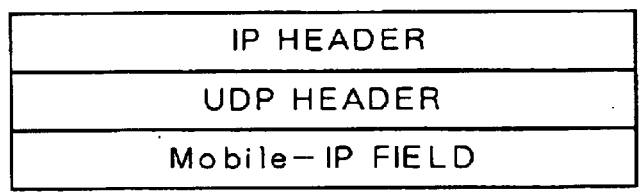
FIG. 5 is a table showing a format of a mobile IP protocol stack.

FIGS. 5 to 13 are tables showing the formats of mobile IP messages. FIG. 5 is a format table of a mobile IP protocol stack. As shown in FIG. 5, the mobile IP protocol stack contains an IP header, a UDP header, and a Mobile-IP field.

Figure 6:
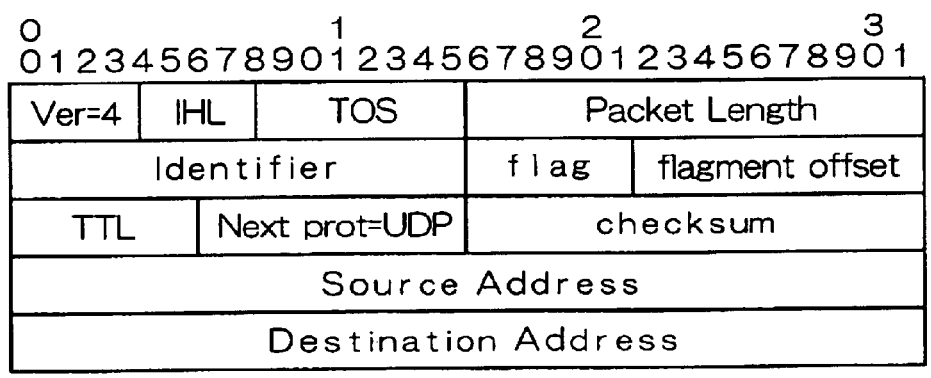
FIG. 6 is a table showing a format of an IP header shown in FIG. 5.

FIG. 6 is a format table of the IP header as shown in FIG. 5. For example, this format is in the case (IPv4) where the IP version is 4.

Figure 7:
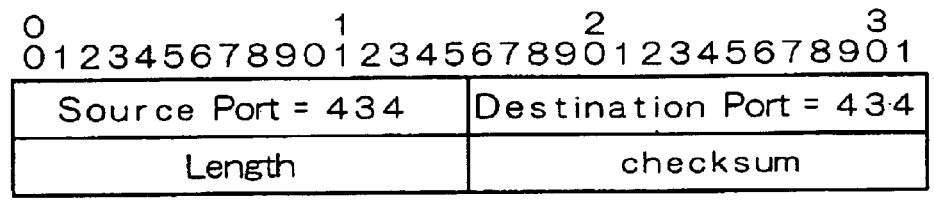
FIG. 7 is a table showing a format of a UDP header shown in FIG. 5.
Figure 20:
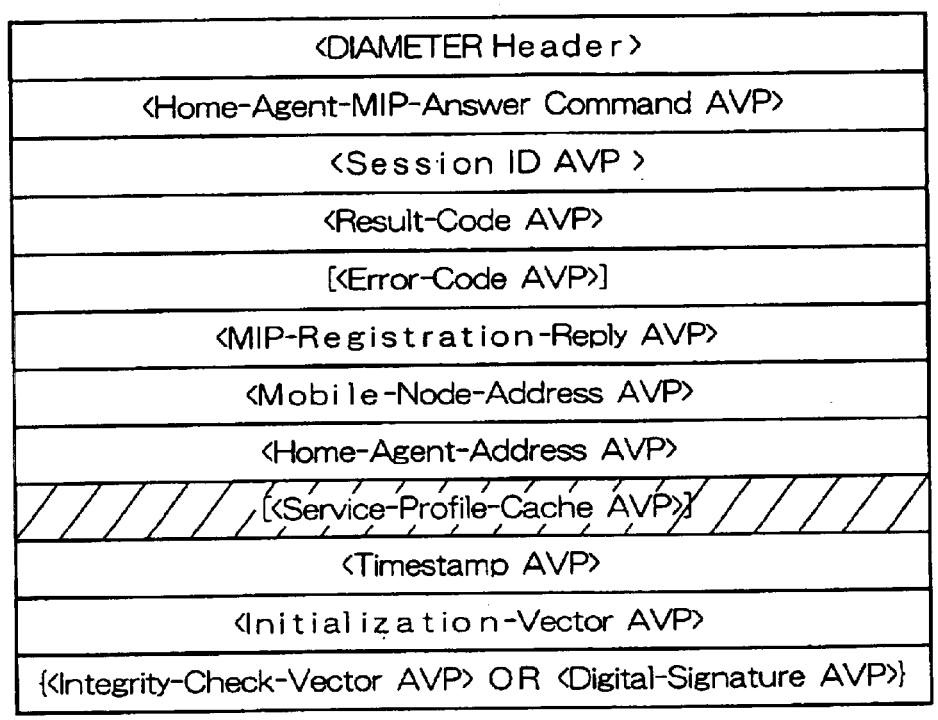
FIG. 20 is a table showing a format of an HMA (Authentication Response) message.
Figure 21:
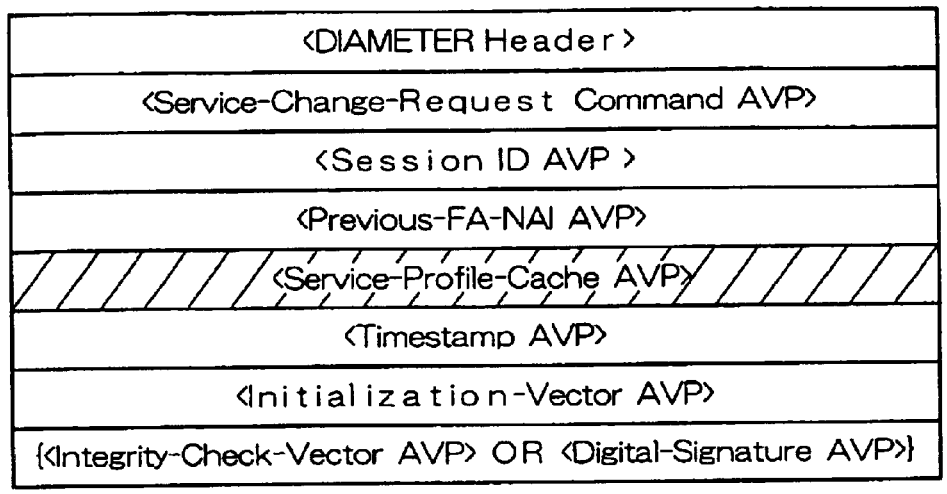
FIG. 21 is a table showing a format of an SCR (Service Change Request) message.
Figure 22:
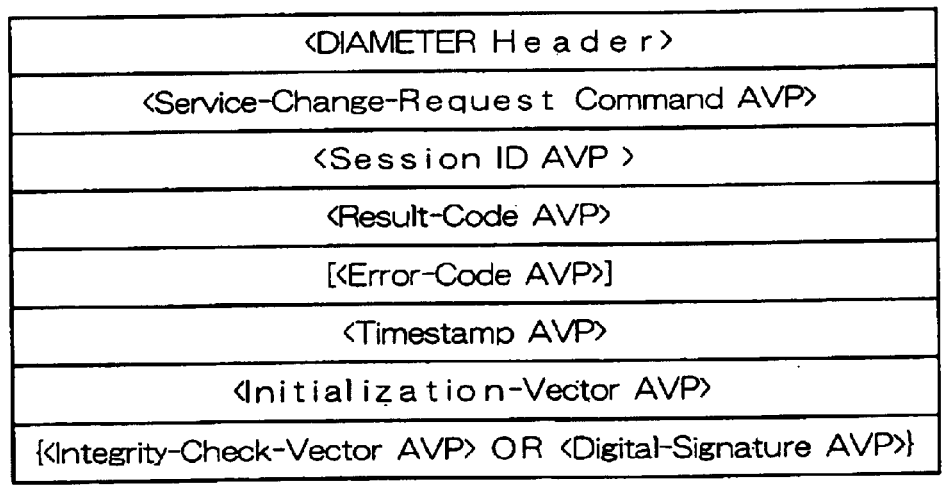
FIG. 22 is a table showing a format of an HMR (Service Change Answer) message.

FIG. 7 is a format table of the UDP header as shown in FIG. 5. In the UDP header useful for the input or output of the mobile IP message, each value of a source port and a destination port is set to "434."

FIG. 8 is a format table of the MIP registration request message stored in the Mobile-IP field as shown in FIG. 5. As shown in FIG. 8, the MIP registration request message includes a home address, an HA address, a care-of-address, and a message identifier, and additionally includes an MN-HA authentication extension, an MN-AAA authentication extension, an MN-NAI extension, and an MN-SPC extension.

FIG. 9 is a format table of the MN-SPC extension contained in the MIP registration request message as shown in FIG. 8. This MN-SPC extension contains an SP (Service Profile) as the service control information in a data field.

FIG. 10 is a format table of the MIP registration reply message stored in the Mobile-IP field as shown in FIG. 5. This MIP registration reply message includes a home address, an HA address, and a message identifier, and additionally includes an MN service profile extension.

FIG. 11 is a format table of the MIP binding update message stored in the Mobile-IP field as shown in FIG. 5. This MIP binding update message includes a home address, a care-of-address, and a message identifier, and additionally includes a profile cache extension.

FIG. 12 is a format table of the profile cache extension contained in the MIP binding update message as shown in FIG. 11. This profile cache extension includes an SP (Service Profile) as the service control information in a data field.

FIG. 13 is a format table of the MIP binding acknowledge message stored in the Mobile-IP field as shown in FIG. 5. This MIP binding acknowledge message includes a home address and a message identifier.

FIGS. 14 to 22 are the tables showing the format of the DIAMETER message. FIG. 14 is a format table of a DIAMETER protocol stack. As shown in FIG. 14, the DIAMETER protocol stack includes an IP header, a UDP header, a DIAMETER header, and a DIAMETER payload. Herein, the IP header is the same as that of the mobile IP protocol stack as described above.

FIG. 15 is a format table of the UDP header included in the DIAMETER protocol stack as shown in FIG. 14. In the UDP header useful for the input or output of the DIAMETER message, both a source port and a destination port are set to "RADIUS."

FIG. 16 is a format table of the DIAMETER header included in the DIAMETER protocol stack as shown in FIG. 14.

FIG. 17 is a format table of an AMR (AA-Mobile-Node-Request) message stored in the DIAMETER header and the DIAMETER payload included in the DIAMETER protocol stack as shown in FIG. 14. Similarly, FIGS. 18, 19, 20, 21 and 22 are format tables of an HAR message, an AMA message, an HAA message, an SCR message, and an SCA message, respectively.

Figure 23:
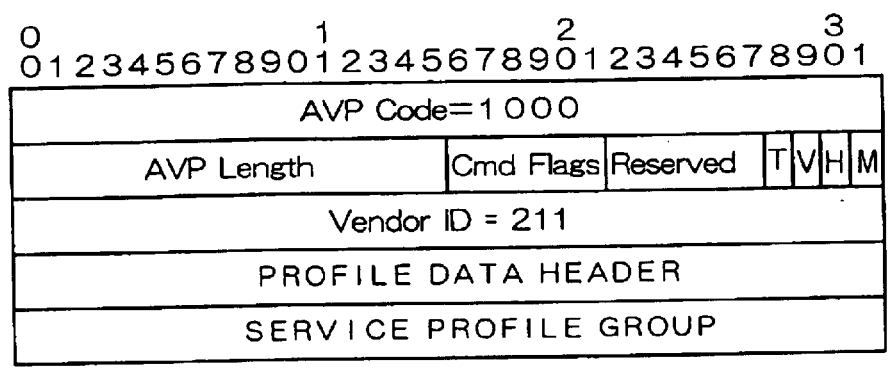
Figure 24:
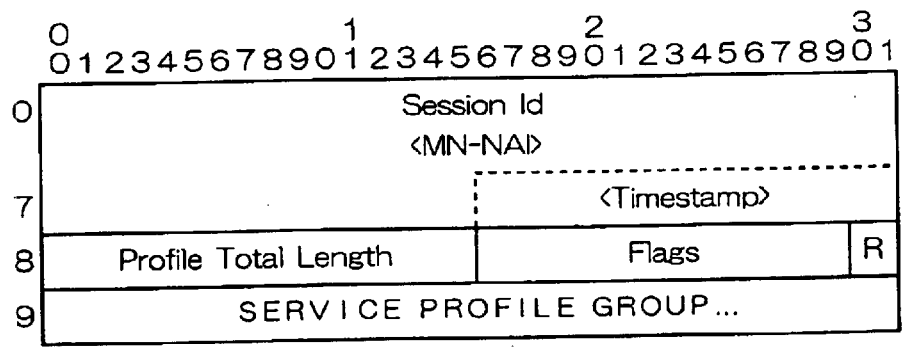
FIG. 24 is a table showing a format of a profile data header.

FIG. 23 is a format table of a Service-Profile-Cache AVP included in the HMR message, the AMA message, the HMA message, and the SCR message. FIG. 24 is a format table of a profile data header included in the Service-Profile-Cache AVP as shown in FIG. 23. FIG. 25 is a format table of a service profile constituting a group of profiles included in the Service-Profile-Cache AVP as shown in FIG. 23. The service profile as shown in FIG. 25 has various Extensions appended corresponding to the services provided to each user. For example, IPSVC-DiffServe Extension, IPSVC-filter Extension, IPSVC-security Extension, and IPSVC-Resource Extension are appended corresponding to four services of the Diff-Serv, the packet filtering, the security service, and the band control.

Detailed Configuration and Operation of Functional Entities

The detailed configuration and operation of functional entities such as FA210, HA110 and so on will be described below.

FA

Figure 26:
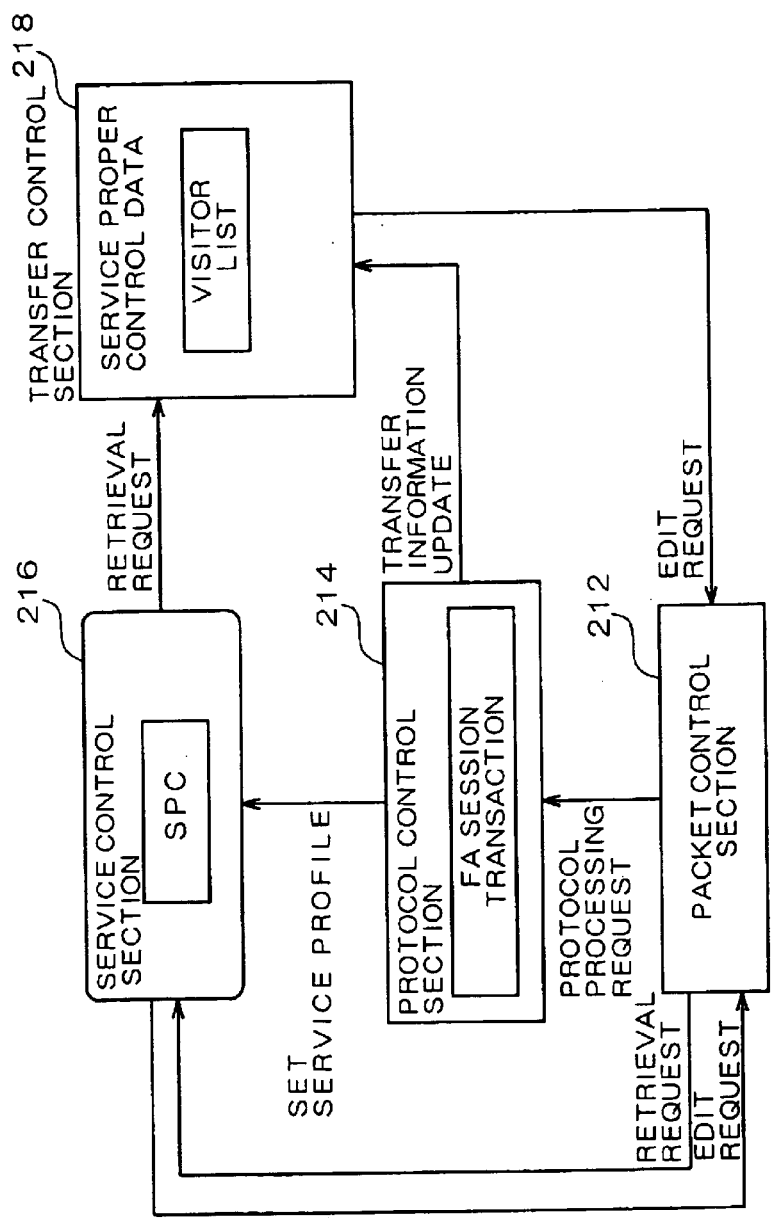
FIG. 26 is a functional block diagram showing a detailed configuration of FA.

FIG. 26 is a functional block diagram showing a detailed configuration of an FA 210. As shown in FIG. 26, the FA 210 comprises a packet control section 212, a protocol control section 214, a service control section 216, and a transfer control section 218. Note that an FA 410 has the same configuration as the FA 210, and the FA 210 will be only described below in detail.

The packet control section 212 has a packet filter function to bracket the packets into a protocol packet and a data packet by discriminating the packet header. Also, it performs the editing and transfer process of packets in accordance with an instruction of the service control section 216 and the transfer control section 218.

The protocol control section 214 performs the processing for the mobile IP and the DIAMETER protocol. This protocol control section 214 has an FA session transaction for managing a DIAMETER session to set the SPC (Service Profile Cache).

FIG. 27 is a table showing the contents of the FA session transaction provided in the protocol control section 214. As shown in FIG. 27, the FA session transaction includes a session ID and a session timer. The "session ID" is the NAI of the MN 600. The "session timer" indicates the term of validity for this transaction.

The service control section 216 has a service profile cache that is a set of service control information.

FIG. 28 is a table showing a specific example of the service profile cache which is set in the service control section 216. Note that this service profile cache is also provided not only in the FA 210 but also in the HA 110 or CN 320. As shown in FIG. 28, the service profile cache includes a profile number, an object entity, a source IP address, a source net mask, a destination address, a destination net mask, a source port number, a destination port number, and the band control extension information. This band control information contains the service type, the QoS class, the band upper limit, and the presence or absence of band assurance.

The transfer control section 218 has a visitor list as the service proper control data that is required to manage the mobile IP.

FIG. 29 is a table showing a specific example of the visitor list that is set in the transfer control section 218. As shown in FIG. 29, the visitor list contains an IP source address, a link layer source address, a UDP source port, an HA address, a registration request identifier field, a life time, and the authentication information. The "IP source address" is a home address of the MN 600 that is notified with the MIP registration request message or AMA message. The "link layer source address" is an address of the link layer (MAC) in the MN 600. The "UDP source port" is a UDP source port number of the MN 600. The "HA address" is an address of the HA 110 for forwarding the MIP registration request message, and is notified to the FA 210, using the MIP registration request message or AMA message. The "registration request identifier field" is one for associating the request message with the response message. The "life time" is the term of validity for the MIP registration request message. The "authentication information" is the authentication information useful for the FA 210 to authenticate the MN 600.

Figure 30:
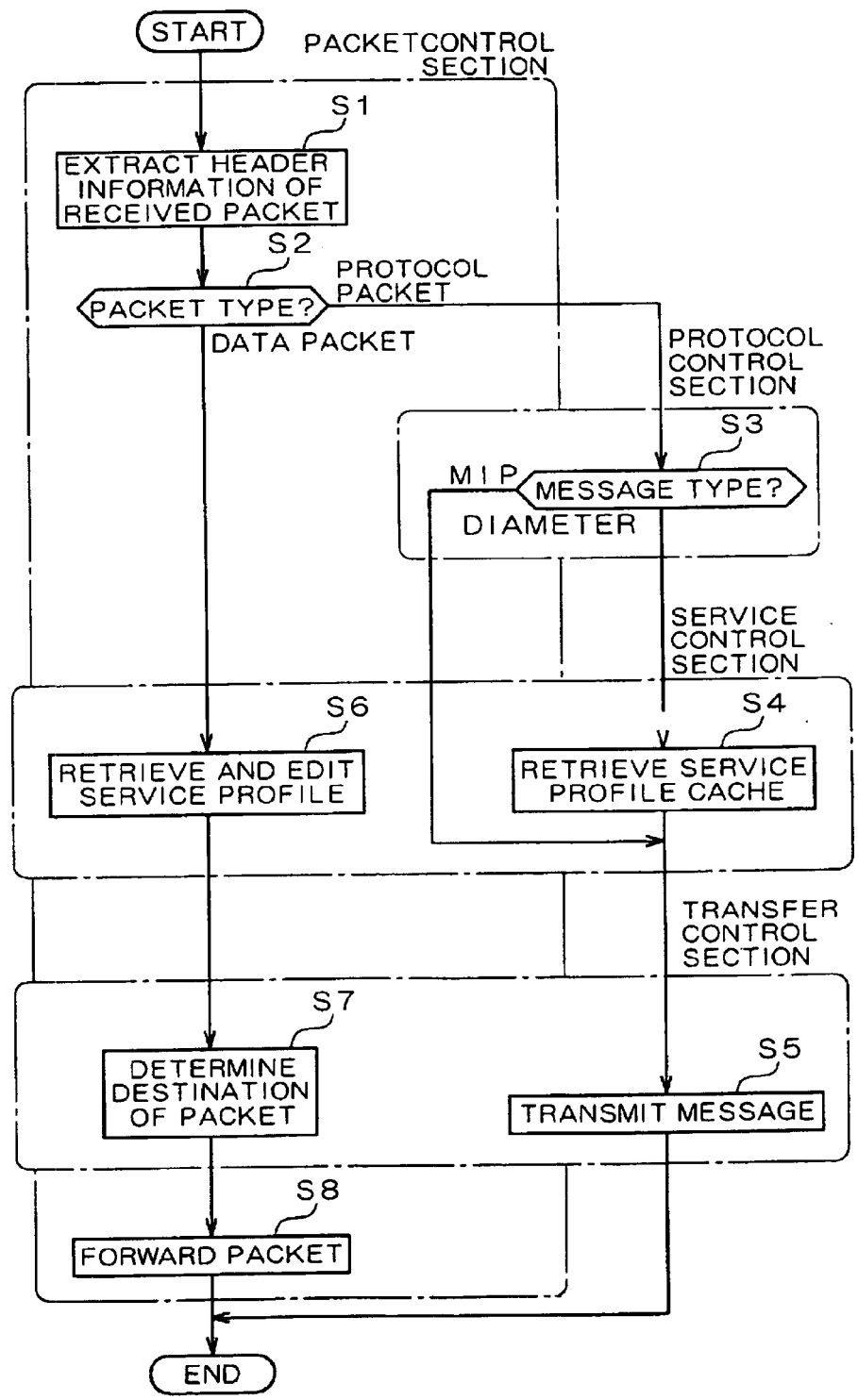
FIG. 30 is a flowchart showing a schematic operation procedure of FA involving the transmission or reception of the packet.

The FA 100 has such a configuration, and its schematic operation will be described below. FIG. 30 is a flowchart showing a schematic operation procedure of the FA 100 involving the transmission or reception of the packet.

The packet control section 212 receives a packet and then extracts the IP header information contained in the received packet (step S1). Then, the packet control section 212 determines whether or not the received IP packet is a data packet or a protocol packet, on the basis of the reception address and the port number contained in the extracted IP header information (step S2).

Case of Protocol Packet

In the case where the received IP packet is the protocol packet, a protocol processing request is issued from the packet control section 212 to the protocol control section 214. The protocol control section 214 brackets the message type of the received message into a mobile IP message and a DIAMETER message, based on the port number contained in the UDP header as shown in FIGS. 7 and 15 (step S3).

If the message type is the DIAMETER message and a service profile cache AVP is contained in the message, the service control section 216 retrieves and changes the service profile cache (step S4). The transfer control section 218 generates and updates the service proper control data (visitor list) corresponding to the received DIAMETER message, and then transmits a message as defined in the protocol (step S5).

Case of Data Packet

In the case where the received IP packet is the data packet, the packet control section 212 sends the extracted head information and makes a retrieval request to the service control section 216. The service control section 216 retrieves the matched service profile, and edits the packet on the basis of the routing/packet editing information contained therein (step S6). The transfer control section 218 determines a packet forwarding destination by referring to the service proper control data (visitor list) (step S7), and forwards the edited packet to this forwarding destination (step S8).

In this way, the FA 210 discriminates the type of received packet and performs a process in accordance with the type of packet.

The processing according to the message type that is performed in the FA 210 having received the protocol packet will be described below.

Figure 31:
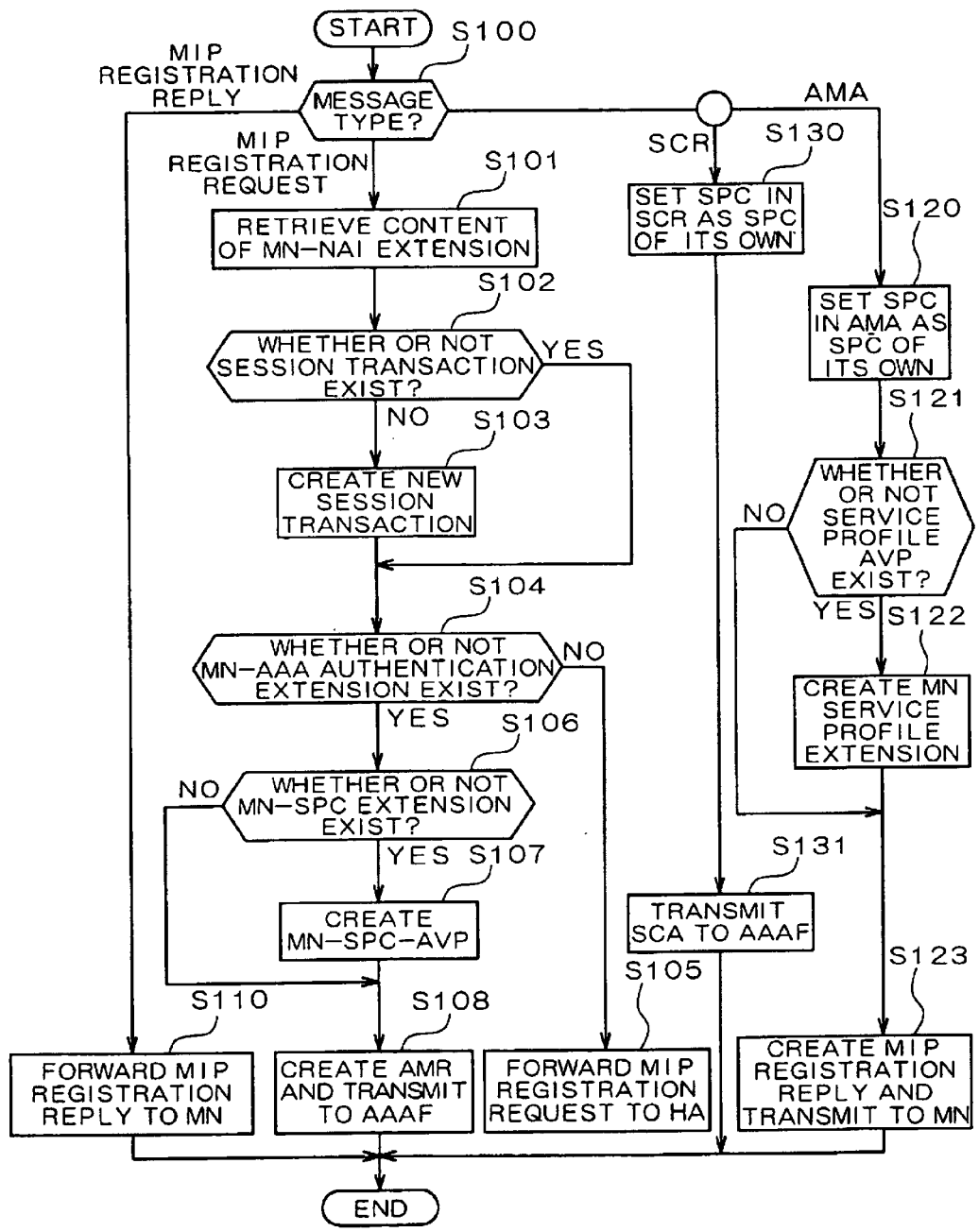
FIG. 31 is a flowchart showing a message handling operation in FA.

FIG. 31 is a flowchart showing a message handling operation in the FA 210. The operation of the FA 210 will be described below using this flowchart. Note that the operation of other FA 410 is similarly performed.

Process in the Case Where the MIP Registration Request Message is Received

The FA 210 checks the message type (step S100). If the MIP registration request message is determined, the content of MN-NAI extension contained in this message is retrieved (step S101). Then a check is made to see whether or not the FA session transaction exists (step S102). If there is no FA session transaction, the FA 210 creates a new FA session transaction (step S103). Thereafter or immediately if the FA session transaction exists, a check is made to see whether or not the MN-AAA authentication extension exists (step S104).

If the MN-AAA authentication extension does not exist, the FA 210 forwards an MIP registration request to the HA 110, judging that the MIP registration request message has been transmitted for the periodical registration refresh (step S105). If the MN-AAA authentication extension is contained in the received MIP registration request message, the FA 210 further checks to see whether or not the MN-SPC extension exists in this message (step S106).

If the MN-SPC extension exists, the FA 210 creates an MN-SPC-AVP (step S107). Then the FA 210 creates and sends an AMR message with this created AVP stored at a predetermined location to the AAAF 230 (step S108).

Process in the Case Where the MIP Registration Reply Message is Received

The FA 210 checks the message type (step S100). If the MIP registration reply message is determined, the FA 210 forwards this message to the corresponding MN 600 (step S110).

Case Where the AMA Message is Received

The FA 210 checks the message type (step S100). If the AMA message is determined, the FA 210 reads and sets an SPC (Service-Profile-Cache AVP) contained in this message as the SPC carried within the service control section 216 of its own (step S120).

Also, the FA 210 makes a check of whether or not the MN-SPC-AVP exists within this received AMA message (step S121). If so, the FA 210 creates the MN service profile extension (step S122). Then, the FA 210 creates an MIP registration reply message having this MN service profile extension stored at a predetermined location and sends out this message to the MN 600 (step S123).

Case Where the SCR message is received

The FA 210 checks the message type (step S100). If the SCR message is determined, the FA 210 reads and sets an SPC (Service-Profile-Cache AVP) contained in this message as the SPC carried within the service control section 216 of its own (step S130). Then, the FA 210 creates and sends an SCA message to the AAAF 230 (step S131).

HA

The HA 110 has fundamentally the same configuration as that of the FA 210 as shown in FIG. 26, but has different contents of data held in the protocol control section 214 and the transfer control section 218. More specifically, the transfer control section 218 within the HA 110 carries the mobile connection and a CN list. Also, the protocol control section 214 carries the HA session transaction.

FIG. 32 is a table showing a specific example of the mobile connection that is set in the transfer control section 218. As shown in FIG. 32, the mobile connection includes a home address, a care-of-address, a registration request identifier field, a life time, and the authentication information. The "home address" is one assigned to the MN 600. The "care-of-address" is an IP address of the FA 210 (or 410) to which the MN 600 is currently connected. The "registration request identifier field" is one for associating the request message with the response message. The "life time" is the term of validity for the registration request. The "authentication information" is indicating the NAI of the MN 600. The "session timer" indicates the term of validity for this transaction. The "mobile connection" indicates a pointer to the mobile connection. The "SCR request flag" is a flag indicating that the service profile of the CN 320 is being changed. The "SCR request source address" is an IP address of the functional entity that has transmitted an SCR message, namely, made a service change request.

The operation procedure of the HA 110 involving transmission or reception of the packet is substantially the same as that of the FA 210, and can be performed directly in accordance with the flowchart as shown in FIG. 30. The process according to the message type that is performed in the HA 110 having received the protocol packet will be described below.

Figure 35:
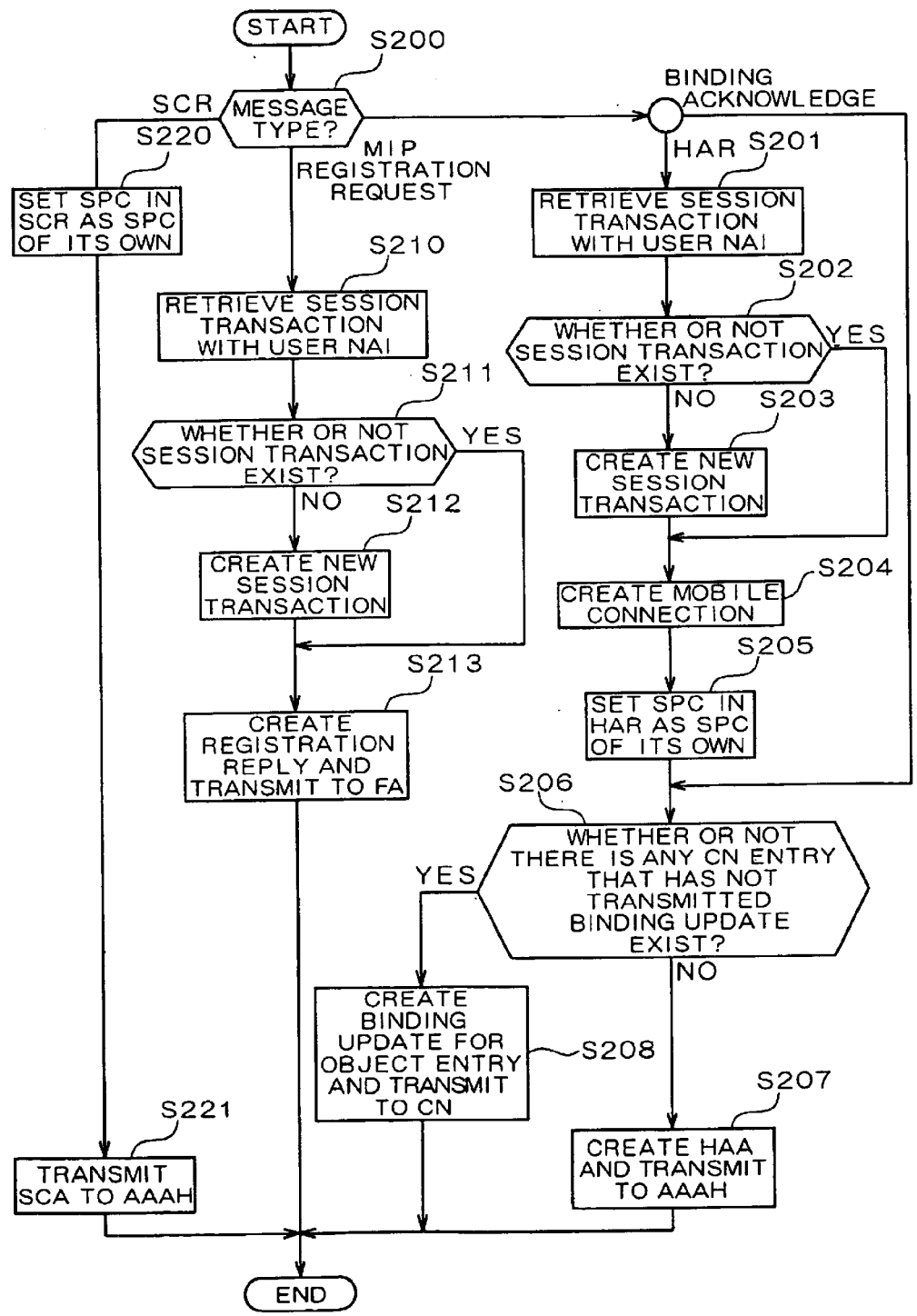
FIG. 35 is a flowchart showing the operation of a message handling process in the case where the binding acknowledge is used in the HA.

FIG. 35 is a flowchart showing the operation of a message handling process in the case where the binding acknowledge is used in the HA 110. The process of the HA 110 will be described below using this flowchart.

Process in the Case Where the MIP Binding Update Message is Transmitted to the CN in Accordance with the CN Entry The HA 110 checks the message type (step S200). If the HAR message is determined, the HA session transaction is retrieved on the basis of the user NAI contained in this message (step S201). Then a check is made to see whether or not the HA session transaction exists (step S202). If there is no HA session transaction, the HA 110 creates a new HA session transaction (step S203).

Then, the HA 110 creates an MIP mobile connection message (step S204), and reads out the SPC (Service-Profile-Cache AVP) contained in the HAR message and sets it as the SPC carried in the service control section 216 of its own (step S205).

Further, the HA 110 makes a check of whether or not there Process in the Case Where the MIP Binding Update Message is Transmitted to the CN in Accordance with the CN Entry The HA 110 checks the message type (step S200). If the HAR message is determined, the HA session transaction is retrieved on the basis of the user NAI contained in this message (step S201). Then a check is made to see whether or not the HA session transaction exists (step S202). If there is no HA session transaction, the HA 110 creates a new HA session transaction (step S203).

Then, the HA 110 creates an MIP mobile connection message (step S204), and reads out the SPC (Service-Profile-Cache AVP) contained in the HAR message and sets it as the SPC carried in the service control section 216 of its own.

Further, the HA 110 makes a check of whether or not there is any CN entry that has not transmitted the binding update message (step S206). If not, the HA 110 creates and sends an HAA message to the AAAH 130 (step S207). If there is any CN entry that has not transmitted the binding update message, the HA 110 creates and sends an MIP binding update message containing the SPC extension to this CN (step S208).

Process in the Case Where the Binding Acknowledge is Received

The HA 110 checks the message type (step S200). If the MIP binding acknowledge message is determined, the HA 110 transfers to the step S206. That is, if there is no CN entry that has not transmitted the binding update message, the HA 110 creates and sends an HAA message to the AAAH 130 (step S207). If there is any CN entry that has not transmitted the binding update message, the HA 110 stores the profile cache extension, and further creates an MIP binding update message with the "A" bit turned on to send this message to this CN (step S208).

Process in the Case Where the MIP Registration Reply Message is Received

The HA 110 checks the message type (step S200). If the MIP registration request message is determined, the content of MN-NAI extension contained in this message is retrieved (step S210). Then, a check is made to see whether or not the HA transaction exists (step S211). If there is no HA transaction, the HA 110 creates a new HA transaction (step S212). Thereafter, or immediately if the HA transaction exists, the HA 110 creates and sends an MIP registration reply message to the FA (step S213).

Case Where the SCR Message is Received

The HA 210 checks the message type (step S200). If the SCR message is determined, the SPC (Service-Profile-Cache AVP) contained in this message is read and set as the SPC carried in the service control section 216 of its own (step S220). Then, the HA 210 creates and sends an SCA message to the AAAH 130 (step S221).

Figure 36:
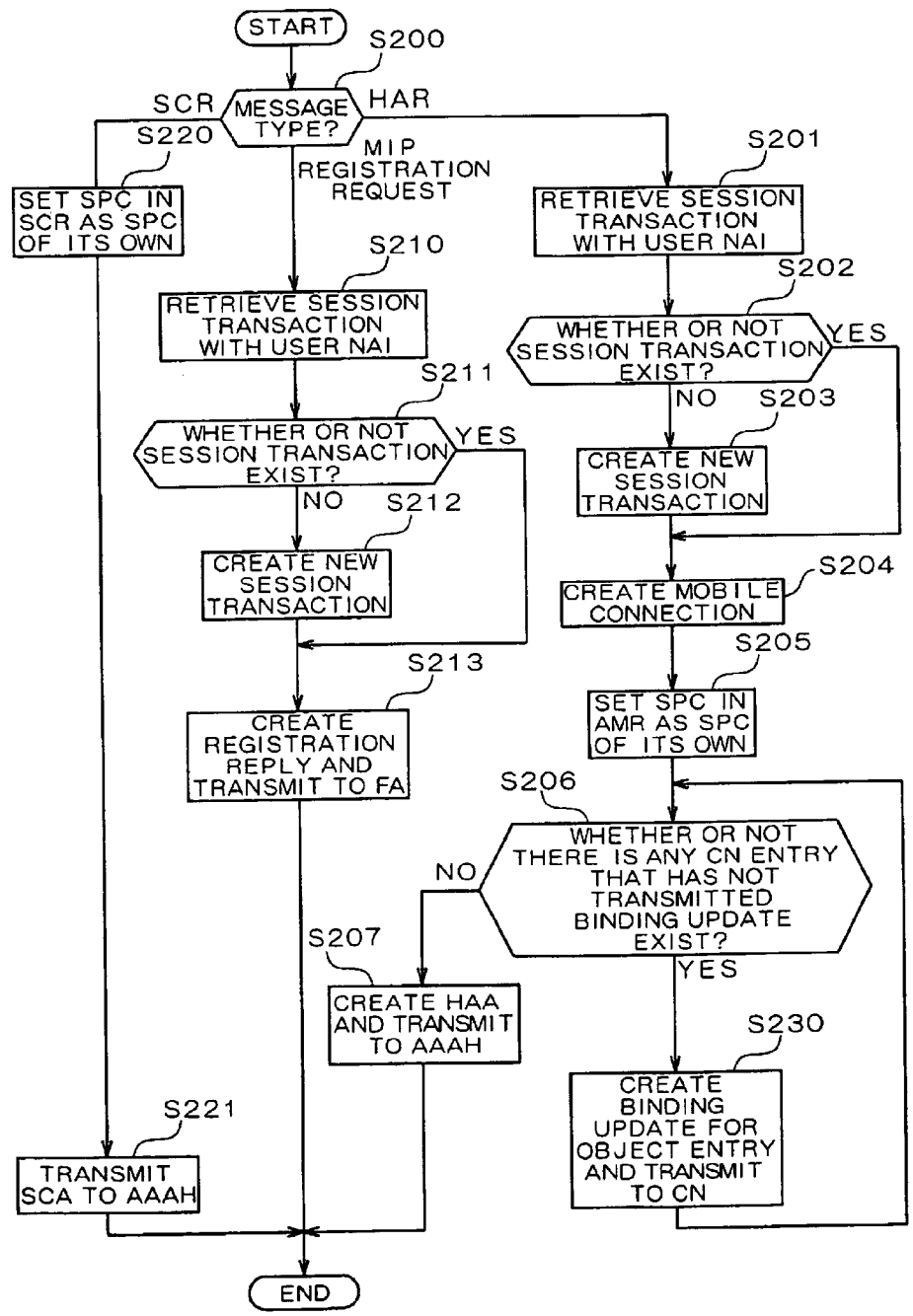
FIG. 36 is a flowchart showing the operation of a message handling process in the case where the binding acknowledge is not used in the HA.

FIG. 36 is a flowchart showing the operation of a message handling process in the case where the binding acknowledge is not used in the HA 110. The process of the HA 110 will be described below using this flowchart.

Process in the Case Where the Binding Update Message is Transmitted to the CN in Accordance with the CN Entry The operation where the HAR message is received is fundamentally the same as that of steps S201 to S207 as shown in FIG. 35, except for the operation after an affirmative judgement is made at step S206 because there is the CN entry that has not transmitted the binding update message. That is, if there is the CN entry that has not transmitted the binding update message, the HA 110 stores the profile cache extension, and further creates an MIP binding update message with the "A" bit turned off to send this message to all the CNs (step S230).

The operation in the case where the MIP registration request message is received is the same as that at steps S210 to S213 as shown in FIG. 35. The operation in the case where the SCR message is received is the same as that at steps S220 and S221 as shown in FIG. 35.

In this way, in the case where no binding acknowledge is used, the MIP binding acknowledge message sent from the CN 320 is omitted, thereby making the transmission and reception process of this message unnecessary. Particularly, in the case where there are a great number of CNs 320 with which the MN 600 communicates, the processing loads of both the HA 110 and the CN 320, or the accompanying costs can be reduced.

Figure 37:
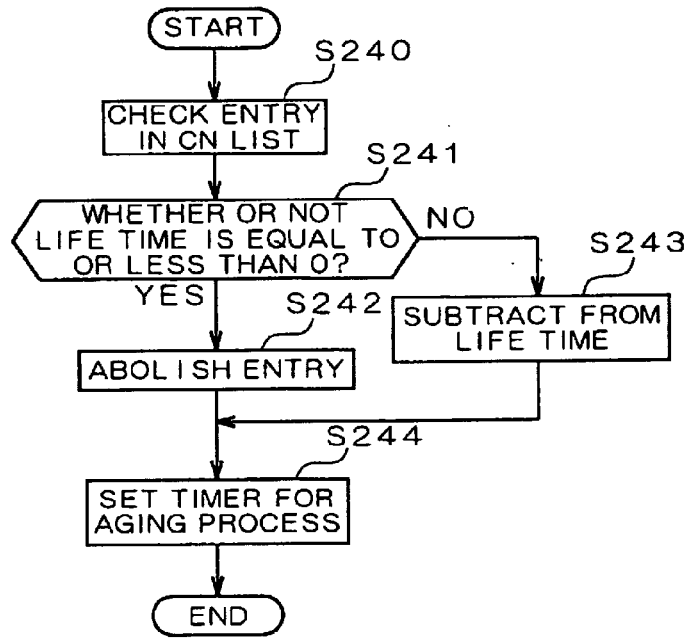
FIG. 37 is a flowchart showing the operation procedure for an aging process of the CN list in the HA.

FIG. 37 is a flowchart showing the operation procedure for an aging process of the CN list in the HA 110. The aging process of the CN list in the HA 110 will be described below using this flowchart. Note that the aging process of the CN list is one for removing old CN entries from the CN list. This aging process is performed at every fixed time interval, and this fixed time interval is counted by a timer for the aging process.

If the aging process is started, the HA 110 checks the entries in the CN list in the transfer control section 218 (step S240). As shown in FIG. 33, the CN list contains the CN addresses at which the MIP binding update message has been sent. A list of these addresses is directly used as the CN entries.

The HA 110 makes a check of whether or not the life time for each CN entry is equal to or less than zero (step S241), and abolishes the CN entry in which the life time is equal to or less than zero (step S242). For the entry in which the life time is greater than zero, the HA 110 subtracts a predetermined value from the present life time to update the life time (step S243).

Then, the HA 110 sets a timer for the aging process (step S244), and terminates the aging process for the entries in the CN list.

In this way, the aging process for the CN list is performed to delete the unnecessary address of the CN 320 from the CN list to save the network resources.

Figure 38:
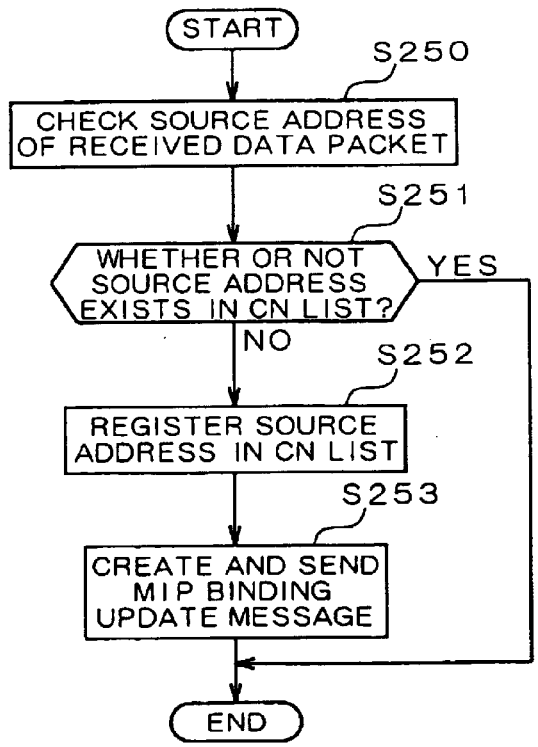
FIG. 38 is a flowchart showing the operation procedure of a CN list registering process in the HA.

FIG. 38 is a flowchart showing the operation procedure of a CN list registering process in the HA 110. The CN list registering process will be described below using this flowchart.

The HA 110 checks the IP address (i.e., destination address and source address) of the received data packet (step S250). A check is made to see whether or not the source address of packet of which the destination address is a home address of the MN 600 exists in the CN list (step S251).

If not, the HA 110 newly registers this source address in the CN list (step S252). Also, the HA 110 creates and sends an MIP binding update message to the CN (step S253).

CN

The CN 320 has fundamentally the same configuration as the FA 210 as shown in FIG. 26, except for the contents of service proper control data carried in the transfer control section 218. More specifically, the transfer control section 218 within the CN 320 carries a binding cache.

FIG. 39 is a table showing a specific example of the binding cache to be set in the transfer control section 218. As shown in FIG. 39, the binding cache includes a home address, a care-of-address, a life time, and an encapsulation method. The "home address" is one assigned to the MN 600. The "care-of-address" is an IP address of the FA 210 (or 410) at which the MN 600 is connected at present. The "life time" is the term of validity for the binding cache. The "encapsulation method" is one for the packet transmitted or received between the CN 320 and the FA 210, 410.

The operation procedure of the CA 320 involving transmission or reception of the packet is substantially the same as that of the FA 210, and may be performed directly in accordance with that as shown in FIG. 30. The process according to the message type that is performed in the CN 320 having received the protocol packet will be described below.

Figure 40:
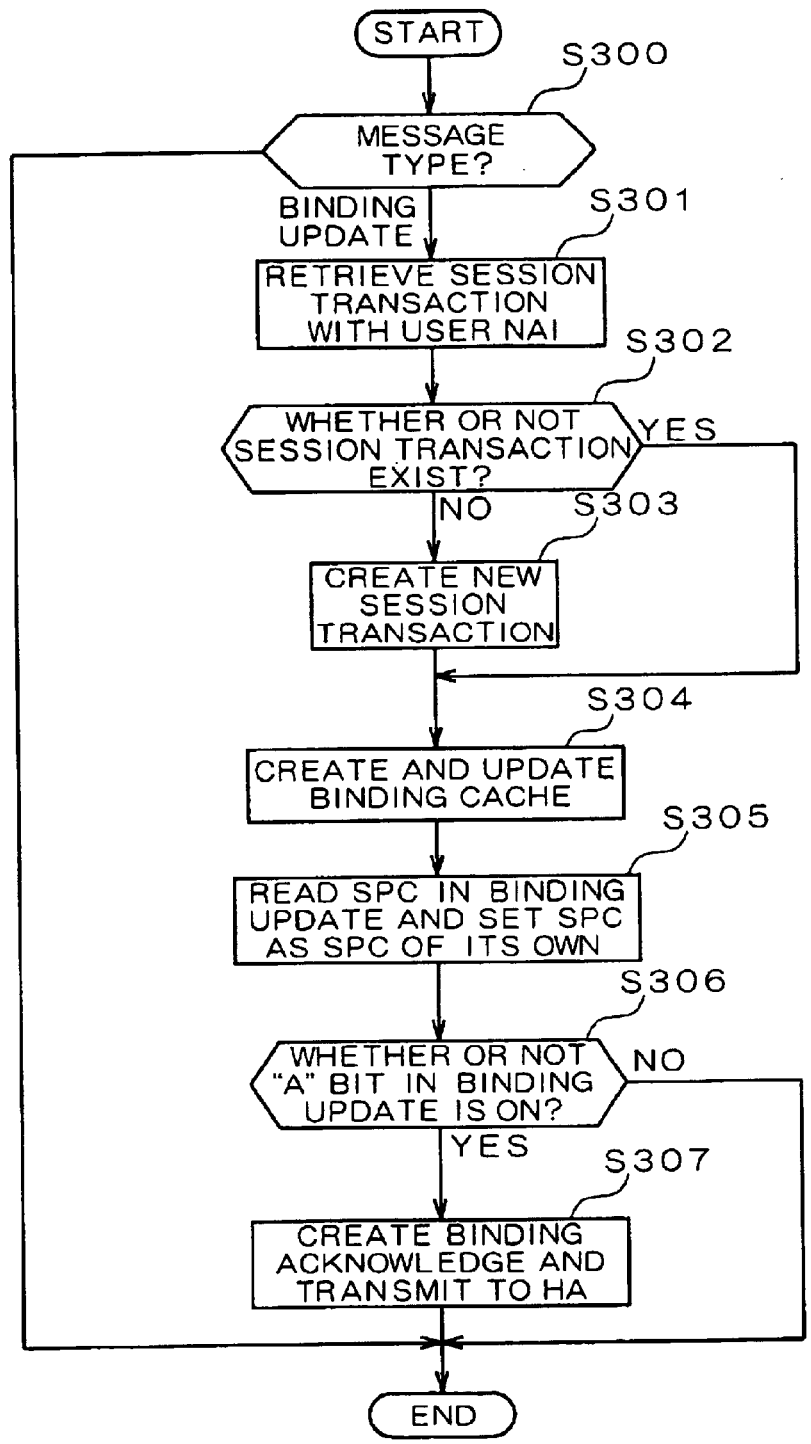
FIG. 40 is a flowchart showing a message processing operation in the CN.

FIG. 40 is a flowchart showing a message processing operation in the CN 320. The setting process with the binding cache or SPC by the CN 320 will be described below using this flowchart.

The CN 320 checks the message type (step S300). If the MIP binding update message is determined, the session transaction is retrieved on the basis of the user NAI contained in this message (step S301). Then a check is made to see whether or not the session transaction exists (step S302). If not, the CN 320 creates a new session transaction (step S303).

Then, the CN 320 creates and updates the binding cache on the basis of the care-of-address and the home address contained in the binding update message (step S304). Also, the CN 320 reads out the profile cache extension contained in the binding update message and sets it as the SPC carried in the service control section 216 of its own (step S305). Then the CN 320 determines whether or not the "A" bit in the binding update message is ON (step S306). If the "A" bit is ON, a binding acknowledge message is created and transmitted to the HA 110. On the other hand, if the "A" bit is OFF, the binding acknowledge message is not created, and the reply process to the HA 110 is omitted.

MN

FIG. 41 is a functional block diagram showing a detailed configuration of the MN 600. As shown in FIG. 41, the MN 600 comprises a packet control section 610 and a protocol control section 620. The packet control section 610 has a packet filter function. The protocol control section 620 performs a process for dealing with the mobile IP and HTTP, and has a user configuration file.

FIG. 42 is a table showing the contents of an agent list carried by the MN 600. This agent list contains a list of care-of-addresses in the router advertisement, for example, two care-of-addresses 1 and 2.

The schematic operation of the MN 600 will be described below.

Figure 43:
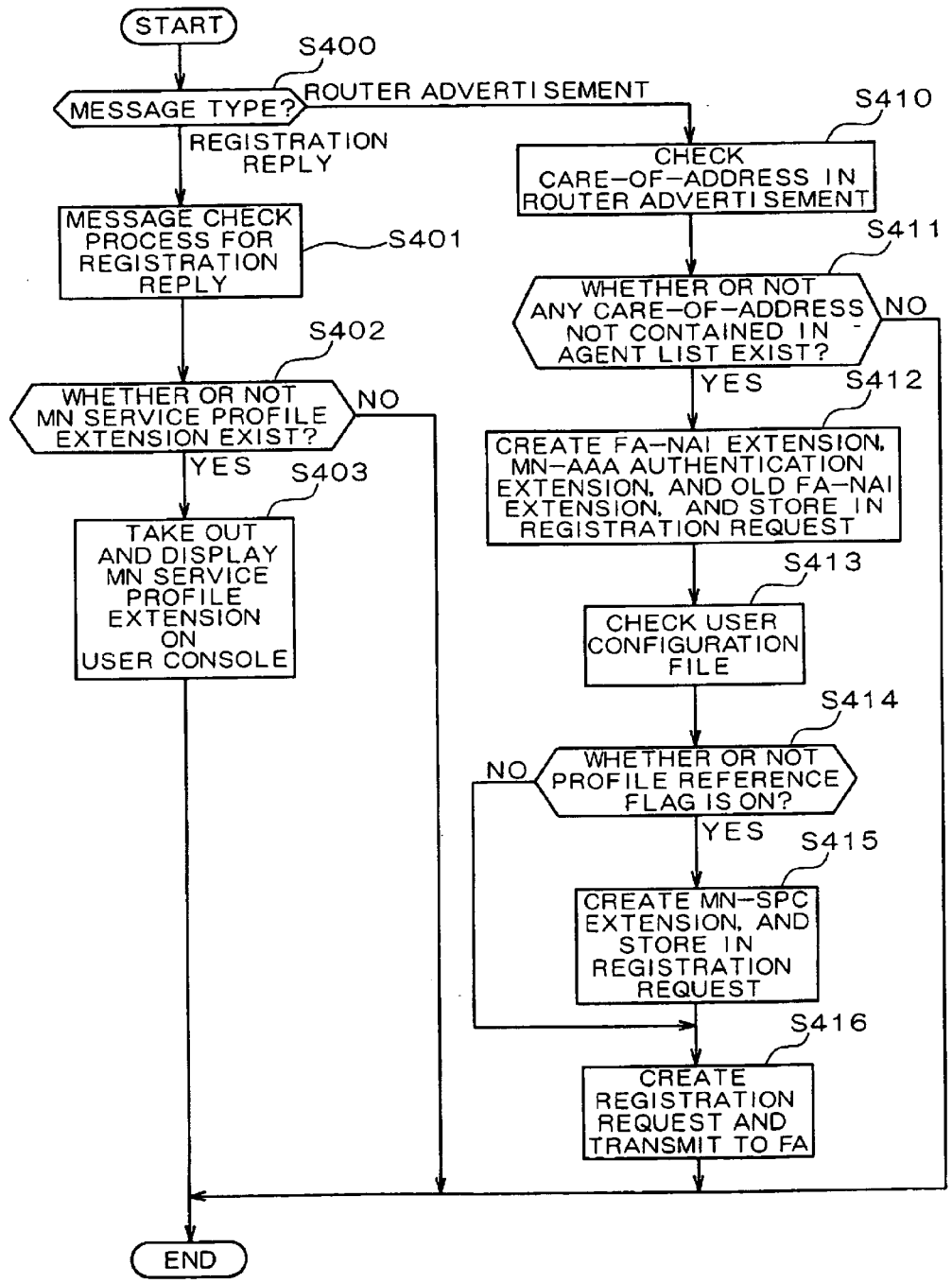
FIG. 43 is a flowchart showing a message processing operation in the MN.

FIG. 43 is a flowchart showing a message processing operation in the MN 600. The packet receiving process of the MN 600 will be described below using this flowchart. Operation for Displaying the MN Service Profile Extension on the Console The MN 600 checks the message type on the basis of the received packet (step S400). If the MIP registration reply message is determined, an initial message check process for the registration response is performed (step S401).

The MN 600 makes a check of whether or not the MN service profile extension exists in the received MIP registration reply message (step S402). If so, the MN service profile extension is taken out and displayed on the user console (step S403). FIG. 44 is a view showing a display example on the user console. The user watching this display can know the detailed contents of the SPC and can easily prevent the false setting or reconfirm the service contents. Operation for Storing the MN-SPC Extension During the Request for the MIP Registration at the Hand-Off Time The MN 600 checks the message type (step S400). If the router advertisement is determined, the care-of-address contained in this router advertisement is checked (step S410). Then a check is made to see whether or not any care-of-address is not contained in the agent list (step S411).

If the care-of-address not contained in the agent list exists, the MN 600 creates the FA-NAI extension, the MN-AAA authentication extension and the old FA-NAI extension and stores them in an MIP registration request message (step S412). Also, the MN 600 checks the user configuration file (step S413), and determines whether or not a profile reference flag is ON (step S414). If the profile reference flag is ON, the MN 600 stores the MN-SPC extension in the MIP registration request message (step S415). Then, the MN 600 sends out the MIP registration request message to the FA that has originated the router advertisement (step S416).

Figure 45:
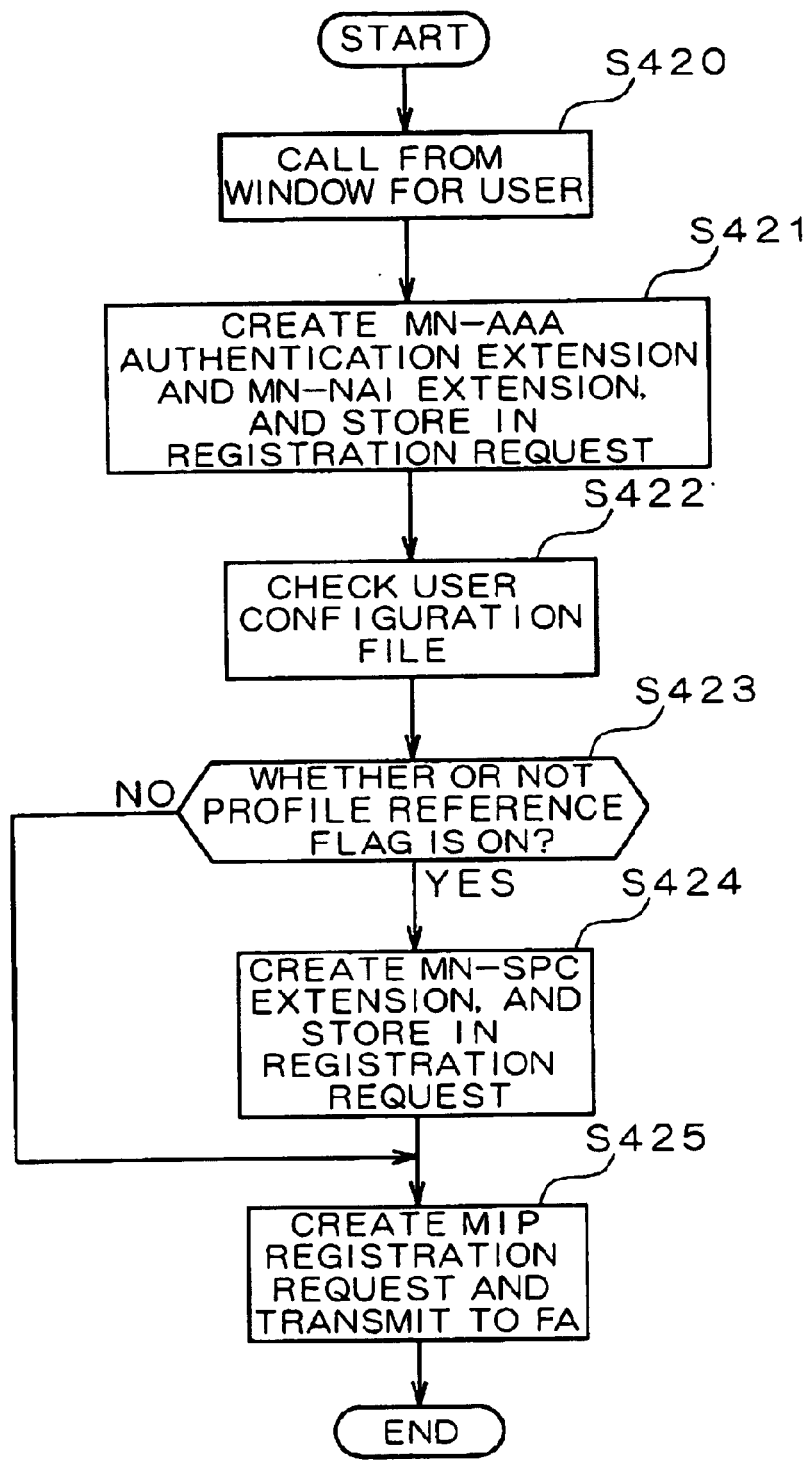
FIG. 45 is a flowchart showing the operation of a message transmission process in the MN.

FIG. 45 is a flowchart showing the operation of a message transmission process in the MN 600. For example, an operation procedure for transmitting asynchronously an MIP registration request message upon a command initiation on the user console is shown. The packet transmission process of the MN 600 will be described below using this flowchart.

A process for creating the MIP registration request message is initiated from the user console, or owing to the service change, from a local window of the user (step S420). The MN 600 creates the MN-AAA authentication extension and the MN-NAI extension and stores them in an MIP registration request message (step S421). Also, the MN 600 checks the user configuration file (step S422), and determines whether or not the profile reference flag is ON (step S423). If the profile reference flag is ON, the MN 600 creates the MN-SPC extension, and stores it in the MIP registration request message (step S424). Then the MN 600 sends out the MIP registration request message to the nearest FA to which the MN 600 is moved (step S425).

AAAF

Figure 46:
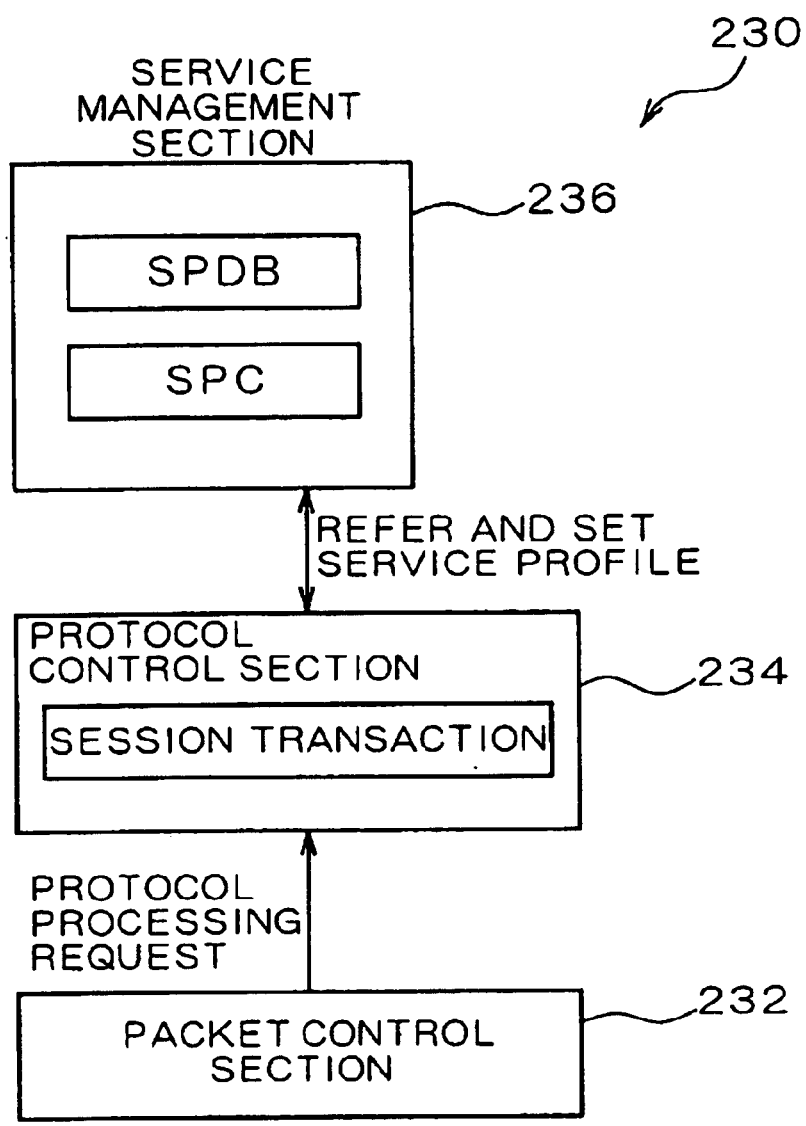
FIG. 46 is a functional block diagram showing a detailed configuration of the AAAF.

FIG. 46 is a functional block diagram showing a detailed configuration of the AAAF 230 (or 430). As shown in FIG. 46, the AAAF 230 comprises a packet control section 232, a protocol control section 234 and a service management section 236.

The packet control section 232 has a packet filter function to bracket the packets into an AMR message, an AMA message, an SCR message and an SCA message by discriminating the packet header. The protocol control section 234 is to support a DIAMETER protocol to perform a predetermined process in accordance with various kinds of messages received. Also, the protocol control section 234 has an AAAF session transaction to manage the DIAMETER session.

FIG. 47 is a table showing the contents of the AAAF session transaction provided in the protocol control section 234. As shown in FIG. 47, the AAAF session transaction includes a session ID, an AAAH address, an HA address, an old FA-NAI, a present FA-NAI, an SCR request source address, an SPC session timer, and a status. The "session ID" is an ID indicating the NAI of the MN 600. The "AAAH address" is an IP address of the AAAH 130 specified by the NAI of the MN 600. The "HA address" is an IP address of the HA 110 assigned by the AAAF 230. The "old FA-NAI" is the NAI of the old FA where the connected FA is changed because the MN 600 is moved. The "present FA-NAI" is the NAI of the FA to which the MN 600 is connected at present. The "SCR request source address" is an IP address of the AAAH 130 that has transmitted an SCR message, or made a service change request. The "session timer" is the term of validity for this transaction. The "status" indicates an operation status of the AAAF, such as a process waiting, HA requesting, AMA processing, HA change requesting, and FA change requesting.

The AAAF 230 has such a configuration, and its operation will be described below.

Figure 48:
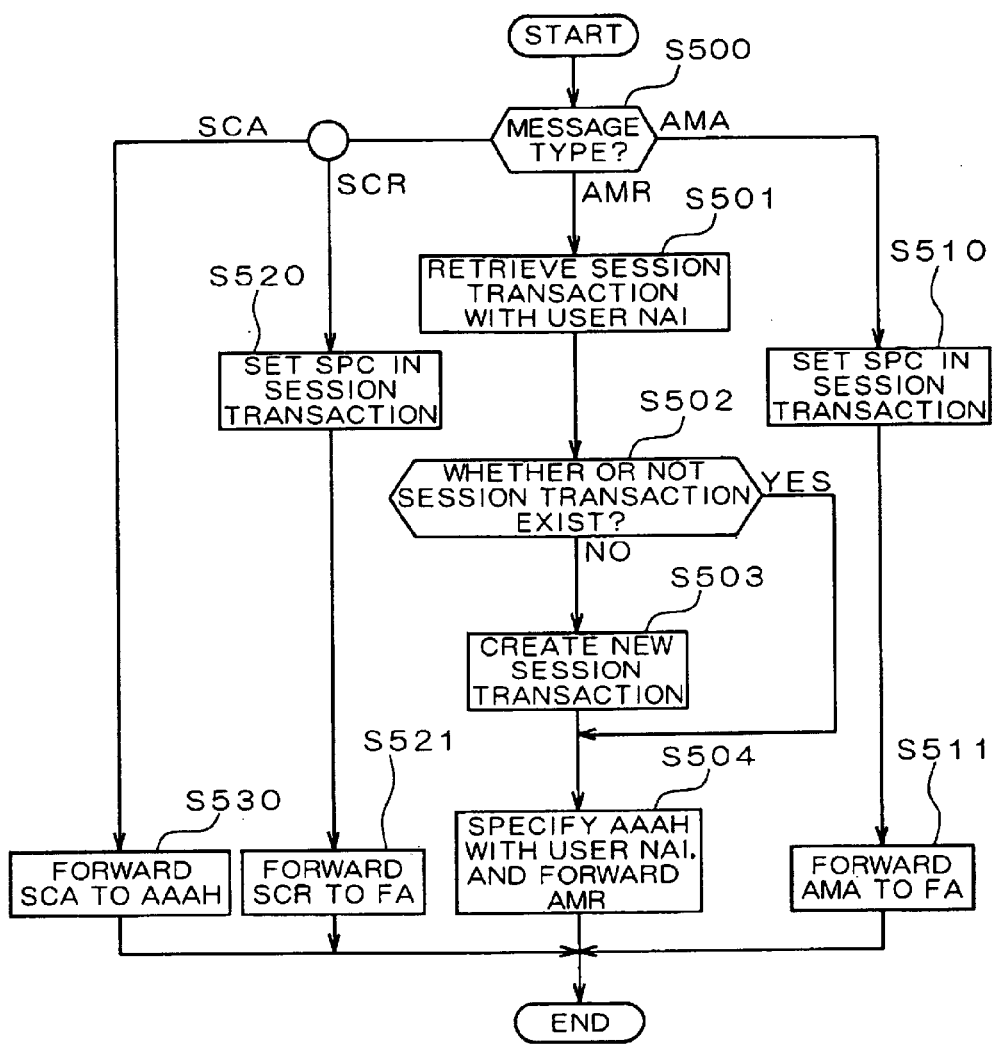
FIG. 48 is a flowchart showing a message handling operation in the AAAF.

FIG. 48 is a flowchart showing a message handling operation in the AAAF 230. The operation of the AAAF 230 will be described below using this flowchart.

Process in the Case Where the AMR Message is Received

The AAAF 230 checks the message type (step S500). If an AMR message is determined, the AAAF session transaction is retrieved on the basis of the user NAI contained in this message (step S501). Then a check is made to see whether or not the AAAF session transaction exists (step S502). If the AAAF session transaction does not exist, the AAAF 230 creates a new AAAF session transaction (step S503).

Then the AAAF 230 specifies the AAAH 130 on the basis of the user NAI contained in the AMR message, and forwards the AMR message to this specified AAAH 130 (step S504).

Process in the Case Where the AMA Message is Received

The AAAF 230 checks the message type (step S500). If an AMA message is determined, the SPC contained in the AAAF session transaction is set (step S510). Then the AAAF 230 forwards the received AMA message to the FA (step S511).

Process in the Case Where the SCR Message is Received

The AAAF 230 checks the message type (step S500). If an SCR message is determined, the SPC contained in the AAAF session transaction is set (step S520). Then the AAAF 230 forwards the received SCR message to the FA (step S521).

Process in the Case Where the SCA Message is Received

The AAAF 230 checks the message type (step S500). If an SCA message is determined, the AAAF 230 forwards the received SCA message to the AAAH 130 (step S530).

AAAH

Figure 49:
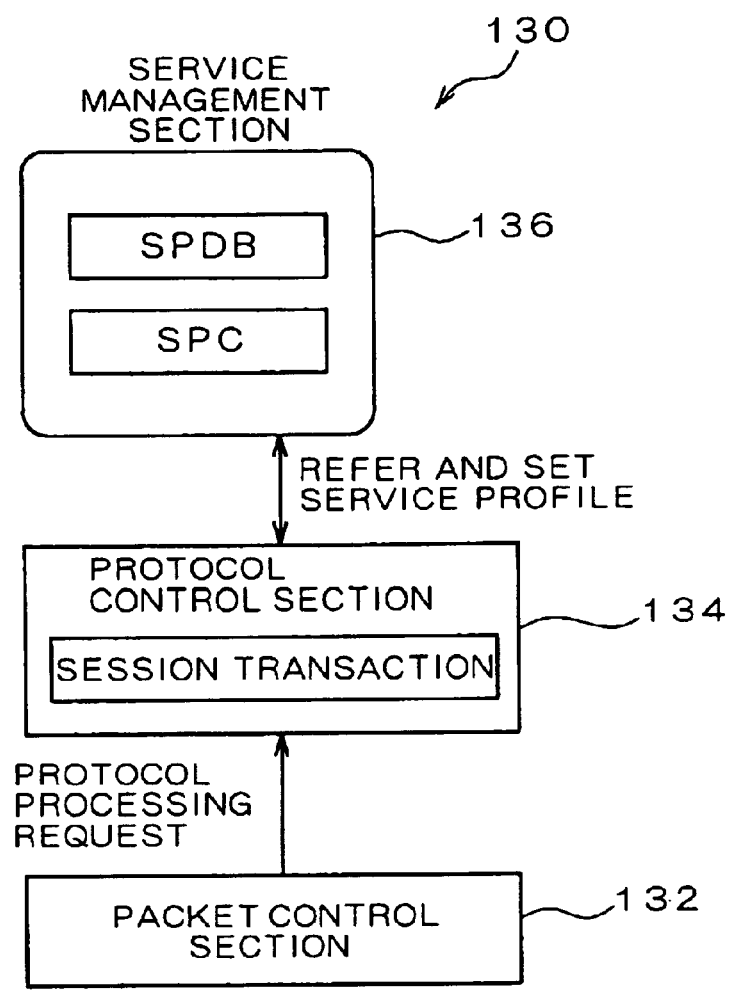
FIG. 49 is a functional block diagram showing a detailed configuration of the AAAH.

FIG. 49 is a functional block diagram showing a detailed configuration of the AAAH 130. As shown in FIG. 49, the AAAH 130 comprises a packet control section 132, a protocol control section 134 and a service management section 136.

The packet control section 132 has a packet filter function to bracket the packets into an AMR message, an HAA message, and an SCA message by discriminating the packet header. The protocol control section 134 is to support a DIAMETER protocol to perform a predetermined process in accordance with various kinds of messages received. Also, the protocol control section 134 has an AAAF session transaction to manage a DIAMETER session.

FIG. 50 is a table showing the contents of the AAAH session transaction provided in the protocol control section 134. As shown in FIG. 50, the AAAH session transaction includes a session ID, an HA address, an HA assigned AAAF address, a present AAAF address, an old AAAF address, a session timer, an SPC, and a status. The "session ID" is an ID indicating the NAI of the MN 600. The "HA address" is an IP address of the HA 110 assigned by the AAAH 130. The "HA assigned AAAF address" is an IP address of the AAAF to which the AAAH 130 has requested to assign the HA. The "present AAAF address" is an IP address of the AAAF that has transmitted the AMR message, or made an authentication request. The "old AAAF address" is an IP address of the old AAAF when the AAAF is changed. The "session timer" is the term of validity for this transaction. The "status" indicates an operation status of the AAAH, such as a process waiting, HA requesting, HA change requesting, and FA change requesting.

The service management section 136 has an SPDB (Service Profile Data Base) and an SPC (Service Profile Cache). The SPDB is a database for storing the common information to all the users, such as a service class or QoS class, and is constituted of the SP (Service Profile) in a unit of NAI. This SP is constituted of the NAI for identifying the user and a service block having a different configuration depending on the service type. The service block includes a service class, an operable service type, and the service proper information. The service proper information for band control includes the QoS, the available band, and the presence or absence of band assurance.

FIG. 51 is a table showing the contents of SPDB. As shown in FIG. 51, the SPDB includes a user NAI, a user SPI, a user contract service class, and an actual service class used by the user. The "user NAI" is the NAI of the MN 600. The "user SPI" is a service profile identifier for use when authenticating the user. The "user contract service class" indicates the available service of this class, QoS, and the maximum number of profiles. The "actual service class used by the user" is a contract service class of the user by default, but may be a higher level service class depending on the service condition of network under supervision of the network resource management system 500.

FIG. 52 is a table showing the contents of a service class table. As shown in FIG. 52, the service class table includes a service class identifier, an applicable service, and the maximum number of profiles. The "service class identifier" is one indicating the service class, for example, any number from "0" to "3" is set. The "applicable service" indicates the content of available service in a unit of service class, and a specific example will be described later. The "maximum number of profiles" is concerned with the maximum number of profiles that is allowable for this service class.

FIG. 53 is a table showing a specific example of applicable service contained in the service class table as shown in FIG. 53. As shown in FIG. 52, the content of applicable service is set corresponding to the service type "0" to "3." The applicable services include a DiffServe (Differentiated Service), a packet filtering, a security service and a band control. For each service class, the ON/OFF indicating that the service is applicable or not is set.

FIG. 54 is a table showing the contents of four kinds of services as described above. As shown in FIG. 54, four kinds of services are associated with the numbers of "1" to "4." "1" corresponds to the DiffServe (Differentiated Service), indicating a service on the basis of the RFC (Request for Comments) 2474, 2475. "2" corresponds to the packet filtering, indicating a service for filtering the packet with the IP address of the packet or the port number. "3" corresponds to the security service, indicating a secure service using the IPSEC. "4" corresponds to the band control, indicating a service for controlling the available band for each MN. Note that "0" is the reserved value for the future use.

FIG. 55 is a table showing the contents of service proper information for the band control. As shown in FIG. 55, an applicable QoS is set for every class identified by the class identifier. The contents of the applicable QoS in FIG. 55 are shown in FIG. 56. That is, five kinds of applicable QoS, "0" to "4," are prepared as shown in FIGS. 55 and 56. No band control service is applied to a service class corresponding to the class identifier "0" (with no available band and no band assurance). The band control service with a usable band of 0 to 100 kbps and the band assurance is applied to a service class corresponding to the class identifier "1." The band control service with a usable band of 0 to 255 kbps and without the band assurance is applied to a service class corresponding to the class identifier "2." The band control service with a usable band of 0 to 512 kbps and without the band assurance is applied to a service class corresponding to the class identifier "3." The band control service with a usable band of 0 to 1500 kbps and without the band assurance is applied to a service class corresponding to the class identifier "4."

The AAAH 130 has such a configuration, and its operation will be described below.

Figure 57:
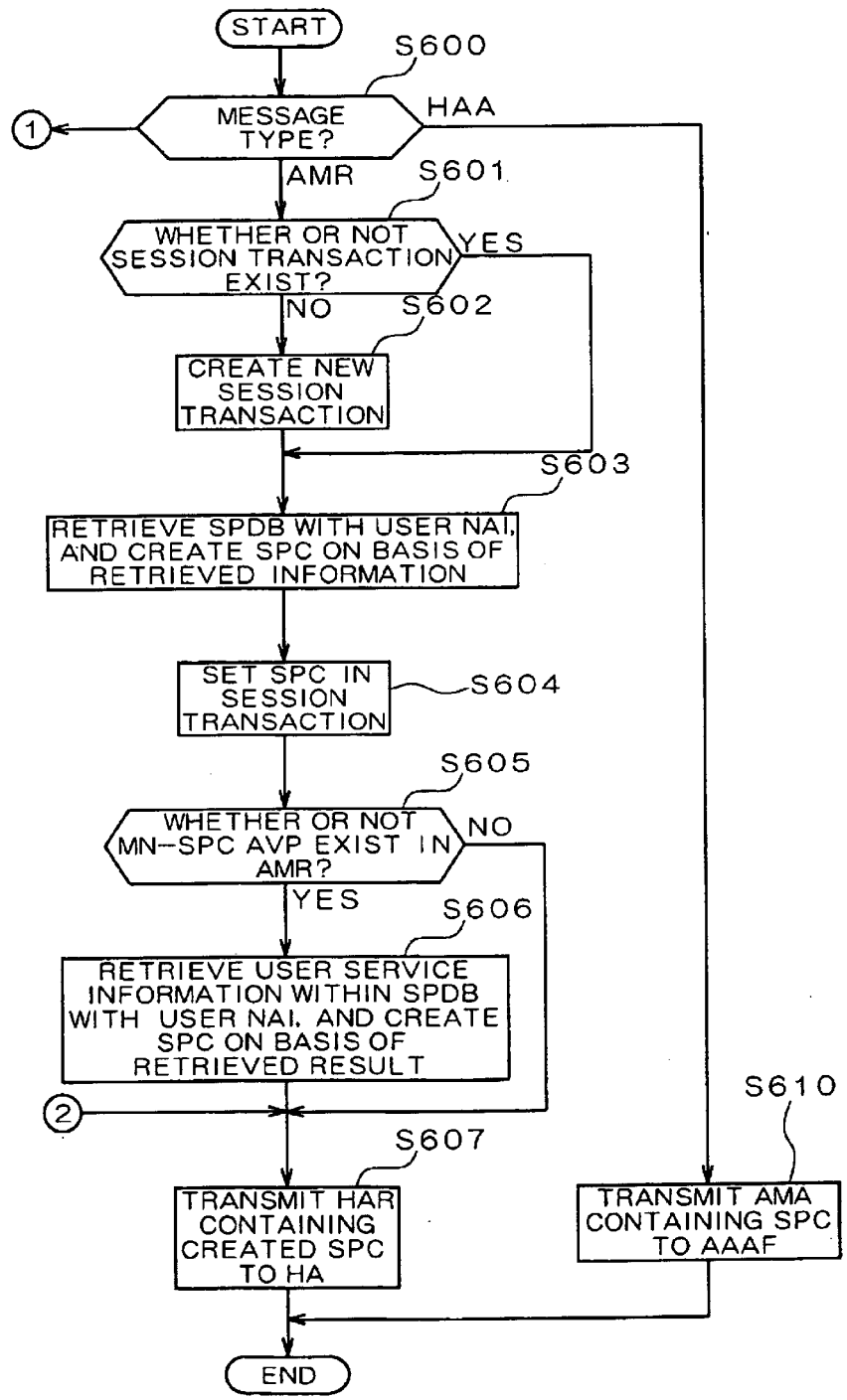
FIG. 57 is a flowchart showing the operation of a message handling process for the AAAH.
Figure 58:
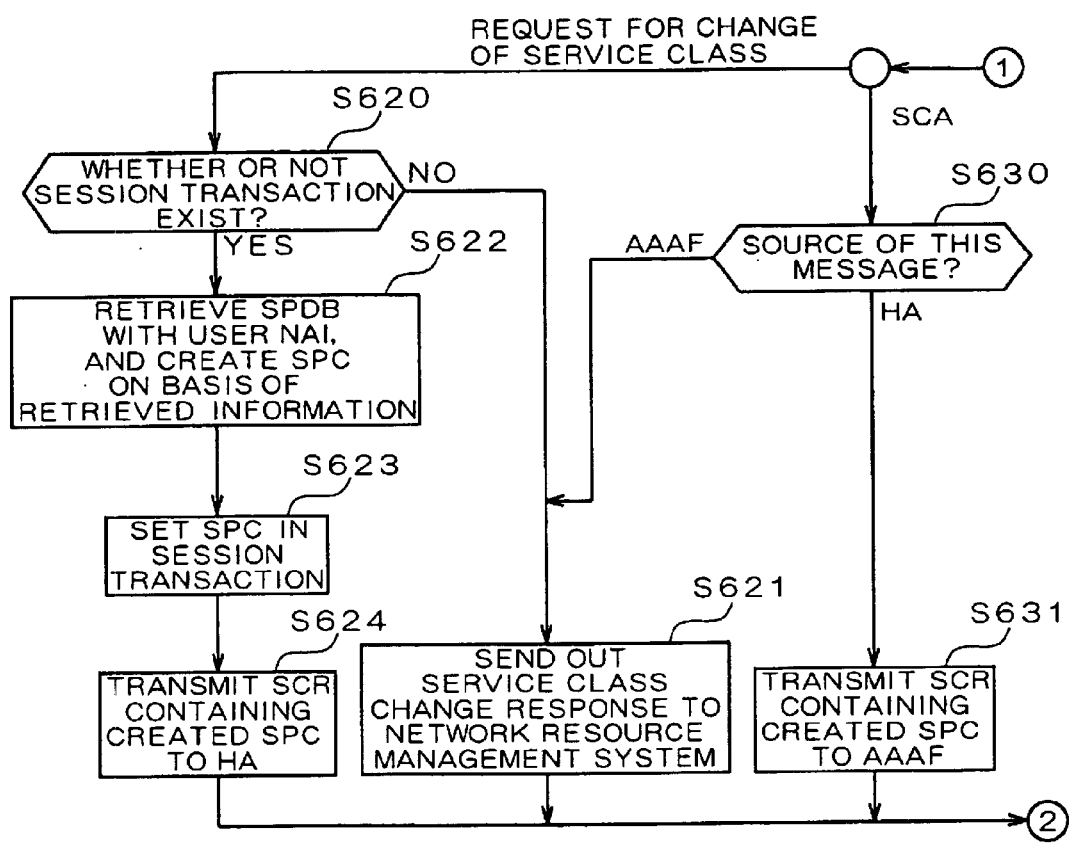
FIG. 58 is a flowchart showing the operation of a message handling process for the AAAH.

FIGS. 57 and 58 are a flowchart showing the operation of a message handling process for the AAAH 130. The operation of the AAAH 130 will be described below using this flowchart.

Process in the Case Where the AMR Message is Received

First of all, the operation of creating the SPC and sending out an HAR message after receiving an AMR message with the service change or hand-off of the MN as a moment will be described below. The AAAH 130 checks the received message type (step S600). If the AMR message is determined, a check is made to see whether or not the corresponding AAAH session transaction exists (step S601). If the AAAH session transaction does not exist, the AAAH 130 produces a new AAAH session transaction (step S602).

Then the AAAH 130 retrieves the SPDB using a user NAI, and creates an SPC corresponding to the service class on the basis of the retrieved information (step S603). The AAAH 130 stores the SPC in the AAAH session transaction (step S604).

Also, the AAAH 130 makes a check of whether or not the MN-SPC AVP exists in the received AMR message (step S605). If it exists, the AAAH 130 retrieves the service class actually used by the user within the SPDB, using the NAI, and creates an SPC on the basis of the retrieved result (step S606). The AAAH 130 creates an HAR message containing the SPC or various kinds of AVP to send it to the HA 110 (step S607).

Operation in the Case Where the HAA Message is Received

The AAAH 130 checks the message type (step S600). If an HAA message is determined, the AAAH 130 reads the SPC stored in the service management section 136, and creates an AMA message with the service profile cache AVP (Service-Profile-Cache AVP) containing this SPC to be sent out to the AAAF (step S610).

Process in the Case Where the Service Class is Changed

The operation of recreating the SPC and sending out an SCR message when the service class is changed as demanded by the network resource management system 500 will be described below.

The AAAH 130 checks the received message type (step S600). If a service class change request message from the network resource management system 500 is determined, the AAAH 130 makes a check of whether or not the AAAH session transaction exists, using the user NAI (step S620). If the AAAH session transaction does not exist, the AAAH 130 creates and sends out a service class change response message notifying the abnormal end to the network resource management system 500 (step S621).

If the AAAH session transaction exists, the AAAH 130 retrieves the SPDB using the user NAI, and creates an SPC corresponding to the requested service class (step S622). And the AAAH 130 stores the created SPC in the AAAH session transaction (step S623), and creates and sends out an SCR message with the service profile cache AVP (Service-Profile-Cache AVP) containing the created SPC to the HA 110 (step S624).

Operation in the Case Where the SCA Message is Received

The AAAH 130 checks the message type (step S600). If an SCA message is determined, the source of this message is checked (step S630). In the case where the source is the HA 110, the AAAH 130 reads the SPC stored in the service management section 136, and creates and sends an SCR message with the service profile cache AVP (Service-Profile-Cache AVP) containing this SPC to the AAAF (step S631). In the case where the source is the AAAF, the operation transfers to step S621, where a service class change response message is created and sent to the network resource management system 500.

Network Resource Management System

The network resource management system 500 is an entity for managing a traffic situation within the network and the user contract information. This network resource management system 500 complies with a level-up contract from the user in accordance with a remaining situation of network resources. Also, the network resource management system 500 has an interface with the AAAH 130 within the home domain, and performs an operation via the interface in accordance with a service change request from the user. The interfaces available may include SNMP, COPS, CLI and HTTP.

FIG. 59 is a table showing a specific example of a traffic management table that is a part of the data which the network resource management system 500 holds. As shown in FIG. 59, a management ID, an IP address of management entity, the maximum circuit usage efficiency, and a threshold of the maximum circuit usage efficiency are registered in the traffic management table for every management object entity contained in the network.

FIG. 60 is a table showing a specific example of a user contract database (DB) that is a part of the data which the network resource management system 500 holds. As shown in FIG. 60, the NAI, a contract service class, a service class actually used, and a status are registered in the user contract database for every user of the MN 600 connected to the network.

Figure 61:
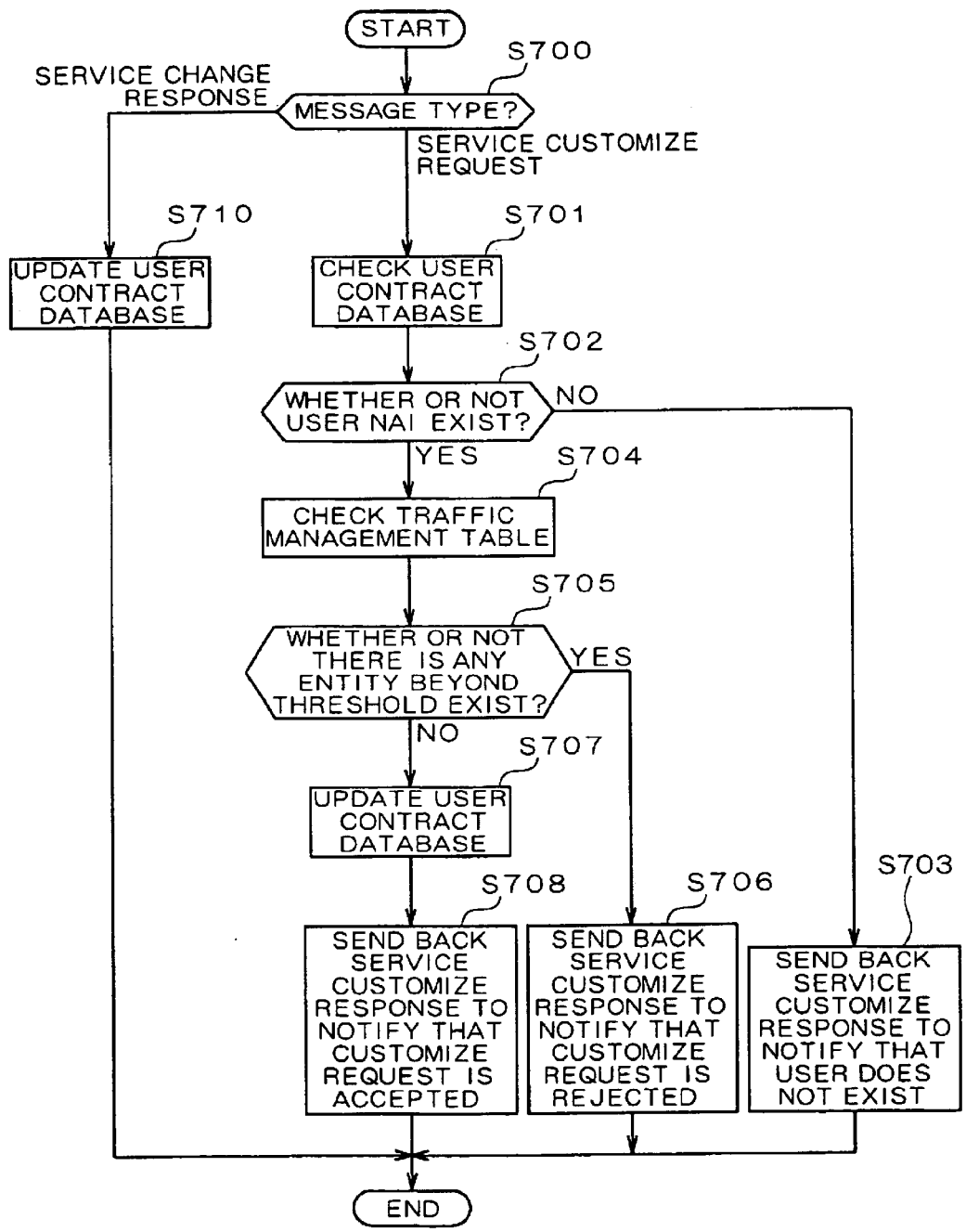
FIG. 61 is a flowchart showing the operation of a service customizing process in the network resource management system.

FIG. 61 is a flowchart showing the operation of a service customizing process in the network resource management system 500. The service customizing process will be described below using this flowchart.

The network resource management system 500 checks the message type (step S700). If a customize request message is determined, the user contract database as shown in FIG. 60 is checked (step S701). Then a check is made to see whether or not the user NAI exists (step S702). If the user NAI does not exist, the network resource management system 500 sends back a service customize response notifying the abnormal end (step S703).

On the other hand, if the user NAI exists, the network resource management system 500 checks the traffic management table as shown in FIG. 59 (step S704). Then, a determination is made whether or not there is any entity having the maximum circuit usage efficiency beyond the threshold (step S705). If such an entity exists, the network resource management system 500 sends back a service customize response to notify that the customize request is rejected (step S706). If such entity does not exist, the network resource management system 500 updates the user contract database (step S707), and sends back a service customize response to notify that the customize request is accepted (step S708).

In the case where the received message type is a service change answer, the network resource management system 500 updates the user contract database (step S710).

Figure 62:
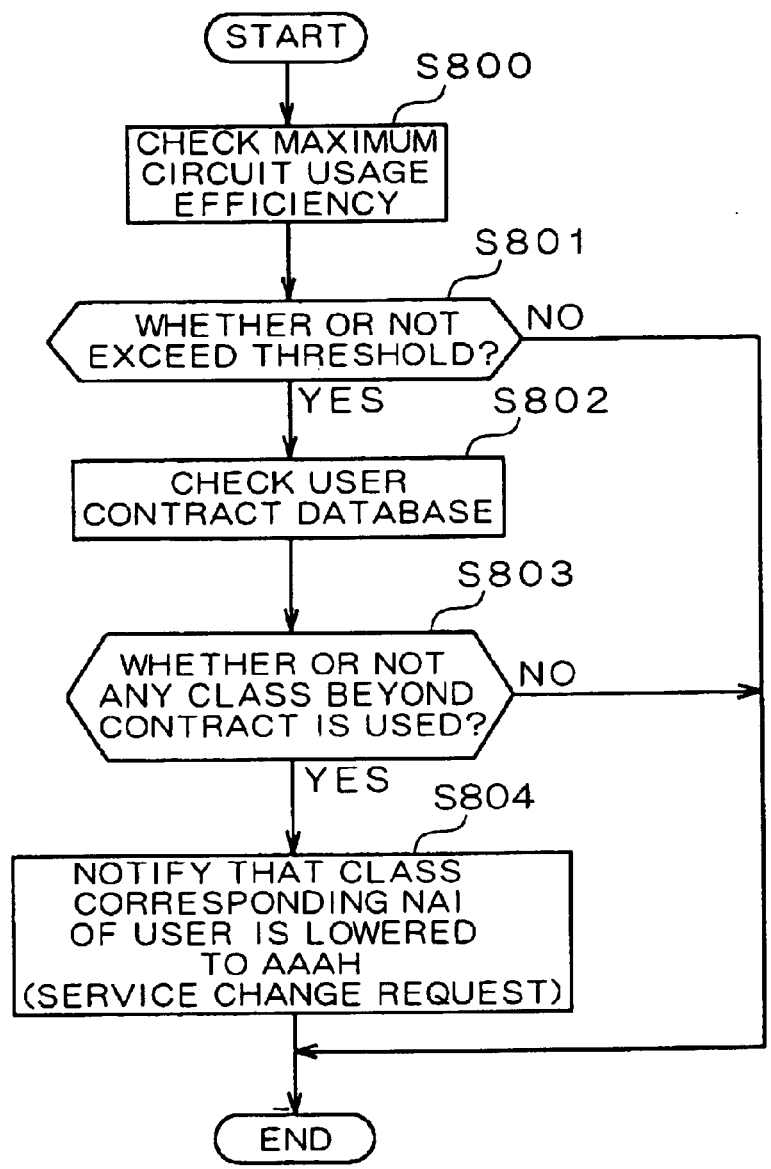
FIG. 62 is a flowchart showing the operation of a traffic supervising process in the network resource management system.

FIG. 62 is a flowchart showing the operation of a traffic supervising process in the network resource management system 500. A service change process under supervision of the network resource management system 500 will be described below using this flowchart.

The network resource management system 500 checks the maximum circuit usage efficiency (step S800). Then a determination is made whether or not the maximum circuit usage efficiency exceeds the threshold (step S801). If so, the network resource management system 500 checks the user contract database (step S802). Then a determination is made whether or not any class beyond the contract is used (step S803). In the case where the class beyond the contract is being used, a service change request notifying that the class of the user is lowered is transmitted to the AAAH 130 (step S804).

The configuration and operation of each entity contained in the mobile IP network of this embodiment are the same as described above. Then some specific examples in which the service contents are changed according to the user's volition will be described below with reference to representative examples.

Figure 63:
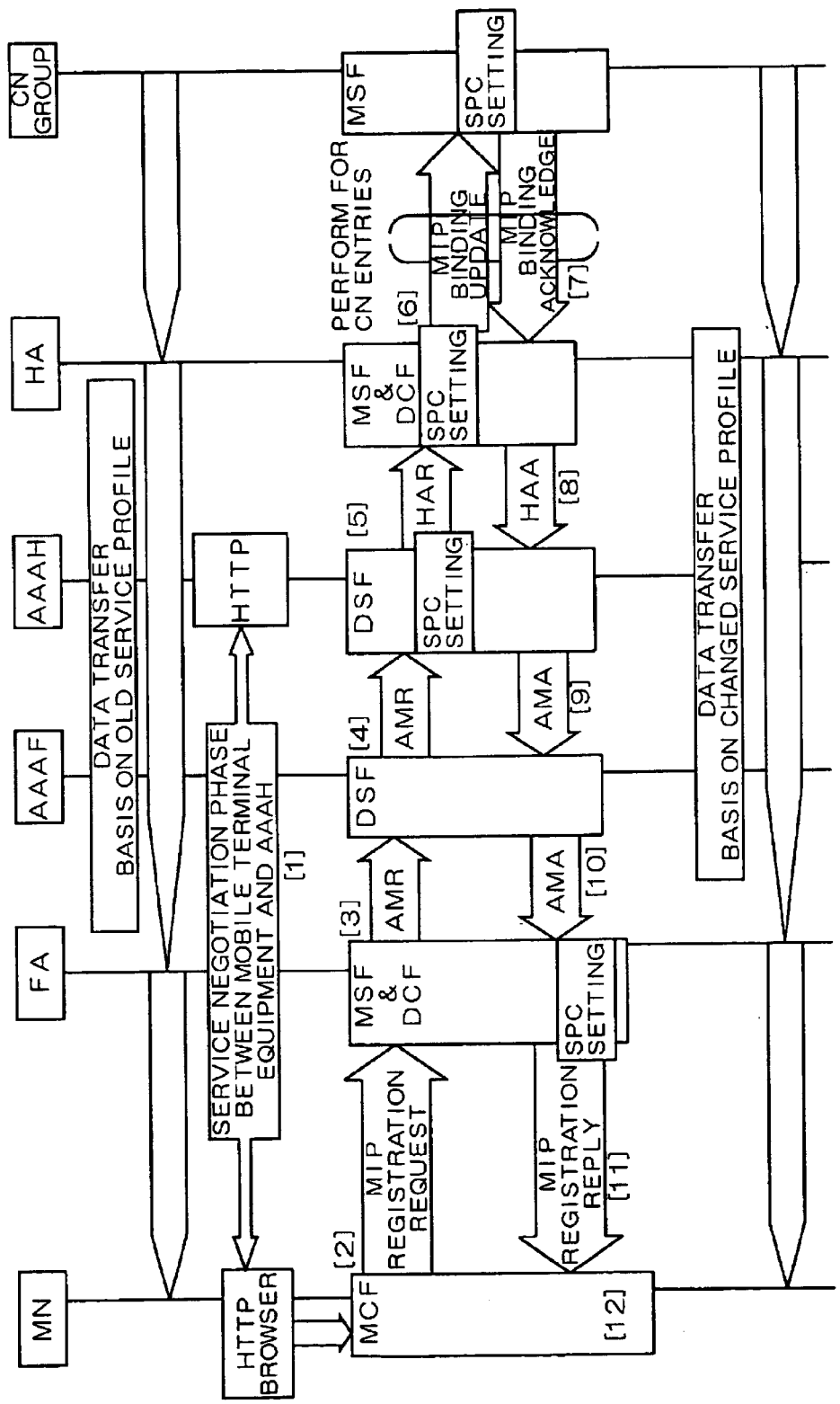
FIG. 63 is a diagram showing the sequence for the user to change the service within the range of contract service class.

1. Procedure in the Case Where the User Changes the Service Within the Range of Contract Service Class FIG. 63 is a diagram showing the sequence for the user to change the service within the range of contract service class. In FIG. 63, the number given in parentheses [ ] indicates the sequential number of communication procedure, and the communication procedure will be described below in accordance with this sequential number.

[1] The user gains access to the AAAH 130 through the WUI to make reference or change of the SPDB within the AAAH 130

Figure 64:
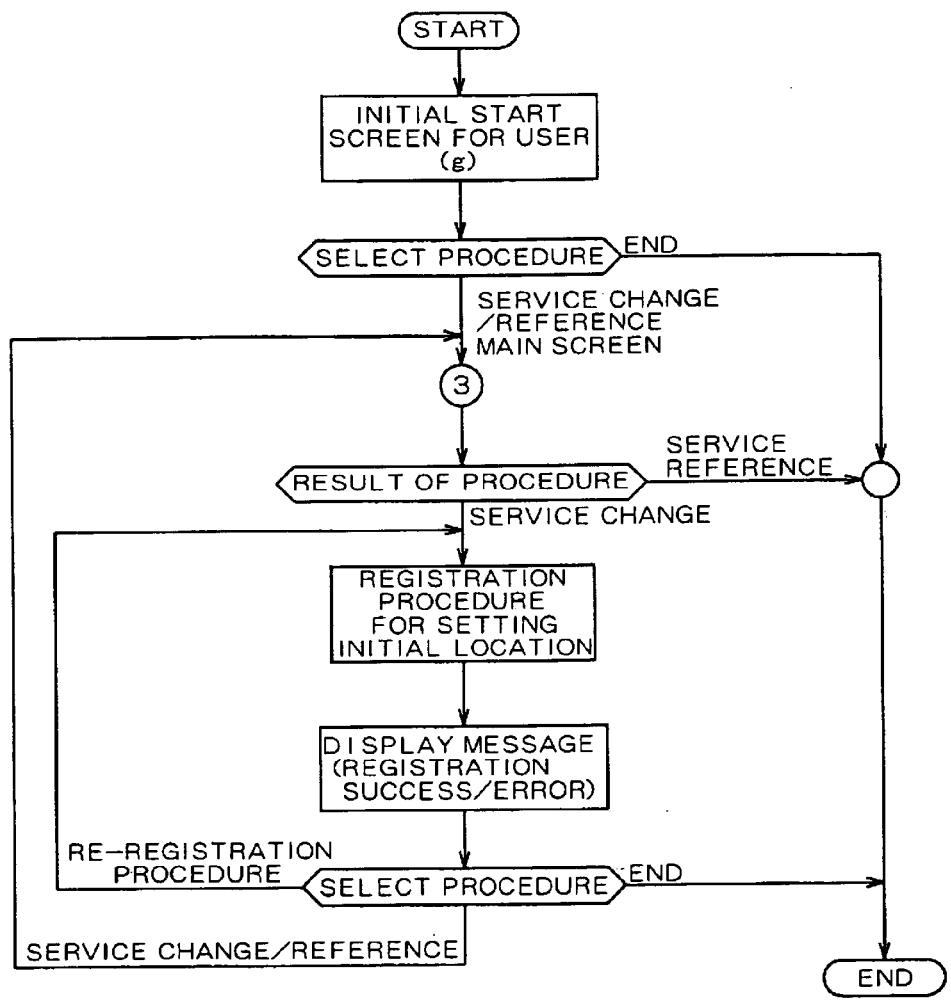
FIG. 64 is a flowchart showing the operation of a WUI process.
Figure 65:
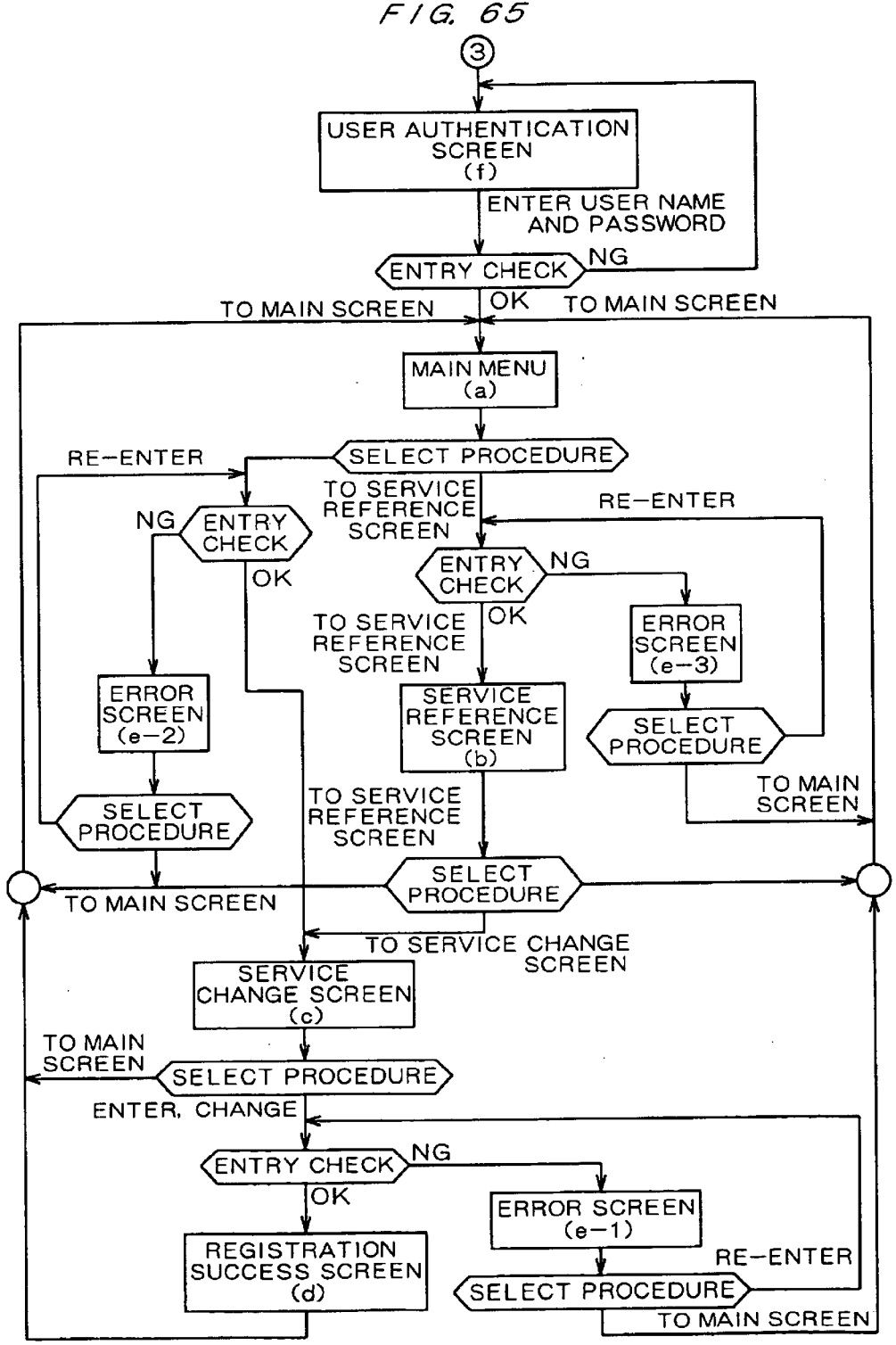
FIG. 65 is a flowchart showing the operation of a WUI process.
Figure 67:
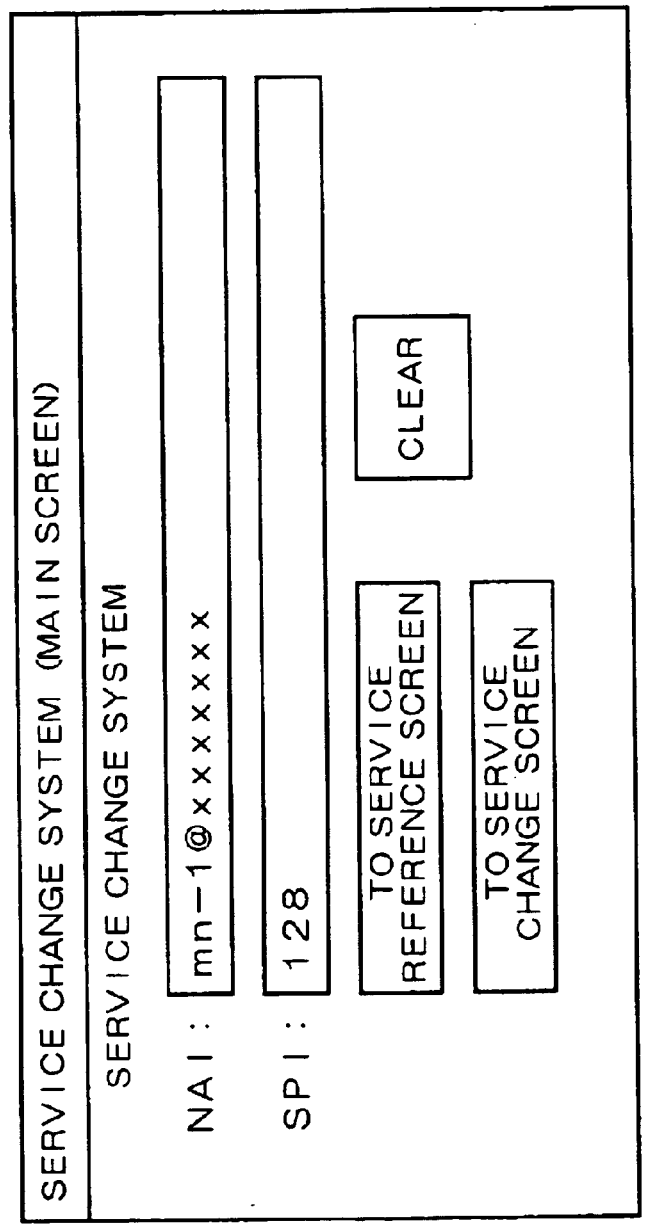
FIG. 67 is a diagram showing a display example of the main screen.

1) The user displays a main screen for service change as shown in FIG. 67 in accordance with a predetermined WUI process flow as shown in FIGS. 64 and 65.

2) The user enters the NAI and the SPI of the MN 600 at the predetermined positions of this main screen, and clicks on a "TO SERVICE CHANGE SCREEN" button.

3) The AAAH 130 retrieves the SPDB as shown in FIG. 51 with the NAI and the SPI entered by the user as the retrieval key, and makes a check of whether or not there is any entry of the SPDB having the NAI and the SPI matched. If there is no entry matched, the error information is displayed on the browser screen of the MN 600.

4) On the other hand, in the case where there is an entry of the SPDB having the NAI and the SPI matched, the AAAH 130 retrieves a service class table as shown in FIG. 52 with the service class as the retrieval key, and extracts a corresponding entry from among the applicable services as shown in FIGS. 53 and 54.

5) Then the AAAH 130 specifies a service which is set to be applicable (or turned on), edits the present service profile corresponding to this service or the selectable class information, using the service proper information as shown in FIGS. 55 and 56, and displays the contents of the service on the browser screen of the MN 600 (FIG. 69).

6) Then the user chooses a desired class, and clicks on an "APPLICATION" button on the browser screen.

7) If the class chosen by the user is outside the range of contract service class, the operation transfers to a negotiation phase between the AAAH 130 and the network resource management system 500. On the other hand, if the class chosen by the user is within the range of contract service class, the AAAH 130 resets a user request to the SPDB.

8) The AAAH 130 displays an error indication on the browser screen of the MN 600 (FIG. 71) if the SPDB resetting is not normally ended, or displays a registration success screen (FIG. 70) if it is normally ended. Also, the AAAH 130 automatically accesses an MIP client function (MCF) within the MN 600 to call an MIP registration request process.

[2] The MN 600 creates an MIP registration request message for initial location registration in accordance with the operation procedure as shown in FIG. 45, and sends it to the FA 410.

[3] The FA 410 performs a predetermined processing corresponding to the received MIP registration request message in accordance with the operation procedure as shown in FIG. 31 and sends an AMR message to the AAAF 430.

[4] The AAAF 430 performs a predetermined processing corresponding to the received AMR message in accordance with the operation procedure as shown in FIG. 48, and forwards the AMR message to the AAAH 130.

[5] The AAAH 130 performs an AMR checking process and an SPC creating process as follows in accordance with the operation procedure as shown in FIG. 57.

1) First of all, the AAAH 130 receives the AMR message, and then extracts the NAI of the user that is set in the user name AVP, and retrieves a table designated by a network part name with the NAI as the retrieval key to index the SPI of the user.

2) If the SPI is retrieved, the AAAH 130 compares it with the SPI set in the MN-AAA-SPI AVP. If the comparison result is unmatched, an AMA message containing an error code is created and sent to the AAAF 430.

3) If the comparison result is matched, the AAAH 130 retrieves a service class table with the service class as the retrieval key and extracts an applicable service.

4) The AAAH 130 creates an SPC corresponding to the service that is turned ON. In the case of the band control service, the SPC is created by referring to the service proper information such as the applicable QoS class.

5) The AAAH 130 creates an HAR message containing the created SPC and sends it to the HA 110.

[6] The HA 110 transmits an MIP binding update message to the CN 320 with reference to the CN list as shown in FIG. 33 and in accordance with the operation procedure as shown in FIGS. 35 and 36.

[7] The CN 320 performs an SPC setting process in accordance with the operation procedure as shown in FIG. 40 and sends a binding acknowledge message to the HA 110.

[8] The HA 110 sends an HAA message to the AAAH 130 in accordance with the operation procedure as shown in FIG. 36.

[9] The AAAH 130 sends an AMA message to the AAAF 430 in accordance with the operation procedure as shown in FIG. 57.

[10] The AAAF 430 sends the AMA message to the FA 410 in accordance with the operation procedure as shown in FIG. 48.

[11] The FA 410 sends an MIP registration request message to the MN 600 in accordance with the operation procedure as shown in FIG. 31.

[12] The MN 600 performs an SPC reference process in accordance with the operation procedure as shown in FIG. 43.

FIG. 66 is a table showing a list of screens to be displayed in the WUI process as shown in FIGS. 64 and 65. In the WUI process, a main screen, a service reference screen, a service change screen, a registration success screen, an error screen, an ISP authentication screen, or an initial start screen for the user, as shown in FIG. 66, is displayed as the browser screen for the MN 600 at a predetermined timing to the user. FIGS. 67 to 73 are views showing the display examples of these screens. The "ID" as shown in FIG. 66 indicates the display timing in the flowchart as shown in FIGS. 64 and 65. At a step attached with each ID in the flowchart, a corresponding screen is displayed.

In this way, in the mobile IP network of this embodiment, the content of SPC which the HA 110 or the AAAH 130 possesses can be updated by sending an MIP registration request message from the MN 600. In the case where there is an idle network resource, the network resources can be effectively utilized in accordance with a request from the user. Also, when an MIP registration request message is sent from the MN 600, the SPC of the apparatus involving the communication between the MN 600 and the CN 320 is only updated. Hence, it is possible to suppress the apparatuses to be updated to a minimum, thereby simplifying the procedure required for updating the SPC and reducing the costs for this updating process.

In the case where a small number of packets are transmitted or received in practice even within the range of user contract service class, an extra network resource can be released in accordance with the actual amount of communication, enabling the effective use of network resources.

The HA 110 is provided with a CN list containing the addresses of the CN 320 to communicate with the MN 600, whereby the SPC within the CN 320 is updated on the basis of this CN list. Accordingly, the contents of the SPC stored in all the CNs 320 possibly communicating with the MN 600 can be updated securely. When a packet is transmitted from each CN 320 to the MN 600, the service control on the basis of the service contents after change is enabled from the beginning. And since the content of this CN list is updated dynamically corresponding to a newly added CN 320, the MN 600 can communicate with this newly added CN 320 on the basis of a new service content after update.

Figure 74:
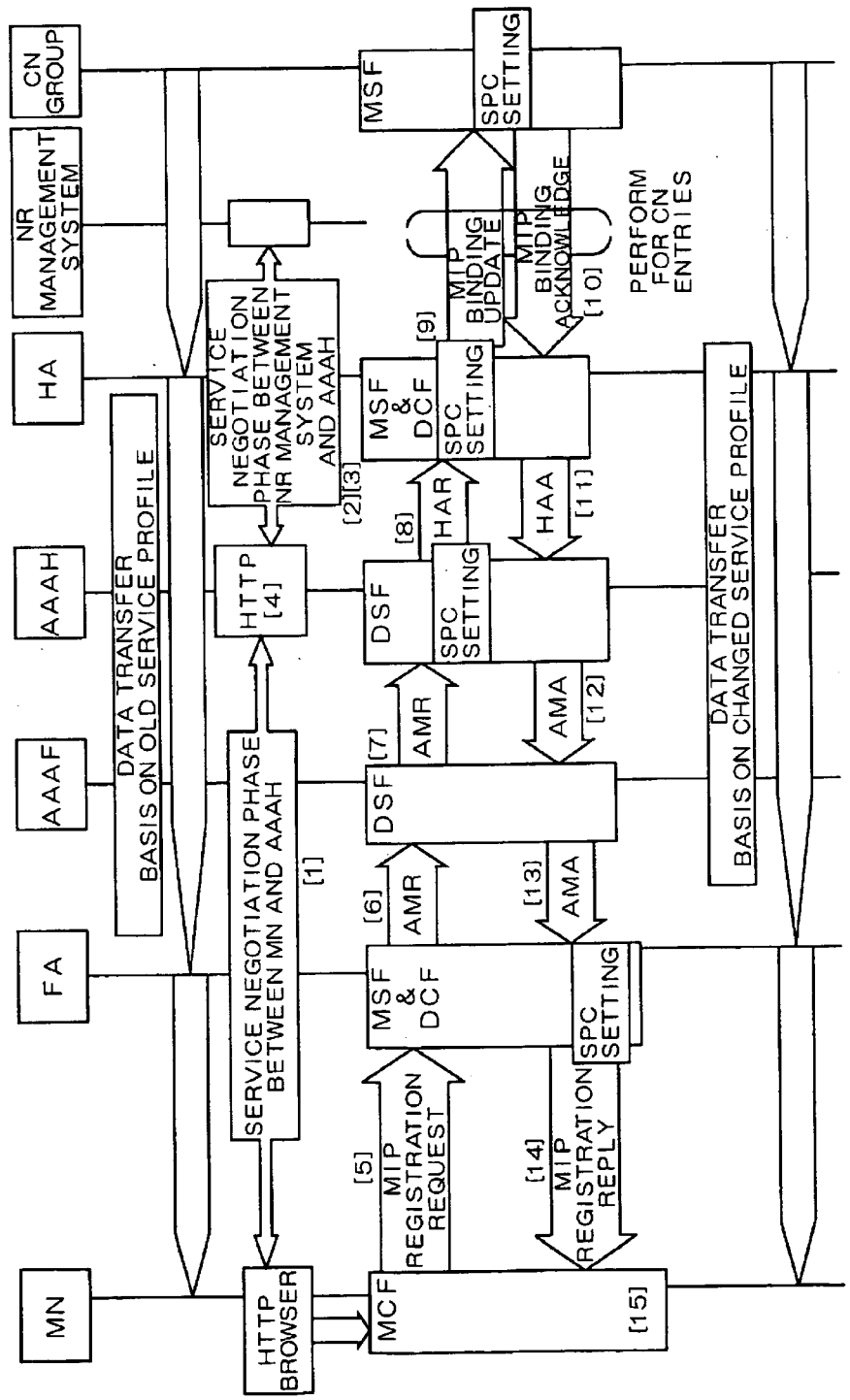
FIG. 74 is a diagram showing the sequence for the user to change the service outside the range of contract service class.

2. Procedure in the Case Where the User Changes the Service Outside the Range of Contract Service Class FIG. 74 is a diagram showing the sequence for the user to change the service outside the range of contract service class.

[1] The user gains access to the AAAH 130 through the WUI to make reference or change of the SPDB within the AAAH 130.

1) The user displays a main screen for service change as shown in FIG. 69 in accordance with a predetermined WUI process flow as shown in FIGS. 64 and 65.

2) The user enters the NAI and the SPI of the MN 600 at the predetermined positions of this main screen, and clicks on a "TO SERVICE CHANGE SCREEN" button.

3) The AAAH 130 retrieves the SPDB as shown in FIG. 51 with the NAI and the SPI entered by the user as the retrieval key, and makes a check of whether or not there is any entry of the SPDB having the NAI and the SPI matched. If there is no entry matched, the error information is displayed on the browser screen of the MN 600.

4) On the other hand, in the case where there is an entry of the SPDB having the NAI and the SPI matched, the AAAH 130 retrieves a service class table as shown in FIG. 52 with the service class as the retrieval key, and extracts a corresponding entry from among the applicable services as shown in FIGS. 53 and 54.

Figure 68:
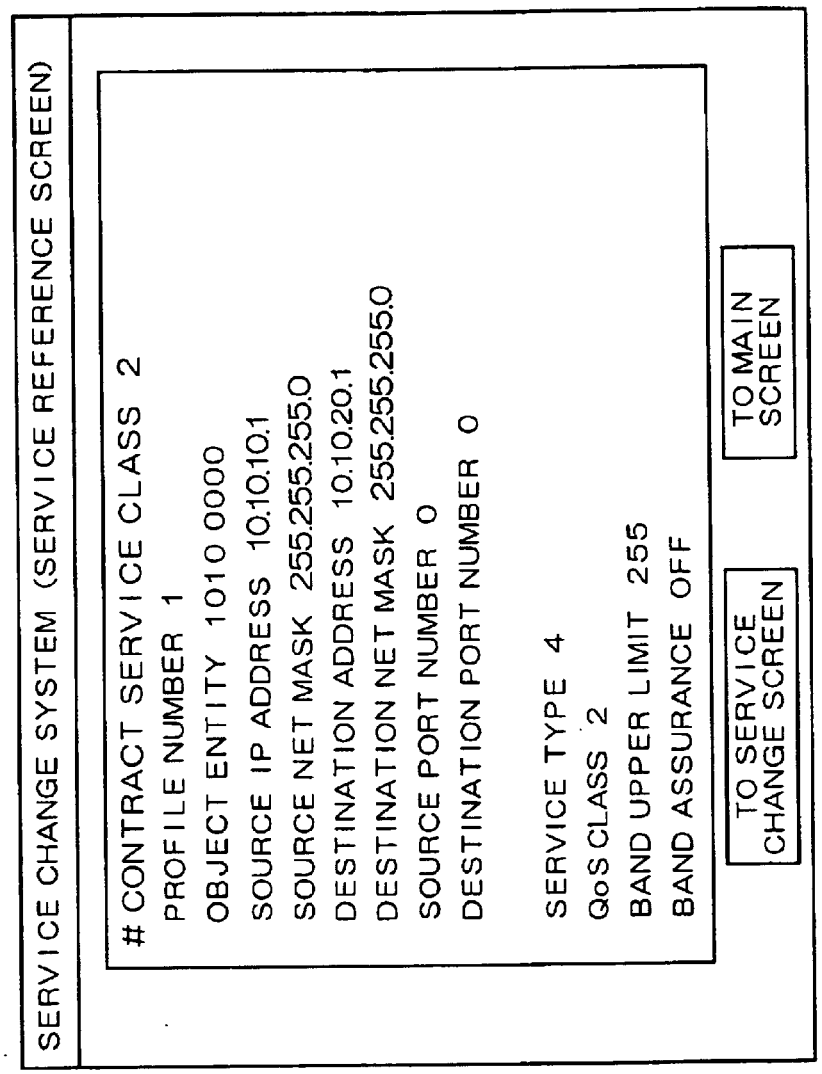
FIG. 68 is a diagram showing a display example of the service reference screen.

5) Then the AAAH 130 specifies a service which is set to be applicable (or turned on), edits the present service profile corresponding to this service or the selectable class information, using the service proper information as shown in FIGS. 55 and 56, and displays the contents of the service on the browser screen of the MN 600 (FIG. 68).

6) Then the user chooses a desired class, and clicks on an "APPLICATION" button on the browser screen.

7) If the class chosen by the user is outside the range of contract service class, the AAAH 130 enters a negotiation phase between the AAAH 130 and the network resource (NR) management system 500.

[2] The AAAH 130 makes a customize request to the network resource management system 500. The available interfaces may include COPS and CLI.

[3] The network resource management system 500 checks the user contract class and the network resource situation in accordance with the operation procedure as shown in FIG. 61, and sends back a service customize response to the AAAH 130.

[4] The AAAH 130 performs the following processing in accordance with the customize response transmitted from the network resource management system 500.

1) When the content of customize response is a normal reception, the AAAH 130 resets the content of user's request to the SPDB.

Figure 71:
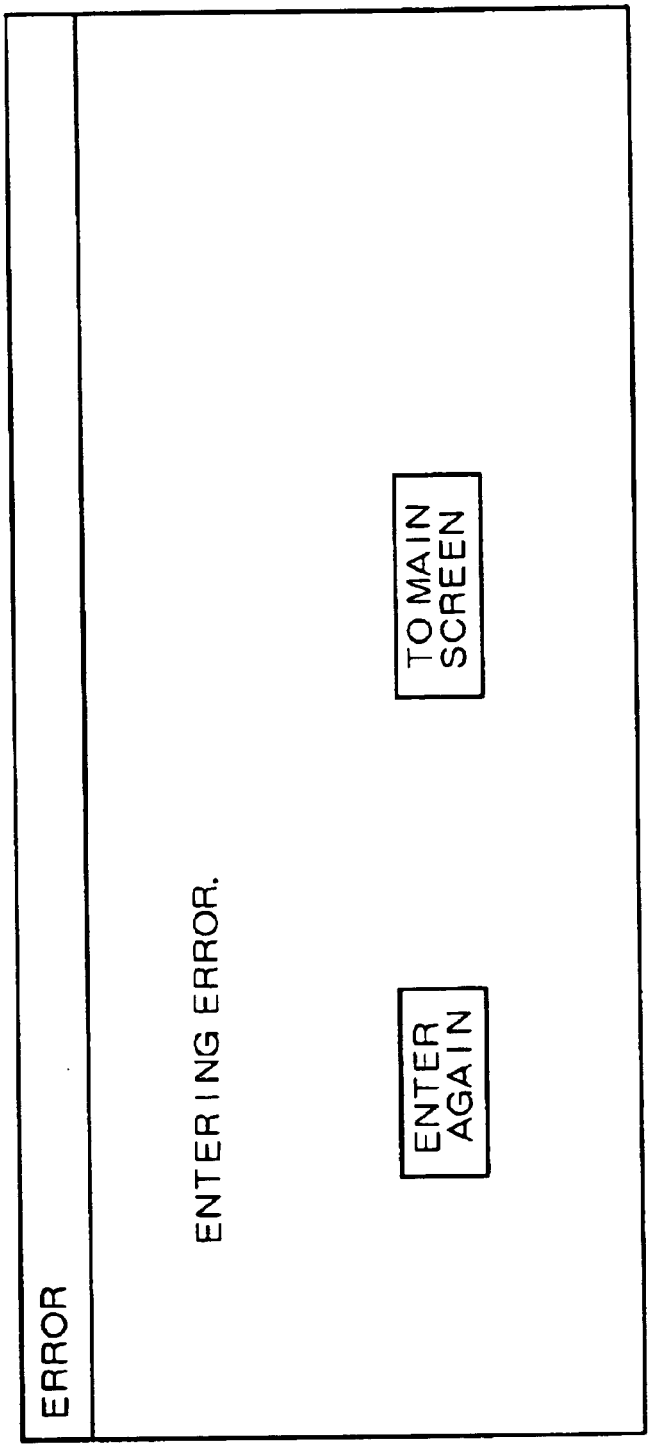
FIG. 71 is a diagram showing a display example of the error screen.
Figure 73:
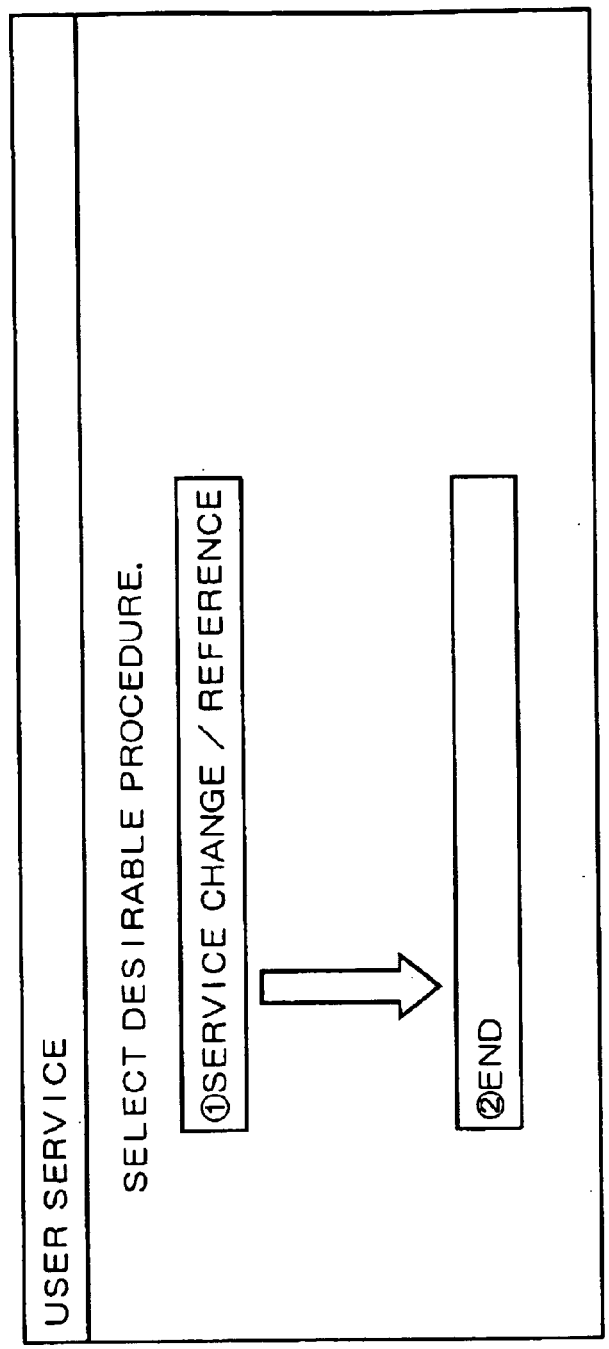
FIG. 73 is a diagram showing a display example of the initial start screen for the user.

2) When the content of customize response is a rejection, or the resetting of SPDB is not normally made, the AAAH 130 displays an error screen as the browser screen of the MN 600 (FIG. 71). Also, when the content of customize response is a normal reception, the AAAH 130 displays a registration success screen (FIG. 70) as the browser screen of the MN 600, and further automatically accesses an MIP client function (MCF) of the MN 600 to request the transmission of an MIP registration request message.

[5] The MN 600 creates an MIP registration request message for initial location registration in accordance with the operation procedure as shown in FIG. 45, and sends it to the FA 410.

[6] The FA 410 performs a predetermined processing corresponding to the received MIP registration request message in accordance with the operation procedure as shown in FIG. 31.

[7] The AAAF 430 performs a predetermined processing corresponding to the received AMR message in accordance with the operation procedure as shown in FIG. 48.

[8] The AAAH 130 performs an AMR checking process and an SPC creating process as follows in accordance with the operation procedure as shown in FIG. 57.

1) First of all, the AAAH 130 receives an AMR message, then extracts the NAI of the user that is set in the user name AVP, and retrieves a table designated by a network part name with the NAI as the retrieval key to index the SPI of the user.

2) If the retrieval of the SPI is ended, the AAAH 130 compares this retrieved SPI with the SPI set in the MN-AAA-SPI AVP. If the comparison result is unmatched, an AMA message containing an error code is created and sent to the AAAF 430.

3) If the comparison result is matched, the AAAH 130 retrieves a service class table with the service class as the retrieval key and extracts an applicable service.

4) The AAAH 130 creates an SPC corresponding to the service that is turned ON. In the case of the band control service, the SPC is created by referring to the service proper information such as the applicable QoS class.

5) The AAAH 130 creates an HAR message containing the created SPC and sends it to the HA 110.

[9] The HA 110 transmits an MIP binding update message to the CN 320 with reference to the CN list and in accordance with the operation procedure as shown in FIGS. 35 and 36.

[10] The CN 320 performs an SPC setting process in accordance with the operation procedure as shown in FIG. 40.

[11] The HA 110 sends an HAA message to the AAAH 130 in accordance with the operation procedure as shown in FIGS. 35 and 36.

[12] The AAAH 130 sends an AMA message to the AAAF 430 in accordance with the operation procedure as shown in FIG. 57.

[13] The AAAF 430 sends the AMA message to the FA in accordance with the operation procedure as shown in FIG. 48.

[14] The FA 410 sends an MIP registration reply message to the MN 600 in accordance with the operation procedure as shown in FIG. 31.

[15] The MN 600 performs an SPC reference process in accordance with the operation procedure as shown in FIG. 43.

In this way, in the case where the user changes the service content outside the range of contract service class, a negotiation is effected between the AAAH 130 and the network resource management system 500. Therefore, the service content can be changed beyond the contract range in accordance with the idle situation of the network resources, enabling the effective use of all the network resources. At this time, the MN 600 is enabled to effect an initial location registration procedure (transmission process of an MIP registration request message) with the change of content in the SPDB possessed by the AAAH 130 as a moment, so that the service contents can be set or changed, appropriating the initial location registration procedure performed by the MN 600.

3. Procedure in the Case Where the User Service is Changed in Accordance with a Request from the Network Resource Management System 500

Figure 75:
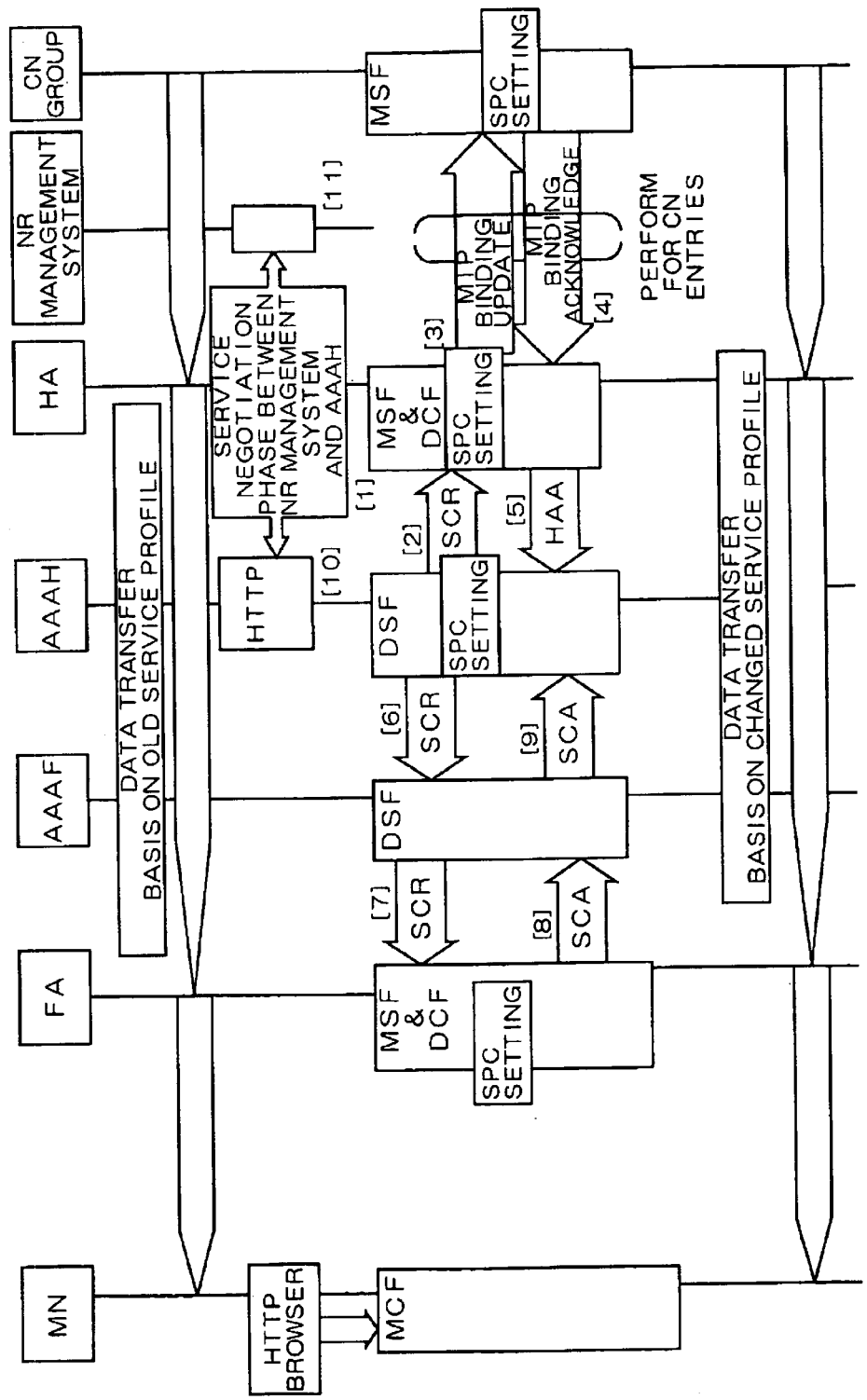
FIG. 75 is a diagram showing the sequence for the user to change the service within the range of contract service class.

FIG. 75 is a diagram showing the sequence of changing the service within the range of user's contract service class upon a request from the network resource (NR) management system 500.

[1] The network resource management system 500 notifies a service change request to the AAAH 130 in accordance with the operation procedure as shown in FIG. 62, and depending on a remaining situation of network resources.

[2] The AAAH 130 recreates an SPC in accordance with the operation procedure as shown in FIGS. 57 and 58, and sends an SCR message to the HA 110.

[3] The HA 110 sends out an MIP binding update message to the CN 320 in accordance with the operation procedure as shown in FIGS. 35 and 36 and with reference to the CN list.

[4] The CN 320 sends back a binding acknowledge message to the HA 110 in accordance with the operation procedure as shown in FIG. 40, only if the "A" bit is ON.

[5] The HA 110 sends back an HAA message to the AAAH 130 in accordance with the operation procedure as shown in FIGS. 35 and 36.

[6] The AAAH 130 sends out an SCR message to the AAAF 430 in accordance with the operation procedure as shown in FIG. 58.

[7] The AAAF 430 sends out the SCR message to the FA 410 in accordance with the operation procedure as shown in FIG. 48.

[8] The FA 410 sends back an SCA message to the AAAF 430 in accordance with the operation procedure as shown in FIG. 31.

[9] The AAAF 430 sends back the SCA message to the AAAH 130 in accordance with the operation procedure as shown in FIG. 48.

[10] The AAAH 130 notifies a service change answer message to the network resource management system 500 in accordance with the operation procedure as shown in FIGS. 57 and 58.

[11] The network resource management system 500 updates a user contract DB in accordance with the operation procedure as shown in FIG. 61.

In this way, since the service content can be changed upon a request from the network resource management system 500, the contents of network resource available to the user can be set depending on the use conditions of the network resources, enabling the effective use of network resources.

Figure 76:
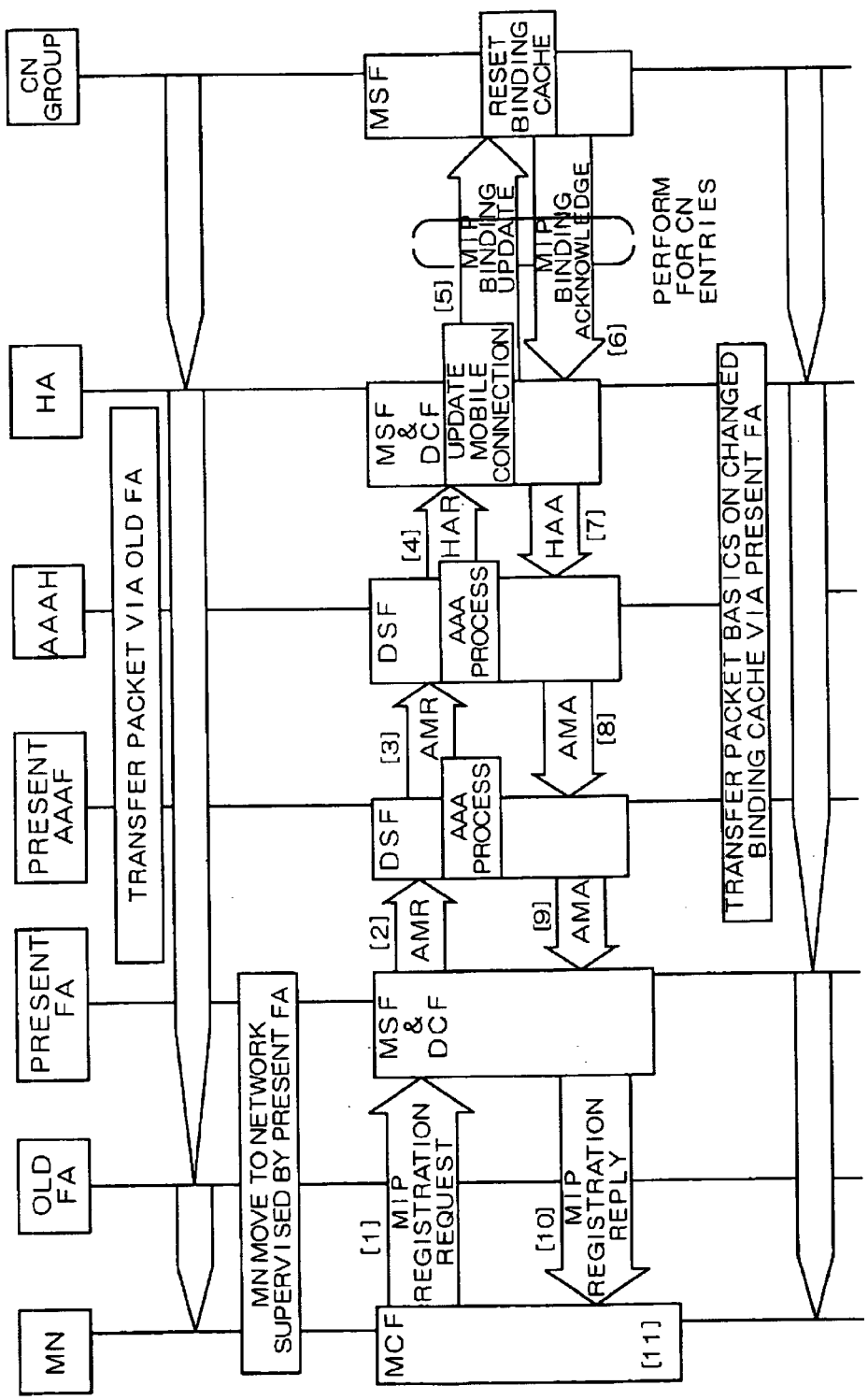
FIG. 76 is a diagram showing the sequence for the user to change the service within the range of contract service class.
Figure 77:
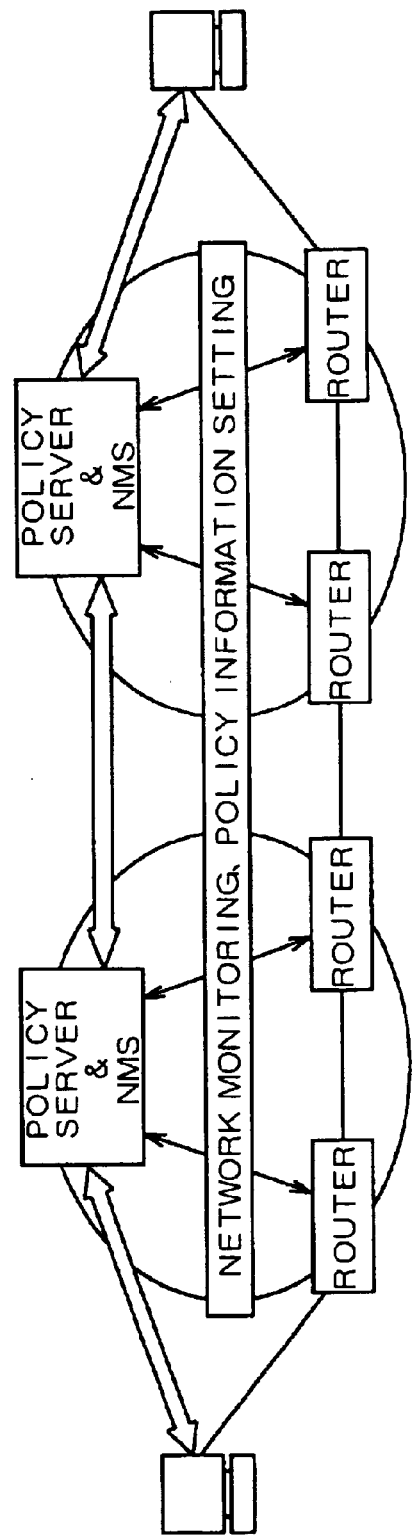
FIG. 77 is a block diagram of the conventional network for explaining the concept of the PBN.
Figure 78:
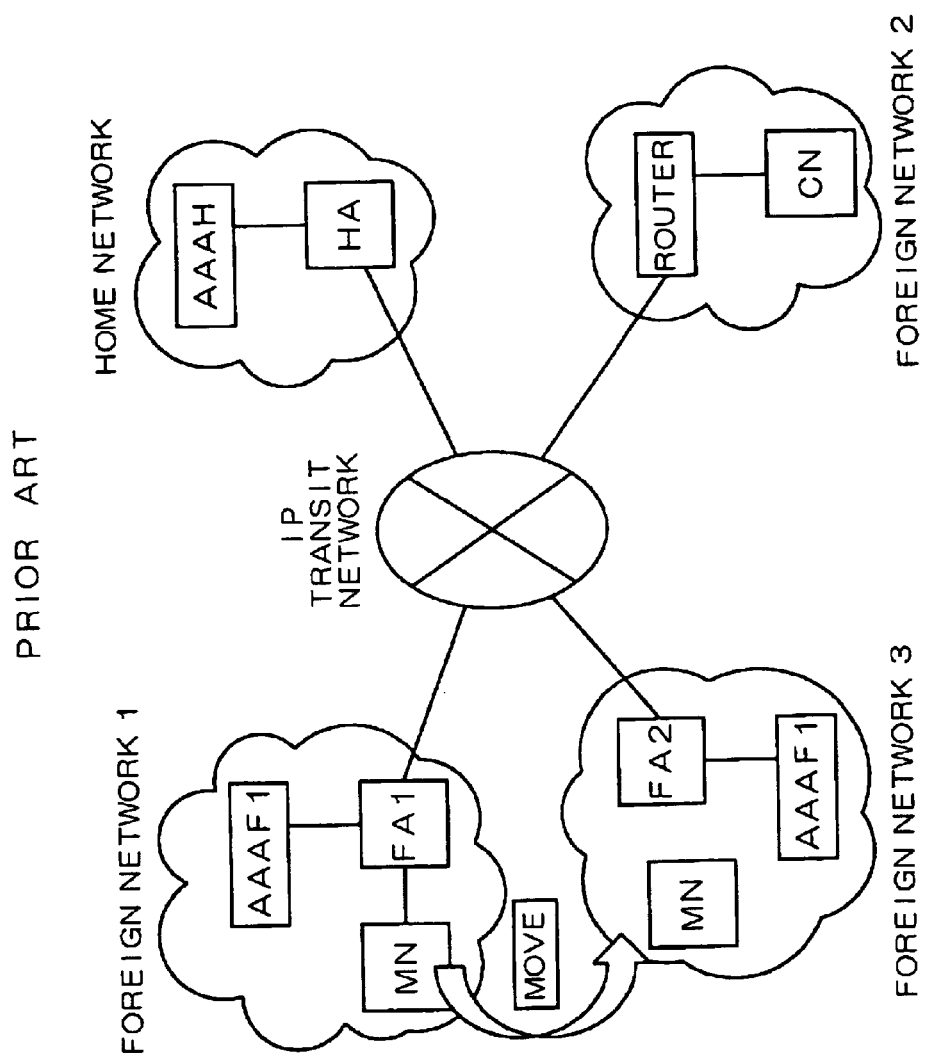
FIG. 78 is a block diagram of the conventional mobile IP network.

4. Procedure in the Case Where the SPC and the Binding Cache are Reset in Accordance with the CN List When the MN 600 is at Hand-Off FIG. 76 is a diagram showing the sequence for the user to change the service within the contract service class in an initial registration phase process which is performed when the foreign network to be connected is changed as the MN 600 is moved.

[1] The MN 600 creates an MIP registration request message for initial location registration in accordance with the operation procedure as shown in FIG. 45, and sends it to the FA 410.

[2] The FA 410 performs a predetermined processing corresponding to the received MIP registration request message in accordance with the operation procedure as shown in FIG. 31.

[3] The AAAF 430 performs a predetermined processing corresponding to the received AMR message in accordance with the operation procedure as shown in FIG. 48.

[4] The AAAH 130 performs an AMR checking process and an SPC creating process as follows in accordance with the operation procedure as shown in FIG. 57.

1) The AAAH 130 receives an AMR message, then extracts the NAI of the user that is set in the user name AVP, and retrieves a table designated by a network part name with the NAI as the retrieval key to index the SPI, service class.

2) If the retrieval of the SPI is ended, the AAAH 130 compares this retrieved SPI with the SPI set in the MN-AAA-SPI AVP. If the comparison result is unmatched, an AMA message containing an error code is created and sent back to the AAAF 430.

3) If the comparison result is matched, the AAAH 130 retrieves a service class table with the service class as the retrieval key and extracts an applicable service.

4) The AAAH 130 creates an SPC corresponding to the service that is turned ON. In the case of the band control service, the SPC is created by referring to the service proper information such as the applicable QoS class.

5) The AAAH 130 creates an HAR message containing the created SPC and sends it to the HA 110.

[5] The HA 110 transmits an MIP binding update message to the CN 320 with reference to the CN list and in accordance with the operation procedure as shown in FIGS. 35 and 36.

[6] The CN 320 performs an SPC setting process, as well as setting the binding cache, in accordance with the operation procedure as shown in FIG. 40.

[7] The HA 110 sends an HAA message to the AAAH 130 in accordance with the operation procedure as shown in FIG. 36.

[8] The AAAH 130 sends an AMA message to the AAAF 430 in accordance with the operation procedure as shown in FIG. 57.

[9] The AAAF 430 sends the AMA message to the FA 410 in accordance with the operation procedure as shown in FIG. 48.

[10] The FA 410 sends an MIP registration reply message to the MN 600 in accordance with the operation procedure as shown in FIG. 31.

[11] The MN 600 performs an SPC reference process in accordance with the operation procedure as shown in FIG. 43.

In this way, in the initial registration phase, the binding cache indicating the communication path to the CN 320 that is a communication destination of the MN 600 is set in the CN 320. Hence, when the packet is transmitted from the CN 320 to the MN 600, the latest service contents can be reflected.

What is claimed is:

1. A mobile network system comprising a home network to which mobile terminal equipment users subscribe, and a foreign network other than the home network, and a network management system for waking a resource management of the whole network and which is connected to said home network; said home network having:

a home agent apparatus having a home address corresponding to said mobile terminal equipment and relaying a packet transmitted from a correspondent node to said mobile terminal equipment; and a home server apparatus for managing an authentication, authorization and accounting concerning said home network;

said foreign network having:

a foreign agent apparatus for relaying said packet transferred from said home agent apparatus to said mobile reminal equipment; and a foreign server apparatus for managing the authentication, authorization and accounting concerning said foreign network;

wherein by transmitting a registration request message containing service content changing information from said mobile terminal equipment to said foreign agent apparatus, service control information concerning said mobile terminal equipment which is possessed by each of said foreign agent apparatus said foreign server apparatus, said home server apparatus said borne agent apparatus and said correspondent node which exist on a communication path between said mobile terminal equipment and said correspondent node is updated.

2. A mobile network system comprising a home network to which mobile terminal equipment users subscribe, and a foreign network other than the home network, and a network management system for making a resource management of the whole network and which is connected to said home network, said home network having:

a home agent apparatus having a home address corresponding to said mobile terminal equipment and relaying a packet transmitted from a correspondent node to said mobile terminal equipment; and a home server apparatus for managing an authentication, authorization and accounting concerning said home network;

said foreign network having:

a foreign agent apparatus for relaying the packet transferred front said home agent apparatus to said mobile terminal equipment; and a foreign server apparatus for managing the authentication, authorization and accounting concerning said foreign network;

wherein by making a request of changing a service content from said network management system to said home server apparatus, service control information concerning said mobile terminal equipment which is possessed by each of said foreign agent apparatus, said foreign server apparatus, said home server apparatus, said borne agent apparatus and said correspondent node which exist on a communication path between said mobile terminal equipment and said correspondent node is updated.

3. The mobile network system according to claim 1, wherein said home server apparatus has an access right to a service information database for storing the present service content information for every mobile terminal equipment, and when the registration request message is transmitted from said mobile terminal equipment, the service content information stored in said service information database is changed within a range of service contents stipulated by contract for said mobile terminal equipment.

4. The mobile network system according to claim 1, wherein said borne server apparatus has an access right to a service information database for storing the present service content information for every mobile terminal equipment, and when the registration request message is transmitted from said mobile terminal equipment, a negotiation is made with said network management system, if the service content information to be changed exceeds the range of service contains stipulated by contract for said mobile terminal equipment.

5. The mobile network system according to claim 3, wherein said home server apparatus enables said mobile terminal equipment to effect an initial location registration procedure with the aim at changing the service control information at a moment when the service content information stored in said service information database is changed.

6. The mobile network system according to claim 5, wherein upon receiving a predetermined message corresponding to said initial location registration procedure, said home server apparatus updates the service control information that is possessed by each of said foreign agent apparatus, said foreign server apparatus, said home server apparatus, said home agent apparatus, arid said corresponded node which are present on the communication path between said mobile terminal equipment and said correspondent node on the basis of the service content information after change that is stored in said service information database.

7. The mobile network system according to claim 6, wherein said home agent apparatus has a list of addresses for the correspondent nodes that become a communication partner, and said home server apparatus updates the service control information for one or more correspondent nodes contained in this list.

8. The mobile network system according to claim 7, wherein said home agent apparatus adds the address of a correspondent node that has newly communicated with said mobile terminal equipment to said list dynamically, and sets the service control information to the newly added correspondent node.

9. The mobile network system according to claim 1, wherein said home agent apparatus has a list of addresses for the communications nodes that become a communication partner, and said home server apparatus sets binding cache information indicating a connecting stare between said mobile terminal equipment and said home agent apparatus to said correspondent nodes contained in said list, in an initial registration phase process of said mobile terminal equipment.

10. The mobile network system according to claim 9, wherein said home agent apparatus instincts all the correspondent nodes contained in said list to reset the binding cache information, when said foreign network to which said mobile terminal equipment is connected is changed.

11. The mobile network system according to claim 7, wherein said home agent apparatus deletes the unnecessary addresses of said correspondent nodes from said list by performing an aging process.

12. The mobile network system according to claim 9, wherein said home agent apparatus deletes the unnecessary addresses of said correspondent nodes from said list by performing an aging process.

13. The mobile network system according to claim 7, wherein a predetermined response message to be transmitted when the processing an said correspondent nodes contained in said list is ended to said home agent apparatus is omitted.

14. The mobile network system according to claim 9, wherein a predetermined response message to be transmitted when the processing in said correspondent nodes contained in said list is ended to said home agent apparatus is omitted.

15. The mobile network system according to claim 1, wherein said mobile terminal equipment allows reference by indication to the content of the service control information set for each mobile terminal equipment on the basis of a registration response message transmitted from said foreign agent in correspondence to said registration request message.

16. A method for changing service control information in a mobile network, the service control information designating service contents provided for a mobile terminal equipment user, the method comprising the steps of;

changing the service control information of a user that is managed in a home network to which the user of the mobile terminal equipment subscribes when the mobile terminal equipment is present in a foreign network other than said home network;

transmitting a registration request message to said home network, after changing said service control information;

transmitting the service control information after change from said home network having received said registration request message to said foreign network where said mobile terminal equipment is present; and receiving a service based on said service control information after change at said mobile terminal equipment in said foreign network.

\* \* \* \* \*